US012804241B2

(12) United States Patent
Adato et al.

(10) Patent No.: US 12,804,241 B2
(45) Date of Patent: Nov. 17, 2026

(54) RECORDING USAGE OF GENERATED CONTENT

(71) Applicant: BRIA ARTIFICIAL INTELLIGENCE LTD, Tel Aviv (IL)

(72) Inventors: Yair Adato, Tenafly, NJ (US); Vered Horesh, Tel Aviv (IL); Amit Goldenberg, Shoham (IL); Rotem Sarfaty, Tel Aviv (IL); Gal Davidi, Tel Aviv (IL); Michael Feinstein, Tel Aviv (IL)

(73) Assignee: BRIA ARTIFICIAL INTELLIGENCE LTD, Tel Aviv (IL)

( * ) Notice: Subject to any disclaimer, the term of this patent is extended or adjusted under 35 U.S.C. 154(b) by 0 days.

(21) Appl. No.: 19/406,770

(22) Filed: Dec. 2, 2025

(65) Prior Publication Data

US 2026/0087108 A1 Mar. 26, 2026

Related U.S. Application Data

(63) Continuation of application No. PCT/US2025/036688, filed on Jul. 7, 2025.
(Continued)

(51) Int. Cl.
*G06F 40/40* (2020.01)
*G06F 16/3329* (2025.01)
(Continued)

(52) U.S. Cl.
CPC .......... *G06F 40/40* (2020.01); *G06F 16/3329* (2019.01); *G06F 16/335* (2019.01);
(Continued)

(58) Field of Classification Search
CPC ............... G06F 16/3329; G06F 16/958; G06F 18/214; G06F 21/16; G06N 3/475
(Continued)

(56) References Cited

U.S. PATENT DOCUMENTS 6,831,296 B1 12/2004 Lee et al.
6,844,717 B2 1/2005 Shim et al.
(Continued)

FOREIGN PATENT DOCUMENTS

WO 2024/103620 A1 5/2024

OTHER PUBLICATIONS

International Search Report and Written Opinion for International Application No. PCT/US2025/036688 dated Nov. 12, 2025 (27 pages).

(Continued)

*Primary Examiner* — Shahid A Alam

(74) *Attorney, Agent, or Firm* — Finnegan, Henderson, Farabow, Garrett & Dunner LLP

(57) ABSTRACT

Systems, methods and non-transitory computer readable media for recording usage of generated content are provided. In some examples, an indication of a usage of a specific content may be received. Further, it may be determined that the specific content is a content generated using a generative model, for example by analyzing the specific content. Further, the specific content may be analyzed to identify attribution information encoded in the specific content. The attribution information may attribute the specific content to at least one source. For each source of the at least one source, a data-record associated with the respective source may be updated based on the attribution of the specific content. Additionally, data based on the data-records may be provided.

20 Claims, 17 Drawing Sheets

Related U.S. Application Data

(60) Provisional application No. 63/668,371, filed on Jul. 8, 2024, provisional application No. 63/723,253, filed on Nov. 21, 2024.

(51) Int. Cl.

| | |
|---|---|
| ***G06F 16/335*** | (2019.01) |
| ***G06F 16/432*** | (2019.01) |
| ***G06F 18/214*** | (2023.01) |
| ***G06F 21/10*** | (2013.01) |
| ***G06F 21/16*** | (2013.01) |
| ***G06F 40/166*** | (2020.01) |
| ***G06F 40/253*** | (2020.01) |
| ***G06F 40/279*** | (2020.01) |
| ***G06N 3/0475*** | (2023.01) |
| ***G06N 3/08*** | (2023.01) |
| ***G06N 3/084*** | (2023.01) |
| ***G06N 20/00*** | (2019.01) |
| ***G10H 1/00*** | (2006.01) |
| ***H04N 21/83*** | (2011.01) |
| ***H04N 21/85*** | (2011.01) |

(52) U.S. Cl.

CPC .......... *G06F 16/432* (2019.01); *G06F 18/214* (2023.01); *G06F 21/106* (2023.08); *G06F 21/16* (2013.01); *G06F 40/166* (2020.01); *G06F 40/253* (2020.01); *G06F 40/279* (2020.01); *G06N 3/0475* (2023.01); *G06N 3/08* (2013.01); *G06N 3/084* (2013.01); *G06N 20/00* (2019.01); *G10H 1/0025* (2013.01); *H04N 21/83* (2013.01); *H04N 21/85* (2013.01); *G10H 2210/036* (2013.01); *G10H 2210/056* (2013.01); *G10H 2210/071* (2013.01); *G10H 2210/076* (2013.01); *G10H 2210/081* (2013.01); *G10H 2210/111* (2013.01); *G10H 2210/576* (2013.01)

(58) Field of Classification Search

USPC .......................................................... 707/736

See application file for complete search history.

(56) References Cited

U.S. PATENT DOCUMENTS

| | | | | |
|---|---|---|---|---|
| 6,919,734 | B2 | 7/2005 | Saito et al. | |
| 7,583,096 | B2 | 9/2009 | Hosaka et al. | |
| 9,519,461 | B2 | 12/2016 | Gabel et al. | |
| 10,083,009 | B2 | 9/2018 | Gabel et al. | |
| 10,091,140 | B2 | 10/2018 | Galley et al. | |
| 10,282,672 | B1 | 5/2019 | Mishra et al. | |
| 10,825,227 | B2 | 11/2020 | Amer et al. | |
| 11,082,487 | B1 | 8/2021 | Jain et al. | |
| 11,551,440 | B1 | 1/2023 | Namballa et al. | |
| 11,854,129 | B2 | 12/2023 | Adato et al. | |
| 11,880,917 | B2 | 1/2024 | Adato et al. | |
| 11,881,958 | B2 | 1/2024 | Rey et al. | |
| 11,900,052 | B2 | 2/2024 | Li et al. | |
| 11,922,317 | B2 | 3/2024 | Takehara | |
| 11,934,792 | B1 | 3/2024 | Adato et al. | |
| 11,940,986 | B1 * | 3/2024 | Kocaman | G06F 16/258 |
| 11,947,922 | B1 | 4/2024 | Adato et al. | |
| 12,073,605 | B1 | 8/2024 | Adato et al. | |
| 12,080,277 | B1 | 9/2024 | Adato et al. | |
| 12,142,029 | B2 | 11/2024 | Adato et al. | |
| 12,158,929 | B1 * | 12/2024 | Huang | H04L 9/0643 |
| 12,223,281 | B2 | 2/2025 | Adato et al. | |
| 2019/0339824 | A1 | 11/2019 | Hamedi et al. | |
| 2020/0265153 | A1 | 8/2020 | Li et al. | |
| 2020/0320322 | A1 | 10/2020 | Liang et al. | |
| 2021/0019541 | A1 | 1/2021 | Wang et al. | |
| 2021/0064825 | A1 | 3/2021 | Sadamasa et al. | |
| 2021/0157554 | A1 | 5/2021 | Minasyan et al. | |
| 2022/0157341 | A1 * | 5/2022 | Adato | G11B 27/034 |
| 2022/0269980 | A1 | 8/2022 | Keren et al. | |
| 2022/0335203 | A1 | 10/2022 | Van Dyke et al. | |
| 2022/0335719 | A1 | 10/2022 | Altschuler et al. | |
| 2022/0405314 | A1 | 12/2022 | Du et al. | |
| 2023/0306504 | A1 | 9/2023 | Liila et al. | |
| 2023/0351807 | A1 | 11/2023 | Ren et al. | |
| 2023/0360364 | A1 | 11/2023 | Wu et al. | |
| 2023/0409298 | A1 | 12/2023 | Ciminelli et al. | |
| 2024/0104697 | A1 | 3/2024 | Adato et al. | |
| 2025/0037428 | A1 | 1/2025 | Adato et al. | |
| 2025/0147999 | A1 * | 5/2025 | Lee | G06F 16/353 |
| 2025/0278443 | A1 * | 9/2025 | Lynch | G06F 16/9535 |

OTHER PUBLICATIONS

Chen, Z., Jiang, R., Duke, B., Zhao, H., Aarabi, P. (2022). Exploring Gradient-Based Multi-directional Controls in GANs. In: Avidan, S., Brostow, G., Cisse, M., Farinella, G. M., Hassner, T. (eds) Computer Vision—ECCV 2022. ECCV 2022 (Year: 2022).

Lee, Seunghun, Sunghyun Cho, and Sunghoon Im. “Dranet: Disentangling representation and adaptation networks for unsupervised cross-domain adaptation.” Proceedings of the IEEE/CVF conference on computer vision and pattern recognition, 2021. (Year: 2021).

Jiang, S., Z. Tao and Y. Fu, “Geometrically Editable Face Image Translation With Adversarial Networks,” in IEEE Transactions on Image Processing, vol. 30, pp. 2771-2783, 2021 (Year: 2021).

* cited by examiner

440

RECORDING USAGE OF GENERATED CONTENT

CROSS-REFERENCE TO RELATED APPLICATIONS

This application is a continuation of PCT International Application No. PCT/US2025/036688, filed on Jul. 7, 2025, which claims the benefit of priority of U.S. Provisional Patent Application No. 63/668,371, filed on Jul. 8, 2024, and U.S. Provisional Patent Application No. 63/723,253, filed on Nov. 21, 2024, the disclosures of which are incorporated herein by reference in their entirety.

BACKGROUND OF THE INVENTION

Technological Field

The disclosed embodiments generally relate to the field of digital content generation, usage, and attribution. More specifically, it addresses the methods and systems for creating, consuming, and properly attributing various types of digital content, including text, images, audio, and video.

Background Information

Vast number of media contents, such as audios, images and videos, are created, edited and viewed by different entities. Nowadays, many media contents are generated and/or modified to better suit different criteria. However, achieving high quality results when generating and/or modifying media contents still requires significant efforts. Moreover, selecting the optimal modification for different purposes is still challenging. This is especially true when generating and/or modifying a large number of media content items. Therefore, automating the generation and/or modification of media contents is desired.

As the use of generative models in creating textual, audio, and multimedia content becomes increasingly prevalent, concerns around transparency, content ownership, provenance, and responsible usage have grown. Traditional content generation systems often lack mechanisms to enforce content usage restrictions or trace the origin of generated outputs back to specific training data or user inputs. This creates challenges in managing intellectual property, verifying authenticity, and ensuring ethical use, particularly in domains such as media production, personalized content delivery, and automated communications. Moreover, existing systems typically do not provide tools for embedding or extracting attribution metadata within generated content, making it difficult to track how and where content has been derived or deployed. Accordingly, there is a need for improved systems and methods that not only enable flexible and purpose-driven content generation but also support attribution, control, and traceability throughout the lifecycle of machine-generated outputs.

The advent of the internet and the proliferation of digital devices have revolutionized the way information and content are created, shared, and consumed. With the exponential growth of digital content, users are now exposed to an overwhelming volume of information from a multitude of sources. This has led to challenges related to the authenticity, credibility, and attribution of digital content. Determining the origin and ownership of content, as well as tracking its use and reuse, has become a critical issue in an age marked by widespread information sharing and content reuse.

Content creation has become more democratized, with a wide range of individuals and entities contributing to the digital landscape. Simultaneously, the importance of attributing content, or parts thereof, to its creators or sources has grown significantly. Accurate attribution is crucial for ensuring content integrity, protecting intellectual property rights, and maintaining trust among users. In many instances, it has been challenging to enforce proper attribution, leading to issues of plagiarism, misrepresentation, and copyright infringement.

Recent advancements in machine learning and natural language processing have enabled the development of highly capable generative models that can produce coherent and contextually relevant textual content. These models are typically trained on large datasets composed of numerous textual examples sourced from various origins. However, as the adoption of generative models becomes more widespread, there is an increasing need for systems that can provide transparency and accountability with respect to how generated content relates to the original training data. In particular, determining which training examples most influenced a specific piece of generated text is essential for purposes such as copyright compliance, bias auditing, content traceability, and model interpretability. Existing solutions often fall short in providing granular attribution of generated outputs to subsets of the training data. Therefore, there is a need for improved systems and methods that can accurately attribute generated textual content to relevant training examples or sources in a scalable and reliable manner.

Media content generation has become increasingly automated, with applications ranging from entertainment and advertising to education and corporate communication. Traditional content creation often requires significant manual input and domain-specific expertise to tailor outputs for different use cases. However, these approaches are typically time-consuming and inflexible, particularly when content must adhere to specific requirements or restrictions imposed by the intended context of use, such as legal, cultural, or platform-specific guidelines. As a result, there is a growing need for intelligent systems capable of generating media content dynamically while taking into account such contextual restrictions. Recent advances in generative modeling, including machine learning techniques such as generative adversarial networks and transformer-based models, offer promising avenues to automate this process. Nonetheless, existing solutions often lack the capability to customize outputs based on specific usage requirements. Accordingly, improved systems and methods are needed to enable automated media generation that adapts to the constraints and expectations of its intended use.

The proliferation of generative models, particularly those powered by machine learning and artificial intelligence, has significantly transformed the creation and dissemination of digital content. These models are trained on large datasets composed of numerous examples, enabling them to produce new, often high-quality content in response to natural language inputs. However, as generative content becomes more prevalent, there is an increasing need to understand and manage the provenance and attribution of the outputs they produce. Existing systems lack robust mechanisms for determining how much a generated output is influenced by specific inputs or auxiliary sources, especially in contexts where attribution is legally or ethically significant, such as intellectual property, academic work, and content moderation. There is therefore a need for systems and methods that can provide chained attribution, allowing for the determination and communication of how much generated content is derived from various input sources, including training data and auxiliary content provided at inference time.

As generative models become increasingly prevalent in the creation of digital content, there is a growing need to understand and trace the origins and influences underlying generated outputs. Traditional attribution techniques often fall short in scenarios involving evolving machine learning models that adapt over time through continued training or fine-tuning. In many applications, it is desirable to not only identify the training data that influenced a model's output but also to track how that influence changes as the model evolves. For example, as a base generative model is fine-tuned with additional training data, its outputs may begin to reflect different subsets of the original training examples. However, conventional systems typically lack the granularity or adaptability required to dynamically attribute generated content to subsets of evolving training datasets. Improved systems and methods for evolving attribution, capable of identifying which portions of training data most influenced specific generated content, even as models change, can facilitate better transparency, accountability, and interpretability in AI-generated outputs.

The rapid advancement of generative artificial intelligence (AI) technologies has enabled the automatic generation of a wide variety of content, including text, images, audio, and video. While these systems offer significant efficiencies and creative capabilities, they often lack mechanisms to ensure exclusion of specific concepts, styles, or content elements from generated outputs. In many practical scenarios—such as legal, ethical, proprietary, or brand-compliance contexts—there is a critical need to avoid generating content that includes or resembles particular concepts, ideas, or source materials. Existing generative models typically focus on relevance and coherence based on prompts but do not provide robust functionality for selectively excluding unwanted content. As such, there remains a need for systems and methods that can guide content generation processes to actively avoid incorporating specified or undesired elements, thereby enabling more controlled and compliant content creation.

The proliferation of generative artificial intelligence (AI) technologies has enabled the automated creation of a wide variety of content types, including text, images, audio, and video. These systems, often driven by advanced machine learning models such as large language models or generative adversarial networks, can generate highly realistic and contextually appropriate outputs based on natural language inputs. However, as the use of generative models becomes more widespread, concerns have emerged regarding the provenance, attribution, and responsible use of AI-generated content. Specifically, there is a growing need to identify and track the sources or influences that contribute to the generation of such content to ensure transparency, support intellectual property rights, and maintain ethical standards. Existing methods often lack mechanisms for reliably attributing generated content to original data sources or for encoding such attribution in a way that persists alongside the content itself. Accordingly, there is a need for improved systems and methods that can analyze AI-generated content to determine its origins and incorporate source attribution data directly into the content in a durable and retrievable manner.

The rapid advancement of generative models, including large language models and image generation systems, has led to the widespread creation and dissemination of synthetic content across various digital platforms. As such content becomes increasingly integrated into creative, commercial, and informational workflows, there is a growing need for mechanisms that can track, attribute, and analyze its usage. Traditional content management and attribution systems are not well-suited to handle the dynamic and often opaque nature of AI-generated content, which may be distributed without clear indicators of origin or authorship. Accordingly, there is a need for systems and methods that can identify whether content was generated using a generative model, extract embedded attribution data from such content, and record usage events in association with the appropriate sources. Such systems would enable more accurate tracking of content provenance, facilitate fair compensation or recognition for contributors, and support transparency in the use of synthetic media.

With the increasing availability of digital music platforms and streaming services, users now engage with music in highly personalized and dynamic ways. These platforms collect vast amounts of data regarding users' listening habits, including preferences for genres, tempos, moods, and other musical attributes. While traditional recommendation systems leverage this data to suggest existing tracks, there remains a need for more advanced techniques that can generate entirely new audio content tailored to individual user preferences. Recent advancements in machine learning, particularly generative models, have enabled new possibilities in content creation. However, integrating user-specific musical preferences into the generative process remains a technical challenge. Accordingly, there is a need for systems and methods that can analyze a user's listening habits, identify relevant musical properties from existing audio clips, and use these insights to generate new, personalized audio clips.

SUMMARY OF THE INVENTION

In some examples, systems, methods and non-transitory computer readable media for attributing generated textual contents to training examples are provided. In some examples, a first textual content generated using a generative model may be received. The generative model may be a result of training a machine learning model using a plurality of training examples. Each training example of the plurality of training examples may be associated with a respective textual content. One or more properties of the first textual content may be determined. For each training example of the plurality of training examples, one or more properties of the respective textual content may be determined. The one or more properties of the first textual content and the properties of the textual contents associated with the plurality of training examples may be used to attribute the first textual content to a first subgroup of at least one but not all of the plurality of training examples. In some examples, it may be determined that the training examples of the first subgroup are associated with at least one source, and, for each source of the at least one source, a respective data-record associated with the source may be updated based on the attribution.

In some examples, systems, methods and non-transitory computer readable media for generating media contents based on requirements determined by intended use are provided. In some examples, a generative model may be accessed. Further, an indication of a desire to generate media content for a specific intended use may be received. At least one restriction on media contents associated with the specific intended use may be determined. The generative model may be used to generate the media content based on the at least one restriction. The generated media content may be provided.

In some examples, systems, methods and non-transitory computer readable media for chained attribution of generated content are provided. In some examples, a generative model may be accessed. The generative model may be a result of training a machine learning model using a plurality of training examples. Each training example of the plurality of training examples may be associated with a respective content. Further, an input in a natural language may be received. Further, at least one auxiliary content may be obtained. The generative model may be used to analyze the input and the at least one auxiliary content to generate a new content, the generated new content is based on the at least one auxiliary content and at least one of the plurality of training examples. A degree of attribution of the generated new content to the at least one auxiliary content may be determined. Information based on the degree of attribution may be provided.

In some examples, systems, methods and non-transitory computer readable media for evolving attribution of generated content are provided. In some examples, a first content generated using a first generative model in response to an input may be received. The input may be indicative of a desire to generate content with specific characteristics. The first generative model may be a result of training a machine learning model using a first plurality of training examples. Each training example of the first plurality of training examples may be associated with a respective content. One or more properties of the first content may be determined. For each training example of the first plurality of training examples, the respective content may be analyzed to determine respective one or more properties of the respective content. The one or more properties of the first content and the properties of the contents associated with the first plurality of training examples may be used to attribute the first content to a first subgroup of at least one but not all of the first plurality of training examples. A second content generated using a second generative model in response to the input may be received. The second generative model may be a result of training the machine learning model using the first generative model for initialization and a second plurality of training examples. Each training example of the second plurality of training examples may be associated with a respective content. One or more properties of the second content may be determined. The one or more properties of the second content and the properties of the contents associated with the first plurality of training examples may be used to attribute the second content to a second subgroup of at least one but not all of the first plurality of training examples, wherein the second subgroup is a proper subset of the first subgroup.

In some examples, systems, methods and non-transitory computer readable media for excluding selected concepts in content generation are provided. In some examples, a generative model may be accessed. Further, an input in a natural language indicative of a desire to generate a new content may be received. Further, a repository including a plurality of contents may be accessed. The generative model may be used to analyze the input to generate the new content while avoiding from including aspects of the contents of the plurality of contents in the new content. The new content may be provided.

In some examples, systems, methods and non-transitory computer readable media for marking attribution data in generated content are provided. In some examples, a generative model may be accessed. Further, an input in a natural language indicative of a desire to generate a new content may be received. The generative model may be used to analyze the input to generate the new content. The new content may be analyzed to attribute the new content to at least one source. The new content may be modified to encode information indicative of the at least one source. The modified new content may be provided.

In some examples, systems, methods and non-transitory computer readable media for recording usage of generated content are provided. In some examples, an indication of a usage of a specific content may be received. Further, it may be determined that the specific content is a content generated using a generative model, for example by analyzing the specific content. Further, the specific content may be analyzed to identify attribution information encoded in the specific content. The attribution information may attribute the specific content to at least one source. For each source of the at least one source, a data-record associated with the respective source may be updated based on the attribution of the specific content. Data based on the data-records may be provided.

In some examples, systems, methods and non-transitory computer readable media for generating audio clips from listening habits are provided. In some examples, a generative model may be accessed. Further, a plurality of audio clips may be accessed. For each audio clip of the plurality of audio clips, the respective audio clip may be analyzed to identify a musical property of the respective audio clip. The generative model and the identified musical properties may be used to generate a new audio clip. The new audio clip may be provided.

BRIEF DESCRIPTION OF DRAWINGS

The accompanying drawings, which are incorporated in and constitute a part of this disclosure, illustrate various disclosed embodiments. In the drawings.

DETAILED DESCRIPTION OF THE INVENTION

Figure 1A:
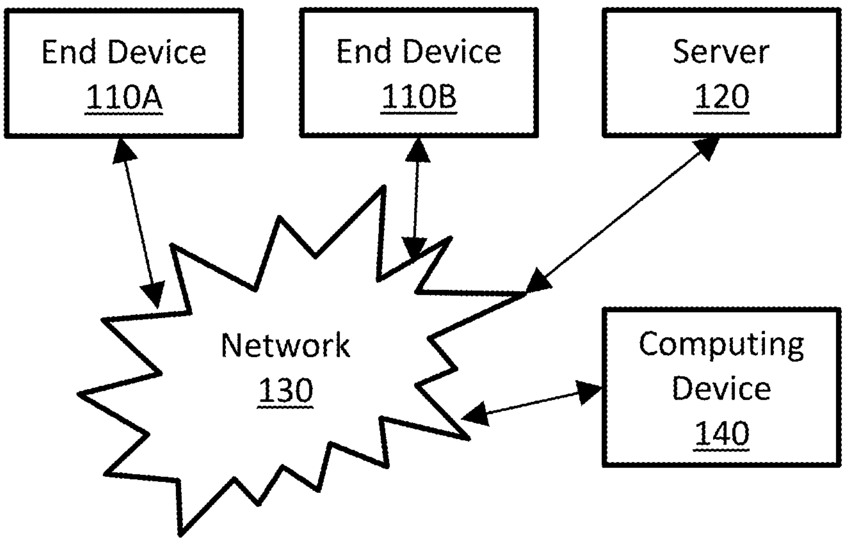
FIG. 1A is an illustration of an exemplary communication system.

Unless specifically stated otherwise, as apparent from the following discussions, it is appreciated that throughout the specification discussions utilizing terms such as "processing", "calculating", "computing", "determining", "generating", "setting", "configuring", "selecting", "defining", "applying", "obtaining", "monitoring", "providing", "identifying", "segmenting", "classifying", "analyzing", "associating", "extracting", "storing", "receiving", "transmitting", or the like, include action and/or processes of a computer that manipulate and/or transform data into other data, said data represented as physical quantities, for example such as electronic quantities, and/or said data representing the physical objects. The terms "computer", "processor", "controller", "processing unit", "computing device", and "processing module" should be expansively construed to cover any kind of electronic device, component or unit with data processing capabilities, including, by way of non-limiting example, a personal computer, a wearable computer, a tablet, a smartphone, a server, a computing system, a cloud computing platform, a communication device, a processor (for example, digital signal processor (DSP), an image signal processor (ISR), a microcontroller, a field programmable gate array (FPGA), an application specific integrated circuit (ASIC), a central processing unit (CPA), a graphics processing unit (GPU), a visual processing unit (VPU), and so on), possibly with embedded memory, a single core processor, a multi core processor, a core within a processor, any other electronic computing device, or any combination of the above.

The operations in accordance with the teachings herein may be performed by a computer specially constructed or programmed to perform the described functions.

As used herein, the phrase "for example," "such as", "for instance", "in one example", "in another example", "in a different example", "in some examples", "in an additional example", "in yet another example" and variants thereof describe non-limiting embodiments of the presently disclosed subject matter. Reference in the specification to "one case", "some cases", "other cases" or variants thereof means that a particular feature, structure or characteristic described in connection with the embodiment(s) may be included in at least one embodiment of the presently disclosed subject matter. Thus the appearance of the phrase "one case", "some cases", "other cases" or variants thereof does not necessarily refer to the same embodiment(s). As used herein, the term "and/or" includes any and all combinations of one or more of the associated listed items.

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

The term "image sensor" is recognized by those skilled in the art and refers to any device configured to capture images, a sequence of images, videos, and so forth. This includes sensors that convert optical input into images, where optical input can be visible light (like in a camera), radio waves, microwaves, terahertz waves, ultraviolet light, infrared light, x-rays, gamma rays, and/or any other light spectrum. This also includes both 2D and 3D sensors. Examples of image sensor technologies may include: CCD, CMOS, NMOS, and so forth. 3D sensors may be implemented using different technologies, including: stereo camera, active stereo camera, time of flight camera, structured light camera, radar, range image camera, and so forth.

In embodiments of the presently disclosed subject matter, one or more stages illustrated in the figures may be executed in a different order and/or one or more groups of stages may be executed simultaneously and vice versa. The figures illustrate a general schematic of the system architecture in accordance embodiments of the presently disclosed subject matter. Each module in the figures can be made up of any combination of software, hardware and/or firmware that performs the functions as defined and explained herein. The modules in the figures may be centralized in one location or dispersed over more than one location.

It should be noted that some examples of the presently disclosed subject matter are not limited in application to the details of construction and the arrangement of the components set forth in the following description or illustrated in the drawings. The invention can be capable of other embodiments or of being practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing may have the same use and description as in the previous drawings.

The drawings in this document may not be to any scale. Different figures may use different scales and different scales can be used even within the same drawing, for example different scales for different views of the same object or different scales for the two adjacent objects.

FIG. 1A is an illustration of an exemplary communication system. In this example, the communication system may include: one or more end devices 110 (such as end device 110A, end device 110B, etc.), one or more servers (such as server 120), a communication network 130, and one or more other computing devices (such as computing device 140). In this example, end devices 110 may communicate with server 120, with computing device 140, with each other, and so forth. The communication may be using communication network 130 and/or directly. Possible implementations of an end device 110 and/or of server 120 and/or of computing device 140 may include computing device 200 as described in FIGS. 2A and 2B. In other example, an end device 110 and/or of server 120 and/or of computing device 140 may be implemented using a cloud platform, for example as a physical computing device or a virtual computing device in a cloud platform. Some other non-limiting examples of possible implementations of end device 110 may include a mobile phone, a smartphone, a tablet, a wearable computing device, a personal computer (PC), and so forth. In some examples, end devices 110 may communicate with server 120, with computing device 140, with each other, and so forth. Possible implementations of an end device 110 and/or of server 120 and/or of computing device 140 may connect to communication network 130 using a local router, directly, through another communication device, and so forth. Some non-limiting examples of communication network 130 may include the Internet, phone networks, cellular networks, satellite communication networks, private communication networks, virtual private networks (VPN), and so forth.

Figure 1B:
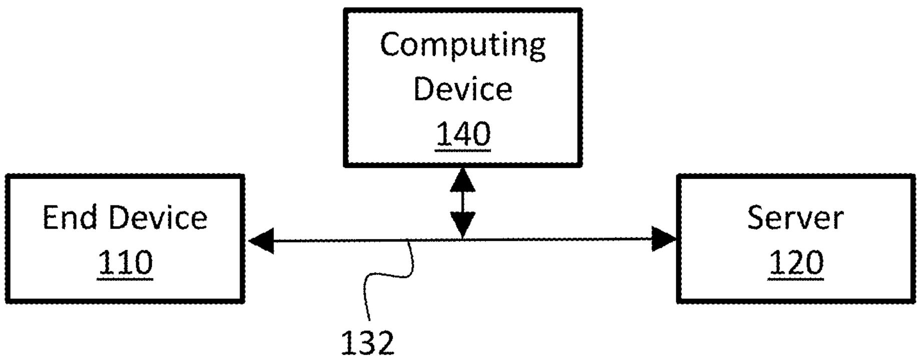
FIG. 1B is an illustration of an exemplary communication system.

FIG. 1B is an illustration of an exemplary communication system. In this example, end device 110 communicates with server 120 using a communication hardware 132. For example, end device 110 communicates with server 120 directly, through a different communication device, over a communication line, using a communication network (such as communication network 130), and so forth. In this example, another computing device 140 may observe and/or modify and/or block the communication between end device 110 and server 120. In one example, a communication line between end device 110 communicates and server 120 may be a direct communication line, may be a communication line through another device, may be a communication line over a communication network (such as communication network 130), and so forth.

FIGS. 1A and 1B illustrate some possible implementations of a communication system. In some embodiments, other communication systems that enable communication between end devices 110 may communicate and/or server 120 and/or computing device 140 may be used.

Figure 2A:
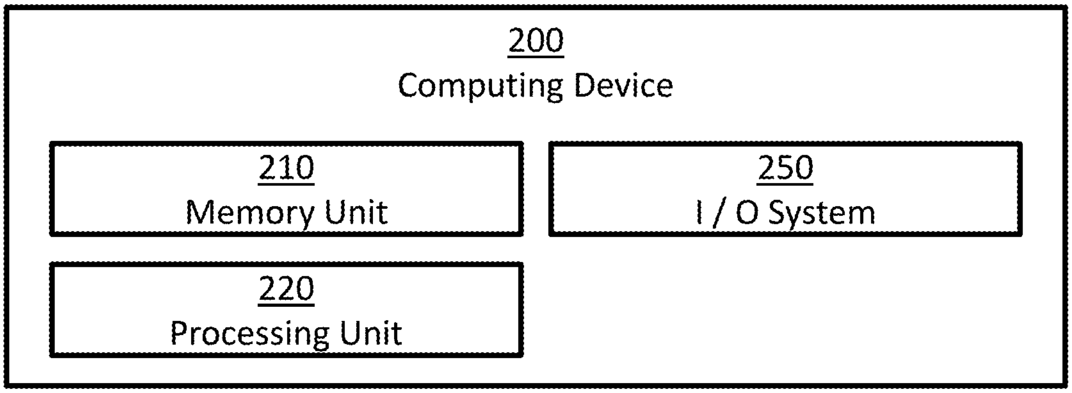
FIG. 2A is a simplified block diagram of an example for one possible implementation of a computing device.

FIG. 2A is a simplified block diagram of an example for one possible implementation of a computing device. In this example, computing device 200 may comprise: one or more memory units 210, one or more processing units 220, and input/output system 250. In some implementations, computing device 200 may comprise additional components, while some components listed above may be excluded.

Figure 2B:
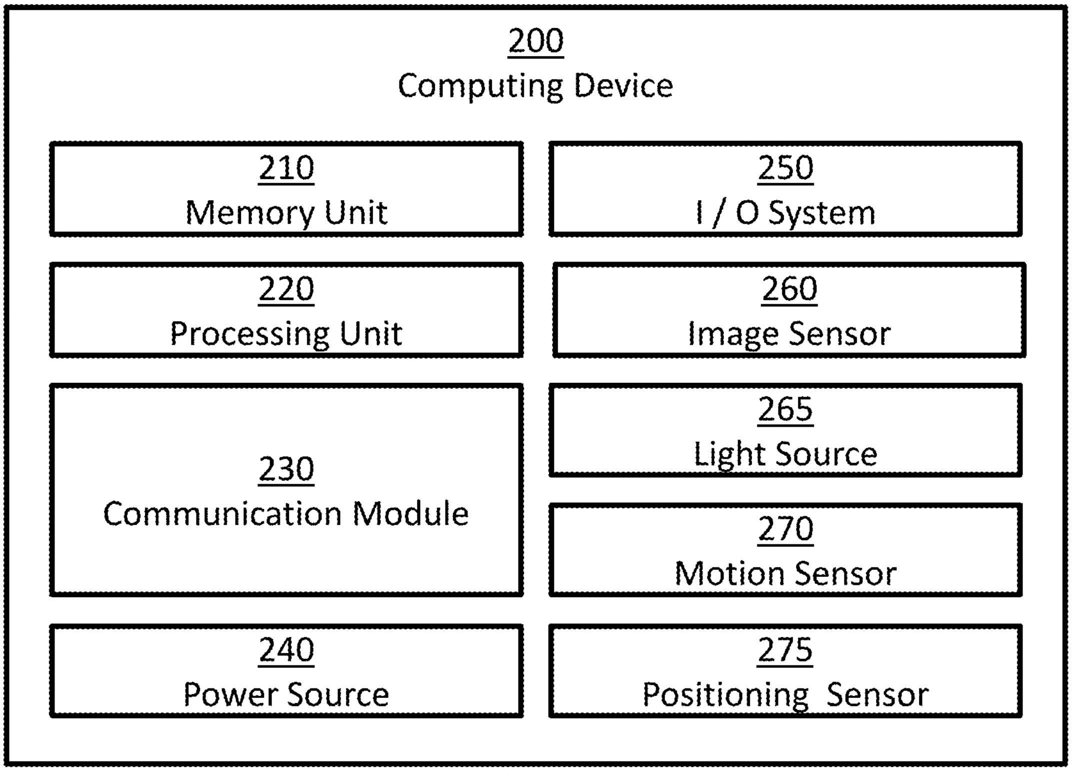
FIG. 2B is a simplified block diagram of an example for one possible implementation of a computing device.

FIG. 2B is a block diagram illustrating a possible implementation of computing device 200. In this example, computing device 200 may comprise: one or more memory units 210, one or more processing units 220, one or more communication modules 230, one or more power sources 240, input/output system 250, one or more image sensors 260, one or more light sources 265, one or more motion sensors 270, and one or more positioning sensors 275. In some implementations, computing device 200 may comprise additional components, while some components listed above may be excluded. For example, in some implementations computing device 200 may also comprise at least one of the following: one or more user input devices, one or more output devices, and so forth. In another example, in some implementations at least one of the following may be excluded from computing device 200: memory units 210, communication modules 230, power sources 240, input/output system 250, image sensors 260, light sources 265, motion sensors 270, and positioning sensors 275.

In some embodiments, one or more power sources 240 may be configured to power computing device 200. Possible non-limiting implementation examples of power sources 240 may include: one or more electric batteries, one or more capacitors, one or more connections to external power sources, one or more power convertors, any combination of the above, and so forth.

In some embodiments, the one or more processing units 220 may be configured to execute software programs. For example, processing units 220 may be configured to execute software programs stored on the memory units 210. In some cases, the executed software programs may store information in memory units 210. In some cases, the executed software programs may retrieve information from the memory units 210. Possible non-limiting implementation examples of the processing units 220 may include one or more single core processors, one or more multicore processors, one or more controllers, one or more application processors, one or more system on a chip processors, one or more central processing units, one or more graphical processing units, one or more neural processing units, any combination of the above, and so forth.

In some embodiments, the one or more communication modules 230 may be configured to receive and transmit information. For example, control signals may be transmitted and/or received through communication modules 230. In another example, information received though communication modules 230 may be stored in memory units 210. In an additional example, information retrieved from memory units 210 may be transmitted using communication modules 230. In another example, input data may be transmitted and/or received using communication modules 230. Examples of such input data may include: input data inputted by a user using user input devices; information captured using one or more sensors; and so forth. Examples of such sensors may include: audio sensors, image sensors 260, motion sensors 270, positioning sensors 275, temperature sensors, and so forth.

In some embodiments, the input/output system 250 may include or be configured to connect with input and/or output devices, such as keyboards, computer mouses, touch pads, touch screens, gesture recognition systems, image sensors, audio sensors, visual indicators (such as LED visual indicators), audio speakers, audio beepers, display screens, extended reality systems, and so forth. In some examples, input and/or output devices may be configured to generate digital signal based on inputs from a user, a person, or an environment, and/or to generate physical output to a user, a person or in an environment based on digital signals. In one example, the input/output system 250 may be configured to store and/or receive such digital signals from memory unit 210. In one example, the input/output system 250 may be configured to receive and/or provide such digital signals from and/or to processing unit 220 and/or communication module 230.

In some embodiments, the one or more image sensors 260 may be configured to capture visual information by converting light to: image data, images, a sequence of images, videos, 3D images, a sequence of 3D images, a 3D videos, and so forth. In some examples, the captured visual information may be stored in memory units 210. In some additional examples, the captured visual information may be transmitted using communication modules 230, for example to other computerized devices. In some examples, processing units 220 may control the above processes. For example, processing units 220 may control at least one of: capturing of the visual information, storing the captured visual information, transmitting of the captured visual information, analysis of the captured visual information, and so forth. In some cases, the captured visual information may be processed by processing units 220. For example, the captured visual information may be compressed by processing units 220; possibly followed: by storing the compressed captured visual information in memory units 210; by transmitted the compressed captured visual information using communication modules 230; and so forth. In another example, the captured visual information may be processed in order to: detect objects, detect events, detect action, detect face, detect people, recognize person, and so forth.

In some embodiments, the one or more light sources 265 may be configured to emit light, for example in order to enable better image capturing by image sensors 260. In some examples, the emission of light may be coordinated with the capturing operation of image sensors 260. In some examples, the emission of light may be continuous. In some examples, the emission of light may be performed at selected times. The emitted light may be visible light, infrared light, x-rays, gamma rays, and/or in any other light spectrum. In some examples, image sensors 260 may capture light emitted by light sources 265, for example in order to capture 3D images and/or 3D videos using active stereo method.

In some embodiments, the one or more motion sensors 270 may be configured to perform at least one of the following: detect motion of objects in the environment of computing device 200; measure the velocity of objects in the environment of computing device 200; measure the acceleration of objects in the environment of computing device 200; detect motion of computing device 200; measure the velocity of computing device 200; measure the acceleration of computing device 200; and so forth. In some implementations, the one or more motion sensors 270 may comprise one or more accelerometers configured to detect changes in proper acceleration and/or to measure proper acceleration of computing device 200. In some implementations, the one or more motion sensors 270 may comprise one or more gyroscopes configured to detect changes in the orientation of computing device 200 and/or to measure information related to the orientation of computing device 200. In some implementations, motion sensors 270 may be implemented using image sensors 260, for example by analyzing images captured by image sensors 260 to perform at least one of the following tasks: track objects in the environment of computing device 200; detect moving objects in the environment of computing device 200; measure the velocity of objects in the environment of computing device 200; measure the acceleration of objects in the environment of computing device 200; measure the velocity of computing device 200, for example by calculating the egomotion of image sensors 260; measure the acceleration of computing device 200, for example by calculating the egomotion of image sensors 260; and so forth. In some implementations, motion sensors 270 may be implemented using image sensors 260 and light sources 265, for example by implementing a LIDAR using image sensors 260 and light sources 265. In some implementations, motion sensors 270 may be implemented using one or more RADARs. In some examples, information captured using motion sensors 270: may be stored in memory units 210, may be processed by processing units 220, may be transmitted and/or received using communication modules 230, and so forth.

In some embodiments, the one or more positioning sensors 275 may be configured to obtain positioning information of computing device 200, to detect changes in the position of computing device 200, and/or to measure the position of computing device 200. In some examples, positioning sensors 275 may be implemented using one of the following technologies: Global Positioning System (GPS), GLObal NAvigation Satellite System (GLONASS), Galileo global navigation system, BeiDou navigation system, other Global Navigation Satellite Systems (GNSS), Indian Regional Navigation Satellite System (IRNSS), Local Positioning Systems (LPS), Real-Time Location Systems (RTLS), Indoor Positioning System (IPS), Wi-Fi based positioning systems, cellular triangulation, and so forth. In some examples, information captured using positioning sensors 275 may be stored in memory units 210, may be processed by processing units 220, may be transmitted and/or received using communication modules 230, and so forth.

In some embodiments, a process may comprise one or more steps (also referred to as operations). In some examples, these processes, as well as all individual steps therein, may be performed by various aspects of end devices 110, server 120, computing device 140, computing device 200, and so forth. For example, a system comprising of at least one processor, such as processing units 220, may perform any of these processes as well as all individual steps therein, for example by processing units 220 executing software instructions stored within memory units 210. In some examples, these processes, as well as all individual steps therein, may be performed by a dedicated hardware. In some examples, computer readable medium, such as a non-transitory computer readable medium, may store data and/or computer implementable instructions for carrying out any of these processes as well as all individual steps therein. Some non-limiting examples of possible execution manners of a process may include continuous execution (for example, returning to the beginning of the process once the process normal execution ends), periodically execution, executing the process at selected times, execution upon the detection of a trigger (some non-limiting examples of such trigger may include a trigger from a user, a trigger from another process, a trigger from an external computing device, etc.), and so forth.

In some embodiments, machine learning algorithms (also referred to as machine learning models in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, Natural Language Processing (NLP) algorithms, support vector machines, random forests, nearest neighbors algorithms, deep learning algorithms, artificial neural network algorithms, convolutional neural network algorithms, recurrent neural network algorithms, linear machine learning models, non-linear machine learning models, ensemble algorithms, and so forth. For example, a trained machine learning algorithm may comprise an inference model, such as a predictive model, a classification model, a data regression model, a clustering model, a segmentation model, an artificial neural network (such as a deep neural network, a convolutional neural network, a recurrent neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters may be set manually by a person or automatically by an process external to the machine learning algorithm (such as a hyper parameter search algorithm), and the parameters of the machine learning algorithm may be set by the machine learning algorithm based on the training examples. In some implementations, the hyper-parameters may be set based on the training examples and the validation examples, and the parameters may be set based on the training examples and the selected hyper-parameters. For example, given the hyper-parameters, the parameters may be conditionally independent of the validation examples.

In some embodiments, trained machine learning algorithms (also referred to as machine learning models and trained machine learning models in the present disclosure) may be used to analyze inputs and generate outputs, for example in the cases described below. In some examples, a trained machine learning algorithm may be used as an inference model that when provided with an input generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a data regression model, the input may include a sample, and the inferred output may include an inferred value corresponding to the sample. In yet another example, a trained machine learning algorithm may include a clustering model, the input may include a sample, and the inferred output may include an assignment of the sample to at least one cluster. In an additional example, a trained machine learning algorithm may include a classification algorithm, the input may include an image, and the inferred output may include a classification of an item depicted in the image. In yet another example, a trained machine learning algorithm may include a data regression model, the input may include an image, and the inferred output may include an inferred value corresponding to an item depicted in the image (such as an estimated property of the item, such as size, volume, age of a person depicted in the image, cost of a product depicted in the image, and so forth). In an additional example, a trained machine learning algorithm may include an image segmentation model, the input may include an image, and the inferred output may include a segmentation of the image. In yet another example, a trained machine learning algorithm may include an object detector, the input may include an image, and the inferred output may include one or more detected objects in the image and/or one or more locations of objects within the image. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

In some embodiments, artificial neural networks may be configured to analyze inputs and generate corresponding outputs, for in the cases described herein. Some non-limiting examples of such artificial neural networks may comprise shallow artificial neural networks, deep artificial neural networks, feedback artificial neural networks, feed forward artificial neural networks, autoencoder artificial neural networks, probabilistic artificial neural networks, time delay artificial neural networks, convolutional artificial neural networks, recurrent artificial neural networks, long short term memory artificial neural networks, and so forth. In some examples, an artificial neural network may be configured manually. For example, a structure of the artificial neural network may be selected manually, a type of an artificial neuron of the artificial neural network may be selected manually, a parameter of the artificial neural network (such as a parameter of an artificial neuron of the artificial neural network) may be selected manually, and so forth. In some examples, an artificial neural network may be configured using a machine learning algorithm. For example, a user may select hyper-parameters for the an artificial neural network and/or the machine learning algorithm, and the machine learning algorithm may use the hyper-parameters and training examples to determine the parameters of the artificial neural network, for example using back propagation, using gradient descent, using stochastic gradient descent, using mini-batch gradient descent, and so forth. In some examples, an artificial neural network may be created from two or more other artificial neural networks by combining the two or more other artificial neural networks into a single artificial neural network.

In some embodiments, generative models may be configured to generate new content, such as textual content, visual content, auditory content, graphical content, and so forth. In some examples, generative models may generate new content without input. In other examples, generative models may generate new content based on an input. In one example, the new content may be fully determined from the input, where every usage of the generative model with the same input will produce the same new content. In another example, the new content may be associated with the input but not fully determined from the input, where every usage of the generative model with the same input may product a different new content that is associated with the input. In some examples, a generative model may be a result of training a machine learning generative algorithm with training examples. An example of such training example may include a sample input, together with a sample content associated with the sample input. Some non-limiting examples of such generative models may include Deep Generative Model (DGM), Generative Adversarial Network model (GAN), auto-regressive model, Variational AutoEncoder (VAE), transformers based generative model, artificial neural networks based generative model, hard-coded generative model, and so forth.

A Large Language Model (LLM) is a generative language model with a large number of parameters (usually billions or more) trained on large corpus of unlabeled data (usually trillions of words or more) in a self-supervised learning scheme and/or a semi-supervised learning scheme. While models trained using a supervised learning scheme with label data are fitted to the specific tasks they were trained for, LLM can handle wide range of tasks that the model was never specifically trained for, including ill-defined tasks. It is common to provide LLM with instructions in natural language, sometimes referred to as prompts. For example, to cause a LLM to count the number of people that objected to a proposed plan in a meeting, one might use the following prompt, 'Please read the meeting minutes. Of all the speakers in the meeting, please identify those who objected to the plan proposed by Mr. Smith at the beginning of the meeting. Please list their names, and count them.' Further, after receiving a response from the LLM, it is common to refine the task or to provide subsequent tasks in natural language. For example, 'Also count for each of these speakers the number of words said', 'Of these speakers, could you please identify who is the leader?' or 'Please summarize the main objections'. LLM may generate textual outputs in natural language, or in a desired structured format, such as a table or a formal language (such as a programming language, a digital file format, and so forth). In many cases, a LLM may be part of a multimodal foundation model, allowing the model to analyze both textual inputs as well as other kind of inputs (such as images, videos, audio, sensor data, telemetries, and so forth) and/or to generate both textual outputs as well as other kinds of outputs (such as images, videos, audio, telemetries, and so forth).

Some non-limiting examples of image data may include images, grayscale images, color images, 2D images, 3D images, videos, 2D videos, 3D videos, frames, footages, data derived from other image data, and so forth. In some embodiments, analyzing image data (for example by the methods, steps and modules described herein) may comprise analyzing the image data to obtain a preprocessed image data, and subsequently analyzing the image data and/or the preprocessed image data to obtain the desired outcome. One of ordinary skill in the art will recognize that the followings are examples, and that the image data may be preprocessed using other kinds of preprocessing methods. In some examples, the image data may be preprocessed by transforming the image data using a transformation function to obtain a transformed image data, and the preprocessed image data may comprise the transformed image data. For example, the transformed image data may comprise one or more convolutions of the image data. For example, the transformation function may comprise one or more image filters, such as low-pass filters, high-pass filters, band-pass filters, all-pass filters, and so forth. In some examples, the transformation function may comprise a nonlinear function. In some examples, the image data may be preprocessed by smoothing at least parts of the image data, for example using Gaussian convolution, using a median filter, and so forth. In some examples, the image data may be preprocessed to obtain a different representation of the image data. For example, the preprocessed image data may comprise: a representation of at least part of the image data in a frequency domain; a Discrete Fourier Transform of at least part of the image data; a Discrete Wavelet Transform of at least part of the image data; a time/frequency representation of at least part of the image data; a representation of at least part of the image data in a lower dimension; a lossy representation of at least part of the image data; a lossless representation of at least part of the image data; a time ordered series of any of the above; any combination of the above; and so forth. In some examples, the image data may be preprocessed to extract edges, and the preprocessed image data may comprise information based on and/or related to the extracted edges. In some examples, the image data may be preprocessed to extract image features from the image data. Some non-limiting examples of such image features may comprise information based on and/or related to: edges; corners; blobs; ridges; Scale Invariant Feature Transform (SIFT) features; temporal features; and so forth. In some examples, analyzing the image data may include calculating at least one convolution of at least a portion of the image data, and using the calculated at least one convolution to calculate at least one resulting value and/or to make determinations, identifications, recognitions, classifications, and so forth.

In some embodiments, analyzing image data (for example by the methods, steps and modules described herein) may comprise analyzing the image data and/or the preprocessed image data using one or more rules, functions, procedures, artificial neural networks, object detection algorithms, face detection algorithms, visual event detection algorithms, action detection algorithms, motion detection algorithms, background subtraction algorithms, inference models, and so forth. Some non-limiting examples of such inference models may include: an inference model preprogrammed manually; a classification model; a data regression model; a result of training algorithms, such as machine learning algorithms and/or deep learning algorithms, on training examples, where the training examples may include examples of data instances, and in some cases, a data instance may be labeled with a corresponding desired label and/or result; and so forth. In some embodiments, analyzing image data (for example by the methods, steps and modules described herein) may comprise analyzing pixels, voxels, point cloud, range data, etc. included in the image data.

A convolution may include a convolution of any dimension. A one-dimensional convolution is a function that transforms an original sequence of numbers to a transformed sequence of numbers. The one-dimensional convolution may be defined by a sequence of scalars. Each particular value in the transformed sequence of numbers may be determined by calculating a linear combination of values in a subsequence of the original sequence of numbers corresponding to the particular value. A result value of a calculated convolution may include any value in the transformed sequence of numbers. Likewise, an n-dimensional convolution is a function that transforms an original n-dimensional array to a transformed array. The n-dimensional convolution may be defined by an n-dimensional array of scalars (known as the kernel of the n-dimensional convolution). Each particular value in the transformed array may be determined by calculating a linear combination of values in an n-dimensional region of the original array corresponding to the particular value. A result value of a calculated convolution may include any value in the transformed array. In some examples, an image may comprise one or more components (such as color components, depth component, etc.), and each component may include a two dimensional array of pixel values. In one example, calculating a convolution of an image may include calculating a two dimensional convolution on one or more components of the image. In another example, calculating a convolution of an image may include stacking arrays from different components to create a three dimensional array, and calculating a three dimensional convolution on the resulting three dimensional array. In some examples, a video may comprise one or more components (such as color components, depth component, etc.), and each component may include a three dimensional array of pixel values (with two spatial axes and one temporal axis). In one example, calculating a convolution of a video may include calculating a three dimensional convolution on one or more components of the video. In another example, calculating a convolution of a video may include stacking arrays from different components to create a four dimensional array, and calculating a four dimensional convolution on the resulting four dimensional array. In some examples, audio data may comprise one or more channels, and each channel may include a stream or a one-dimensional array of values. In one example, calculating a convolution of audio data may include calculating a one dimensional convolution on one or more channels of the audio data. In another example, calculating a convolution of audio data may include stacking arrays from different channels to create a two dimensional array, and calculating a two dimensional convolution on the resulting two dimensional array.

In some examples, objects may be removed from a visual content (for example by the methods, steps and modules described herein). In one example, segmentation data (such as binary mask, alpha matte, probabilistic mask, etc.) of the object in a visual content may be obtained. For example, the segmentation data may be read from memory, received from an external computing device, received from a user, determined by analyzing the visual content (for example with an object segmentation algorithm), and so forth. Further, the segmentation data may be used to remove the object from the visual data, and the area previously depicting the object in the visual content may be filled, for example using inpainting algorithms, using interpolation algorithms, by stitching another object over it, and so forth. In some examples, an object may be inserted to a visual content (for example by the methods, steps and modules described herein). For example, visual matting algorithms may be used to insert the object to the visual content. In another example, the object may be stitched at a selected position in the visual content using a visual stitching algorithm. In some examples, an object may be moved in a visual content. For example, the object may be removed from its original position in the visual content (for example, as described above), and may be inserted to the visual content at a new position (for example, as described above), to create the visual motion of the object from the original position to the new position. In some examples, visual appearance of an object may be modified in a visual content. For example, the original depiction of the object may be removed from the visual content (for example, as described above), and a new depiction of the object may be inserted to the visual content (for example, as described above), to create the modification of the visual appearance of the object in the visual content.

It is to be understood that substantially visually similar includes visually identical. For example, two substantially visually similar visual contents may be identical visual contents, two substantially visually similar objects may be identical visual objects, and so forth. It is to be understood that substantially identical includes identical. For example, two substantially identical directions may be identical directions.

In many cases, contents (such as media contents, multimedia contents, visual contents, audible contents, textual contents, etc.) used to train a machine learning generative model (for example, as training, validation and/or testing examples) may be associated with different sources (for example, from different contributors, belong to different owners, captured or generated using different tools, and so forth). It may be important to determine contribution of specific visual contents, for example to understand the importance and/or efficiency of the different sources, for crediting, for acquisition and/or generation of new efficient contents for further training of the machine learning generative model, or for training of other machine learning models.

Figure 2C:
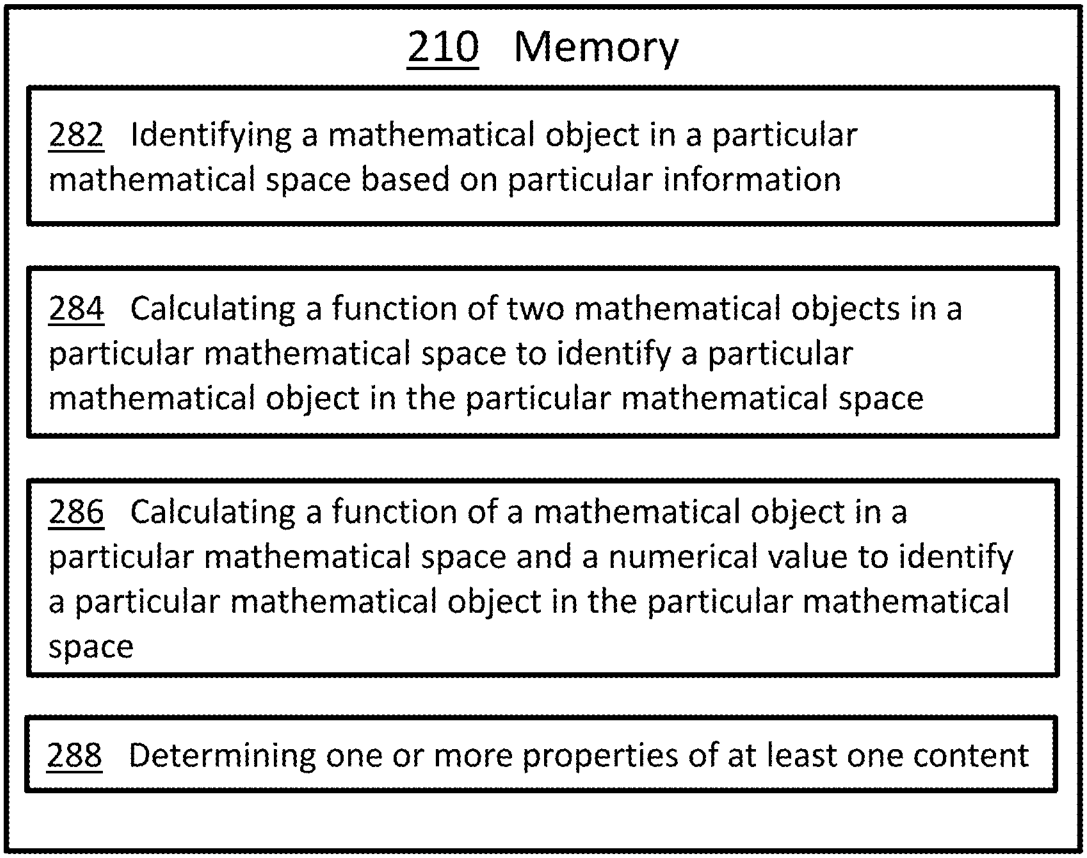
FIG. 2C is a simplified block diagram illustrating an exemplary embodiment of a memory containing software modules, consistent with some embodiments of the present disclosure.

FIG. 2C is a simplified block diagram illustrating an exemplary embodiment of a memory 210 containing software modules, consistent with some embodiments of the present disclosure. In this example, memory 210 contains software modules 282, 284, 286 and 288. In other examples, memory 210 may contain additional modules or fewer modules. The modules are described in more details below. In one example, at least one of these modules may include data and/or computer implementable instructions that when executed by at least one processor (such as processing units 220) may cause the at least one processor to perform operations for carrying out actions corresponding to at least one of these modules. Any one of these modules may be executed alone or in combination with other modules. In particular, any one of these modules may be used as a step in a method, for example as described below. Further, any step in the methods described below may be used independently of the method as a module. It is understood that herein any reference to a step may equally refer to a module and vice versa. In one example, a system may comprise at least one processing unit (such as processing units 220) configured to perform operations for carrying out actions corresponding to at least one of these modules.

In some examples, module 282 may comprise identifying a mathematical object in a particular mathematical space, for example based on particular information. Some non-limiting examples of such particular information may include content (such as visual content, audio content, textual content, multimedia content, etc.), input (such as visual input, audio input, textual input, etc.), properties of a textual input or a textual content, a textual content or a textual prompt, a word, information associated with a demographic requirement (such as a textual description of the demographic requirement, a group of numerical values associated with the demographic requirement, etc.), a visual content (such as an image or a video), audio content, and so forth. For example, a function or an injective function mapping information to mathematical object in the particular mathematical space may be used based on the particular information to obtain the mathematical object. For example, the information may include a word, and a word2vec or a Global Vectors for Word Representation (GloVe) algorithm may be used to obtain the function. In this example, the mathematical object may correspond to the word. In another example, the information may include an utterance (such as a word, a sequence of words, a phrase, a sentence, a paragraph, etc.), and a text embedding algorithm may be used to obtain the function. In this example, the mathematical object may correspond to the utterance. In an additional example, a dimensionality reduction algorithm may be used to analyze the particular information and obtain the mathematical object. In yet another example, the mathematical object may be determined based on a relation of the particular information to other objects. In some examples, a correlation matrix may express relations among a group of objects, and a kernel method or a matrix decomposition method may be used to obtain mathematical objects corresponding to the objects in the particular mathematical space. In one example, the particular information may be the correlation matrix. In another example, each object may be associated with respective information, a particular object may be associated with the particular information, and the correlation matrix may be calculated using the information associated with the object, for example using a pairwise function. In some examples, the particular information may be or include the mathematical object, and module 282 may simply access the particular information to obtain the mathematical object. In another example, the particular information may be or include a numerical value, and module 282 may calculate a function of the numerical value to obtain the mathematical object. Some non-limiting examples of such function may include a linear function, a non-linear function, a polynomial function, an exponential function, a logarithmic function, a continuous function, a discontinuous function, and so forth. In some examples, the particular information may be or include at least one sentence in a natural language, and module 282 may use a text embedding algorithm to obtain the mathematical object. In some examples, module 282 may use a machine learning model to analyze the particular information to determine the mathematical object. The machine learning model may be a machine learning model trained using training examples to determine mathematical objects based on information. An example of such training example may include sample information, together with a label indicative of a mathematical object.

Some non-limiting examples of a mathematical object in a mathematical space may include a mathematical point in the mathematical space, a group of mathematical points in the mathematical space (such as a region, a manifold, a mathematical subspace, etc.), a mathematical shape in the mathematical space, a numerical value, a vector, a matrix, a tensor, a function, and so forth. Another non-limiting example of a mathematical object is a vector, wherein the dimension of the vector may be at least two (for example, exactly two, exactly three, more than three, and so forth). Some non-limiting examples of a phrase may include a phrase of at least two words, a phrase of at least three words, a phrase of at least five words, a phrase of more than ten words, and so forth.

In some examples, module 284 may comprise calculating a function of two mathematical objects in a particular mathematical space to obtain a particular mathematical object in the particular mathematical space. In one example, module 284 may comprise calculating a function of a plurality of mathematical objects (such as two mathematical objects, three mathematical objects, four mathematical objects, more than four mathematical objects, etc.) in a particular mathematical space to obtain a particular mathematical object in the particular mathematical space. In some examples, module 286 may comprise calculating a function of at least one mathematical object (such as a single mathematical object, two mathematical objects, three mathematical objects, four mathematical objects, more than four mathematical objects, etc.) in a particular mathematical space and/or at least one numerical value (such as a single numerical value, two numerical values, three numerical values, four numerical values, more than four numerical values, etc.) to obtain a particular mathematical object in the particular mathematical space. Some non-limiting examples of such function may include a linear function, a non-linear function, a polynomial function, an exponential function, a logarithmic function, a continuous function, a discontinuous function, and so forth.

In some examples, module 288 may comprise determining one or more properties of at least one content. In some examples, the at least one content may be at least one content generated by analyzing an input using a generative model, and module 288 may analyze the input to determine the one or more properties of the at least one content. For example, the input may be an input in a natural language describing a desired characteristic of the at least one content, module 288 may use NLP algorithms to analyze the input and determine the desired characteristic, and may determine the one or more properties of the at least one content based on the determined desired characteristic. In some examples, module 288 may analyze the at least one content to determine the one or more properties of the at least one content. In some examples, a machine learning model may be trained using training examples to determine properties of contents. An example of such training example may include a sample content, together with a label indicating one or more properties of the sample content. Module 288 may use the machine learning model to analyze the at least one content and determine the one or more properties of the at least one content. In some examples, module 288 may use an artificial neural network to analyze the at least one content and determine the one or more properties of the at least one content. In some examples, a data-structure may associate contents with properties, and module 288 may access the data-structure based on the at least one content to determine the one or more properties of the at least one content. In some examples, the at least one content may be an image or a video, and module 288 may calculate a function of pixel values associated with the at least one content to thereby determine the one or more properties of the at least one content. Some non-limiting examples of such function may include a linear function, a non-linear function, an exponential function, a polynomial function, a logarithmic function, and so forth. In some examples, module 288 may calculate a convolution of at least part of the at least one content to thereby obtain a result value of the calculated convolution of the at least part of the at least one content, and may base the determination of the one or more properties of the at least one content on the result value of the calculated convolution of the at least part of the at least one content. For example, when the result value is a first value, first values for the one or more properties may be determined, and when the result value is a second value, second values for the one or more properties may be determined. In some examples, the at least one content may be at least one content generated using a generative model, module 288 may base the determination of the one or more properties of the at least one content on an intermediate result of the generative model when generating the at least one content. For example, the generative model may contain steps or layers, where output numerical values of one step or layer may be used as inputs to the next, and the intermediate result may include at least part of these numerical values. For example, the one or more properties of the at least one content may be or include the intermediate result and/or a function of the intermediate result. Some non-limiting examples of such function may include a linear function, a non-linear function, a polynomial function, an exponential function, a logarithmic function, a continuous function, a discontinuous function, and so forth.

In some examples, a representation of an object or an event in at least one content may be a visual representation (for example, a depiction of the object or the event in an image or a video), may be an audible representation (for example, sounds emitted by the object or the event, speech describing or indicating the object or the event, etc.), may be a textual representation (for example, text in a natural language describing or indicating the object or the event), and so forth. In some examples, module 288 may base the determination of the one or more properties of the at least one content on a representation of a particular object in the at least one content. For example, the one or more properties of the at least one content may be or include at least one of a size associated with the representation of the particular object, a length associated with the representation of the particular object, a spatial orientation associated with the representation of the particular object, a spatial location associated with the representation of the particular object, a temporal location associated with the representation of the particular object, a visual property of the representation of the particular object, an audible property of the representation of the particular object, a linguistic property of the representation of the particular object, a function of any of the above, and so forth. Some non-limiting examples of such function may include a linear function, a non-linear function, a polynomial function, an exponential function, a logarithmic function, a continuous function, a discontinuous function, and so forth. In some examples, module 288 may base the determination of the one or more properties of the at least one content on a spatial relation between a representation of a first particular object and a representation of a second particular object in the at least one content. For example, the spatial relation may be a relation between spatial orientations of the representations of the two objects (such as an angle), may be a distance between the representations of the two objects (for example, in pixels, in real world units, etc.), may be a relation between sizes of the representations of the two objects, may be a relation between intensities associated with the representations of the two objects (such as brightness, loudness, etc.), a function of any of the above, and so forth. Some non-limiting examples of such function may include a linear function, a non-linear function, a polynomial function, an exponential function, a logarithmic function, a continuous function, a discontinuous function, and so forth. In some examples, module 288 may base the determination of the one or more properties of the at least one content on a representation of a particular event in the at least one content. For example, the one or more properties of the at least one content may be or include at least one of a duration associated with the representation of the particular event, an extent associated with the representation of the particular event, an intensity associated with the representation of the particular event (such as a maximal intensity, a minimal intensity, a mean intensity, a median intensity, etc.), a function of any of the above, and so forth. Some non-limiting examples of such function may include a linear function, a non-linear function, a polynomial function, an exponential function, a logarithmic function, a continuous function, a discontinuous function, and so forth. In some examples, module 288 may base the determination of the one or more properties of the at least one content on a temporal relation between a representation of a first particular event and a representation of a second particular event in the at least one content. For example, the one or more properties of the at least one content may be or include at least one of a relation between durations associated with the representations of the two events, a temporal gap between the representations of the two events, a relation between intensities associated with the representations of the two events, a function of any of the above, and so forth. Some non-limiting examples of such function may include a linear function, a non-linear function, a polynomial function, an exponential function, a logarithmic function, a continuous function, a discontinuous function, and so forth.

Figure 3A:
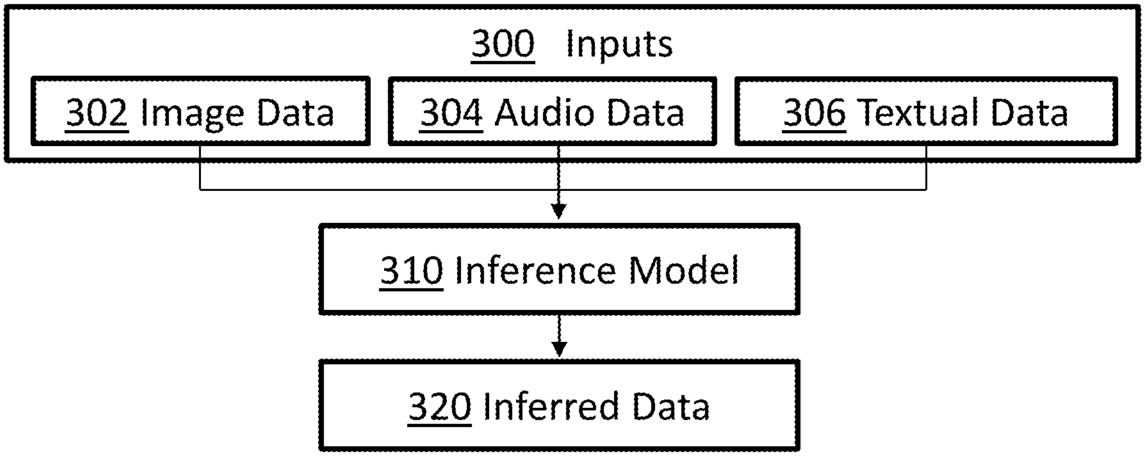
FIGS. 3A and 3B are simplified block diagrams illustrating some possible flows of information, consistent with some embodiments of the present disclosure.
Figure 3B:
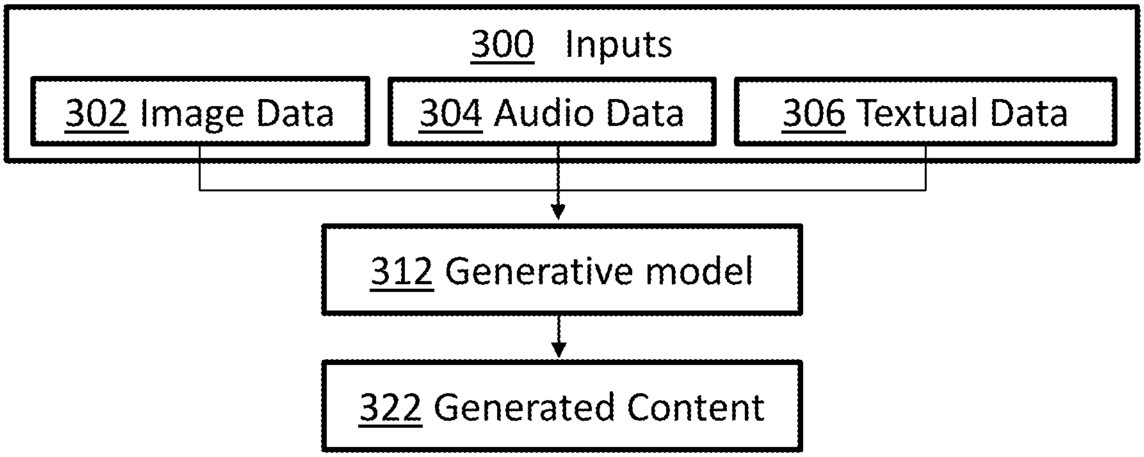

FIGS. 3A and 3B are simplified block diagrams illustrating some possible flows of information, consistent with some embodiments of the present disclosure. In these examples, inputs 300 may comprise at least one of image data 302, audio data 304 or textual data 306. In other examples, the inputs 300 may include any other type of information. In one example, inputs 300 may comprise information encoded in a digital format and/or in a digital signal. Some non-limiting examples of image data 302 and of analysis of such image data are described above. Some non-limiting examples of audio data 304 and of analysis of such audio data are described above. In some examples, textual data 306 may include any textual information, such as textual content in a natural language, source code, formatted text records, and so forth. For example, textual data 306 may include an encoding of textual content in digital format, an encoding of textual content in analog format, a hardcopy, and so forth. In the examples of FIGS. 3A and 3B, any one of inputs 300, alone or in combination, may be analyzed or otherwise used. In the example of FIG. 3A, inference model 310 may analyze any one of inputs 300, alone or in combination, to determine inferred data 320. For example, inference model 310 may be a classification model, and inferred data 320 may be a classification of the input to inference model 310 to at least one of a plurality of predetermined categories. In another example, inference model 310 may be a data regression model, and inferred data 320 may be a value (for example, a numerical value). In yet another example, inference model 310 may be a generative model 312, and inferred data 320 may be generated content 322, as illustrated in FIG. 3B. Some non-limited examples of such generated content 322 may include a generated visual content (such as a generated image, a generated video, etc.), a generated audio content (such as a digital audio file, a mono audio stream, a stereo audio stream, a surround audio stream, etc.), a generated textual content, and so forth. In an additional example, inference model 310 may be a trained machine learning model (that is, a result of training a machine learning algorithm as described above). In some examples, an inference model, such as inference model 310 or the inference model described below, may include one or more parameters. Some non-limiting examples of such parameters may include a coefficient, a threshold, an artificial neuron, a weight, and so forth.

Figure 3C:
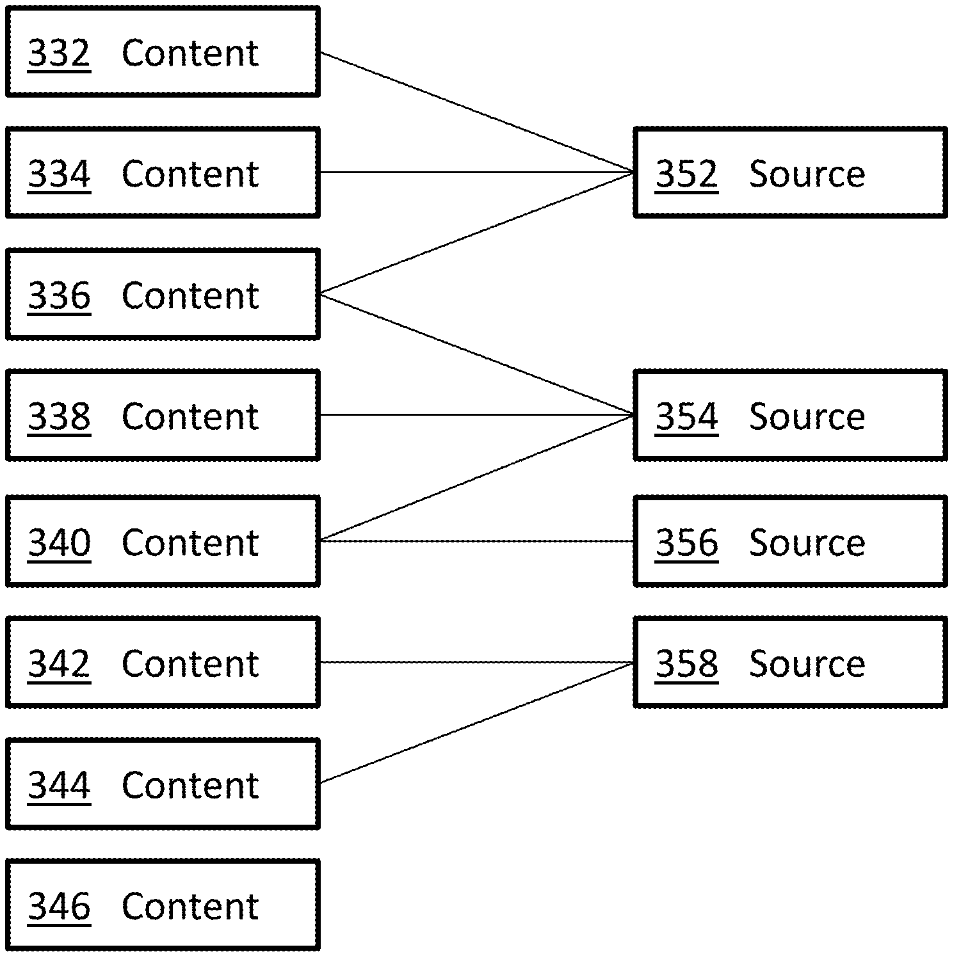
FIG. 3C is a simplified block diagram illustrating associations of contents with sources, consistent with some embodiments of the present disclosure.

FIG. 3C is a simplified block diagram illustrating associations of contents with sources, consistent with some embodiments of the present disclosure. In this example, contents 332 and 334 are associated with source 352, content 336 is associated with sources 352 and 354, content 338 is associated with source 354, content 340 is associated with sources 354 and 356, contents 342 and 344 are associated with source 358, and content 346 is not associated with any source. In some examples, each content may be included in one or more respective training examples. In some examples, each source may be associated with a respective data-record. In one example, a content may be associated with a source that produced the content, such as a human source (such as a journalist, a blogger, an author, a content creator, a graphic designer, a public speaker, an artist, a photographer, etc.), an artificial source (such as a chatbot, a generative model, a translation tool, a speech synthesis algorithm, etc.), and so forth. In one example, a content may be associated with a source that provided the content (for example, an aggregator, a data broker, a mediator, etc.). In one example, a content may be associated with a source that owns the content. In one example, a content may be associated with no source, may be associated with a single source, may be associated with two sources, may be associated with three or more sources, and so forth.

Figure 4A:
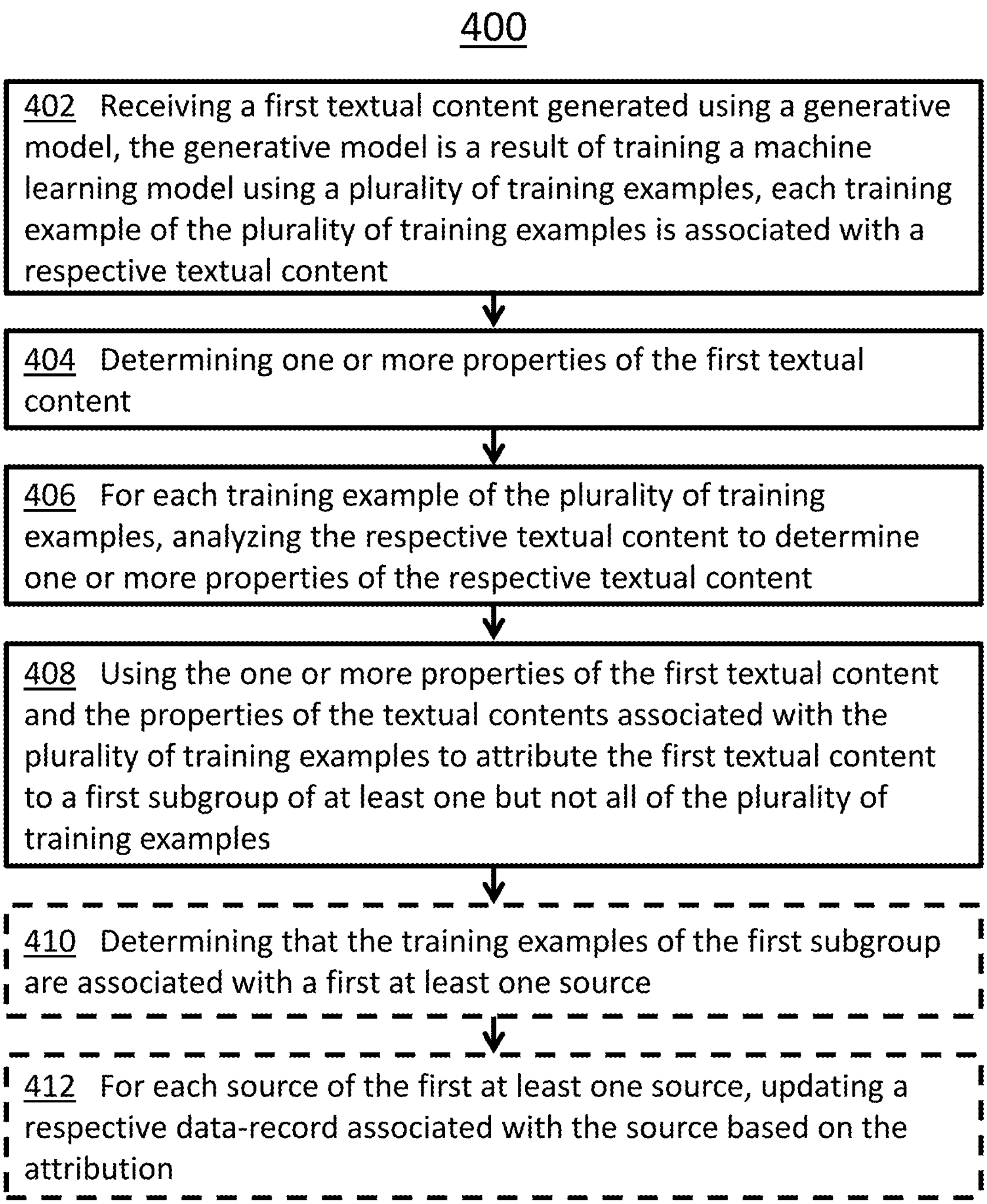
FIG. 4A is a flowchart of an example process for attributing generated textual contents to training examples, consistent with some embodiments of the present disclosure.

FIG. 4A is a flowchart of an example process 400 for attributing generated textual contents to training examples, consistent with some embodiments of the present disclosure. In this example, process 400 may comprise receiving a first textual content generated using a generative model (step 402), the generative model is a result of training a machine learning model using a plurality of training examples, each training example of the plurality of training examples is associated with a respective textual content; determining one or more properties of the first textual content (step 404); for each training example of the plurality of training examples, analyzing the respective textual content to determine one or more properties of the respective textual content (step 406); and using the one or more properties of the first textual content and the properties of the textual contents associated with the plurality of training examples to attribute the first textual content to a first subgroup of at least one but not all of the plurality of training examples (step 408). In one example, process 400 may further comprise determining that the training examples of the first subgroup are associated with a first at least one source (step 410); and for each source of the first at least one source, updating a respective data-record associated with the source based on the attribution (step 412). In other examples, process 400 may include additional steps or fewer steps. In other examples, one or more steps of process 400 may be executed in a different order and/or one or more groups of steps may be executed simultaneously. In some examples, a system for attributing generated textual contents to training examples may include at least one processing unit configured to perform process 400. In some examples, a method for attributing generated textual contents to training examples may include performing process 400. In some examples, a non-transitory computer readable medium may store computer implementable instructions that when executed by at least one processor cause the at least one processor to perform operations for attributing generated textual contents to training examples, and the operations may include the steps of process 400.

In some examples, step 402 may comprise receiving a first textual content generated using a generative model. The generative model may be a result of training a machine learning model using a plurality of training examples. Each training example of the plurality of training examples may be associated with a respective textual content. In one example, the generative model may be a result of training the machine learning algorithm using the plurality of training examples and one or more additional training examples. Receiving the first textual content, for example by Step 402, may comprise reading the first textual content from a digital memory, may comprise receiving the first textual content from an external computing device (for example using a digital communication device), may comprise receiving the first textual content from the generative model, may comprise using the generative model to generate the first textual content, and so forth. In one example, the first textual content may include or be a text in a natural language. In another example, the first textual content may include or be a text in a formal language. In yet another example, the first textual content may include or be a random string of characters. In one example, the textual content associated with a particular training example of the plurality of training example may include or be a text in a natural language. In another example, the textual content associated with a particular training example of the plurality of training example may include or be a text in a formal language. In yet another example, the textual content associated with a particular training example of the plurality of training example may include or be a random string of characters.

In some examples, one or more properties of a textual content may be determined. For example, step 404 may comprise determining one or more properties of the first textual content received by step 402. In another example, step 406 may comprise, for each training example of the plurality of training examples (of step 402), determining one or more properties of the respective textual content. In one example, the one or more properties of the textual content may be determined using module 288. In one example, the textual content may be analyzed to determine the one or more properties of the textual content. In some examples, a trained machine learning model may be used to analyze the textual content and determine the one or more properties of the textual content. The machine learning model may be a machine learning model trained using training examples to determine properties of textual contents. An example of such training example may include a sample textual content, together with a label indicative of one or more properties of the sample textual content. In some examples, a data-structure may associate textual contents with properties, and the data-structure may be accessed based on the textual content to determine the one or more properties of the textual content. In some examples, an artificial neural network may be used to analyze the textual content to determine the one or more properties of the textual content. In some examples, an NLP algorithm may be used to analyze the textual content to determine the one or more properties of the textual content. In some examples, the textual content may include one or more utterances (such as words, sequences of words, phrases, sentences, paragraphs, etc.) Further, for each utterance of the one or more utterances, a respective mathematical object in a particular mathematical space may be identified (for example, using module 282). Further, the one or more properties of the textual content may be determined based on the identified mathematical objects. For example, a function of the identified mathematical objects may be calculated (for example, using module 284) to obtain a particular mathematical object in the particular mathematical space, and the one or more properties of the textual content may be determined based on the particular mathematical object. In some examples, the one or more properties of the textual content (such as the one or more properties of the first textual content determined by step 404, the one or more properties of a textual content associated with a training example and determined by step 406, etc.) may be one or more properties of a selected aspect of the textual content. In one example, the selected aspect may be a language register used in the textual content. In another example, the selected aspect may be a style associated with the textual content. In yet another example, the selected aspect may be a vocabulary associated with the textual content. Some other non-limiting examples of such selected aspect may include length, font, grammatical complexity, word frequency, domain, topic, theme, organization, tone, and so forth. In some examples, a first mathematical object in a mathematical space corresponding to a first utterance in the textual content may be identified (for example, using module 282), a second mathematical object in the mathematical space corresponding to a second utterance in the textual content may be identified (for example, using module 282), a function of the first mathematical object and the second mathematical object may be calculated to obtain a third mathematical object in the mathematical space (for example, using module 284), and the determination of the one or more properties of the textual content may be based on the third mathematical object. For example, the one or more properties may include a value calculated by calculating a function of the third mathematical object. In another example, when the third mathematical object is included in a selected region of the mathematical space, the one or more properties may include a first value, and/or when the third mathematical object is not included in the selected region, the one or more properties may not include the first value. In some examples, the textual content may be analyzed to detect at least a first utterance and a second utterance included in the textual content (for example, using an NLP algorithm), and the determination of the one or more properties of the first textual content may be based on a location of the first utterance in the textual content and on a location of the second utterance in the textual content. For example, when the two utterances are adjacent to each other, the one or more properties may include a first value, and/or when the two utterances are not adjacent, the one or more properties may not include the first value. In another example, when the first utterance comes before the second utterance in the textual content, the one or more properties may include a first value, and/or when the second utterance comes before the first utterance in the textual content, the one or more properties may not include the first value. In some examples, the textual content to identify an utterance included in the textual content (for example, using an NLP algorithm), and the determination of the one or more properties of the textual content on a type of the utterance. For example, the one or more properties may include or be based on the type of the utterance (such as declarative, interrogative, imperative, exclamatory, greeting, request, apology, complaint, suggestion, confirmation, and so forth). In some examples, the textual content may include a plurality of nouns, each noun of the plurality of nouns may be adjacent to a respective adjective in the textual content, a particular adjective of the plurality of adjectives may be selected based on the respective noun adjacent to the particular adjective (for example, based on a type of the respective noun, based on an inclusion of the respective noun in a selected group of nouns, etc.), and a property based on the selected particular adjective may be included in the one or more properties of the textual content. For example, the property may be the selected particular adjective, may be a mathematical object identified by module 282 based on the selected particular adjective, and so forth. In some examples, wherein the textual content may include a plurality of verbs, each verb of the plurality of verbs may be adjacent to a respective adverb in the textual content, a particular adverb of the plurality of adverbs may be selected based on the respective verb adjacent to the particular adverb (for example, based on a type of the respective verb, based on an inclusion of the respective verb in a selected group of verbs, etc.), and a property based on the selected particular adverb may be included in the one or more properties of the textual content. For example, the property may be the selected particular adverb, may be a mathematical object identified by module 282 based on the selected particular adverb, and so forth.

In some examples, Step 404 may base the determination of the one or more properties of the first textual content on an intermediate result of the generative model when generating the first textual content. For example, the generative model may contain steps or layers, where output numerical values of one step or layer may be used as inputs to the next, and the intermediate result may include at least part of these numerical values. In some examples, the training of the machine learning model to obtain the generative model may include an iterative process, wherein in each iteration of the iterative process, a respective training example of the plurality of training examples may be analyzed and a loss function may be updated. Further, step 406 may base the one or more properties of the textual content associated with a particular training example on the update to the loss function in a particular iteration of the iterative process that includes the analysis of the particular training example. For example, when the update to the loss function is above a selected threshold, Step 406 may select first values for the one or more properties, and when the update to the loss function is below a selected threshold, Step 406 may select second values for the one or more properties. The second values may differ from the first values.

In some examples, step 408 may comprise using the one or more properties of the first textual content (determined by step 404) and the properties of the textual contents associated with the plurality of training examples (determined by step 406) to attribute the first textual content to a first subgroup of at least one but not all of the plurality of training examples (of step 402). In one example, for each training example in the plurality of training examples, similarity between the one or more properties of the first textual content and the respective one or more properties of the respective textual content associated with the training example may be determined, for example using a similarity function, and Step 408 may determine whether to include the training example in the first subgroup based on the determined similarity. For example, when the similarity is higher than a selected threshold, Step 408 may include the training example in the first subgroup, and when the similarity is lower than a selected threshold, Step 408 may exclude the training example from the first subgroup. Some non-limiting examples of such similarity function may include a similarity function based on distance, a similarity function based on correlation, a linear similarity function, a non-linear similarity function, an exponential similarity function, and so forth. In one example, a classification machine learning model may be trained using training examples to classify a textual content as attributed to or not attributed to training examples based on the properties. An example of such training example may include sample properties of a first sample textual content and sample properties of a second sample textual content, together with a label indicating whether the first sample textual content is attributed to a training example associated with the second sample textual content. Step 408 may use the trained classification machine learning model to determine, for each training example in the plurality of training examples, whether to include the training example in the first subgroup.

In some examples, step 408 may further comprise, for each training example of the first subgroup, using the one or more properties of the first textual content and the one or more properties of the respective textual content to determine a respective degree of attribution of the first textual content to the respective training example. For example, a regression machine learning model may be trained using training examples to determine degrees of attributions of textual contents to training examples based on the properties. An example of such training example may include sample properties of a first sample textual content and sample properties of a second sample textual content, together with a label indicating a degree of attribution of the first sample textual content to a training example associated with the second sample textual content. Step 408 may use the trained regression machine learning model to analyze, for each training example of the first subgroup, the properties associated of the first textual content and the properties of the textual content associated with the training example to determine a degree of attribution of the first textual content to the training example. In another example, Step 408 may use an artificial neural network to analyze, for each training example of the first subgroup, the properties associated of the first textual content and the properties of the textual content associated with the training example to determine a degree of attribution of the first textual content to the training example.

In some examples, the training of the machine learning model to obtain the generative model (of step 402) may include a first training step and a second training step. The first training step may use a second subgroup of the plurality of training examples of step 402 to obtain an intermediate model. The second training step may use a third subgroup of the plurality of training examples of step 402 to obtain the generative model and/or may use the intermediate model for initialization. The second subgroup may differ from the third subgroup. Further, step 408 may compare a result associated with the intermediate model with a result associated with the generative model. For example, the first textual content may be generated by using the generative model with a specific input (such as a specific prompt, a specific sketch, etc.), and step 408 may compare a result associated with the intermediate model with the specific input with the first textual input. Further, step 408 may, for each training example of the third subgroup, determining whether to attribute the first textual content to the respective training example based on a result of the comparison. For example, when the two results are identical, step 408 may not attribute the first textual content to any training example of the third subgroup. In another example, when the two results differ in a specific aspect, step 408 may attribute the first textual content to training examples of the third subgroup that are associated with the specific aspect.

In some examples, step 408 may use the one or more properties of the first textual content (determined by step 404) to embed the first textual content in a mathematical space, for example using module 282, using a dimensional reduction algorithm, using an embedding algorithm, and so forth. Further, step 408 may, for each training example of the plurality of training examples, use the one or more properties of the respective textual content (determined by step 406) to embed the respective textual content associated with the training example in the mathematical space, for example using module 282, using a dimensional reduction algorithm, using an embedding algorithm, and so forth. Further, step 408 may use the mathematical space to select the first subgroup of at least one but not all of the plurality of training examples. For example, a region of the mathematical space may be selected based on the embedding of the first textual content, and step 408 may include a training example in the first subgroup training examples if and only if the respective embedding of the respective textual content associated the training example is in the selected region.

In some examples, step 410 may comprise determining that the training examples of the first subgroup of step 408 are associated with at least one source. For example, Step 410 may access a data-structure associating training examples with sources based on the training examples of the first subgroup to identify sources associated with the training examples of the first subgroup and thereby determine the at least one source. In another example, Step 410 may analyze the at least one textual content associated with the training examples of the first subgroup to identify sources associated with the training examples of the first subgroup and thereby determine the first at least one source. For example, a textual content may include a signature of an artist, and the analysis of the textual content may detect the signature to identify the artist and thereby identify a source.

In some examples, step 412 may comprise, for each source of the at least one source of step 410, updating a respective data-record associated with the source based on the attribution. For example, the data-record may be stored in a memory (such as a digital memory), and step 412 may update data associated with the data-record in the memory. In another example, the data-record may be maintained by an external computing device, and step 412 may transmit information to the external computing device (for example, using a digital communication device) to cause the external computing device to update the data-record. In yet another example, the data-record may include data in a database, and step 412 may update the data in the database. In one example, step 412 may update the data-record to record the attribution. In one example, step 412 may update the data-record to include an encoding (such as a digital encoding) of information associated with at least one of the attribution, the first textual content received by step 402, the one or more properties of the first textual content determined by step 404, the first subgroup of step 408, or the at least one textual content associated with the first subgroup of step 408. In some examples, step 412 may, for each source of the at least one source, further base the update to the respective data-record associated with the source on respective at least one of the determined degrees determined by step 408. For example, the degree of attribution may be a number in a range of numbers, may be a discrete value, may be a level (such as 'high', 'medium' and 'low'), and so forth. In one example, the degree of attribution associated with the source may be recorded in the data-record. In another example, a value in the data-record may be updated to a new value determined by calculating a function of the value and the degree of attribution associated with the source. Some non-limiting examples of such function may include a linear function, a non-linear function, an exponential function, a polynomial function, a logarithmic function, and so forth. In some examples, a value in the data-record may represent a credit associated with the source, and step 412 may update the credit associated with the source (and therefore the value in the data-record) based on the attribution and/or the degree of attribution.

In some examples, a data-structure associating training examples with amounts may be accessed. For example, the data-structure may be stored in a digital memory, and accessing the data-structure may include accessing the digital memory. In another example, the data-structure may be maintained by an external computing device, and accessing the data-structure may include communicating with the external computing device (for example, using a digital communication device). Further, the data-structure may be used to determine that the training examples of the first subgroup determined by step 410 are associated with a first total amount. For example, by summing or calculating a different function of the amounts associated with the training examples of the first subgroup in the data-structure. Some non-limiting examples of such function may include a linear function, a non-linear function, an exponential function, a polynomial function, a logarithmic function, and so forth. In some examples, step 412 may further base the update to a particular data-record associated with a particular source of the at least one source on the first total amount.

Figure 4B:
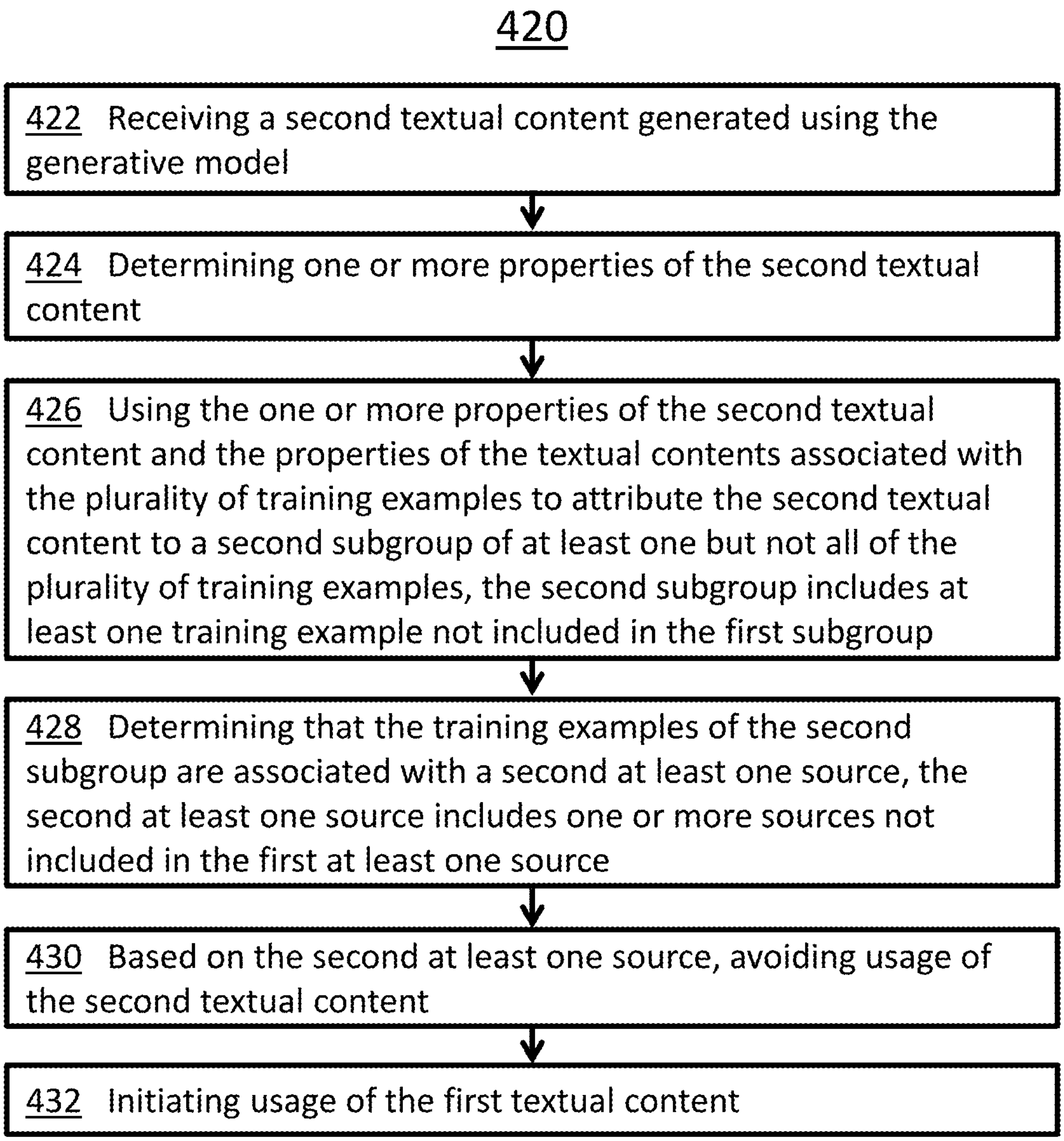
FIG. 4B is a flowchart of an example process for attributing generated textual contents to training examples and selecting textual content for specific usage based on the attribution, consistent with some embodiments of the present disclosure.

FIG. 4B is a flowchart of an example process 420 for attributing generated textual contents to training examples and selecting textual content for specific usage based on the attribution, consistent with some embodiments of the present disclosure. In this example, process 420 may comprise receiving a second textual content generated using the generative model of step 402 (step 422), for example as described above in relation to step 402 and the first textual content; determining one or more properties of the second textual content (step 424), for example as described above in relation to step 404 and the first textual content; using the one or more properties of the second textual content and the properties of the textual contents associated with the plurality of training examples determined by step 406 to attribute the second textual content to a second subgroup of at least one but not all of the plurality of training examples (step 426), wherein the second subgroup may include at least one training example not included in the first subgroup of step 408, for example as described above in relation to step 408, the first textual content and the first subgroup; determining that the training examples of the second subgroup are associated with a second at least one source (step 428), wherein the second at least one source may include one or more sources not included in the first at least one source, for example as described above in relation to step 410, the first subgroup and the first at least one source; based on the second at least one source, avoiding usage of the second textual content (step 430); and initiating usage of the first textual content (step 432). In other examples, process 420 may include additional steps or fewer steps. In other examples, one or more steps of process 420 may be executed in a different order and/or one or more groups of steps may be executed simultaneously. In some examples, a system for attributing generated textual contents to training examples and selecting textual content for specific usage based on the attribution may include at least one processing unit configured to perform process 420. In some examples, a method for attributing generated textual contents to training examples and selecting textual content for specific usage based on the attribution may include performing process 420. In some examples, a non-transitory computer readable medium may store computer implementable instructions that when executed by at least one processor cause the at least one processor to perform operations for attributing generated textual contents to training examples and selecting textual content for specific usage based on the attribution, and the operations may include the steps of process 420.

In some examples, step 430 may comprise, based on the second at least one source, avoiding usage of the second textual content received by step 422. For example, avoiding the usage may include avoiding storing specific digital information that when stored cause a usage of the second textual content by another process. In another example, avoiding the usage may include avoiding transmission of a specific digital signal to an external computing device, the specific digital signal causes, when transmitted to the external computing device, the external computing device to use the second textual content. In yet another example, avoiding the usage may include avoiding presentation of the second textual content. In an additional example, avoiding the usage may include avoiding insertion of the second textual content to a publication. In one example, Step 430 may avoid usage of the second textual content in response to one or more sources of the second at least one source being included in a selected group of sources. In an additional example, Step 430 may avoid usage of the second textual content in response on a cost associated with the second textual content based on the second at least one source. In yet another example, Step 430 may avoid usage of the second textual content in response to a cost associated with the second textual content based on the second at least one source is higher than a cost associated with the first textual content based on the first at least one source. For example, Step 430 may determine a cost associated with the first textual content based on the first at least one source, may determine a cost associated with the second textual content based on the second at least one source, and may compare the determined cost associated with the first textual content with the determined cost associated with the second textual content. In one example, Step 430 may determine to avoid usage of the second textual content based on a result of the comparison. In one example, Step 432 may determine to initiating usage of the first textual content based on a result of the comparison.

In some examples, step 432 may comprise initiating usage of the first textual content received by step 402. For example, digital information may be stored in a memory to cause a usage of the first textual content by another process. In another example, digital signal may be transmitted to an external computing device (for example, using a digital communication device) to cause the external computing device to use the first textual content. In yet another example, the first textual content may be presented to an individual, for example via a user interface. In an additional example, the first textual content may be included in a publication, may be included in a website, may be included in a user interface, and so forth.

Figure 4C:
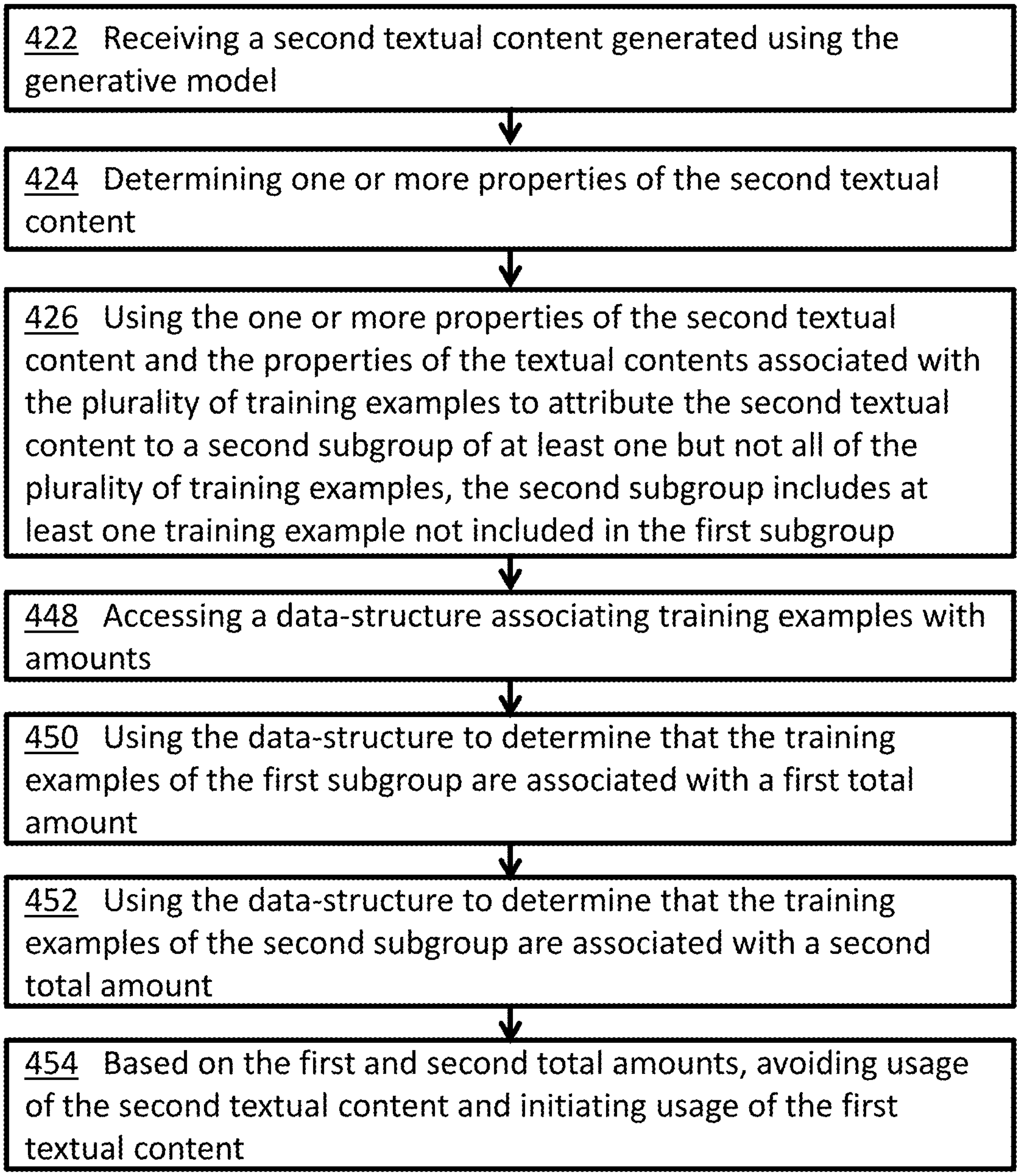
FIG. 4C is a flowchart of an example process for attributing generated textual contents to training examples and selecting textual content for specific usage based on the attribution, consistent with some embodiments of the present disclosure.

FIG. 4C is a flowchart of an example process 440 for attributing generated textual contents to training examples and selecting textual content for specific usage based on the attribution, consistent with some embodiments of the present disclosure. In this example, process 440 may comprise receiving a second textual content generated using the generative model of step 402 (step 422), for example as described above in relation to step 402 and the first textual content; determining one or more properties of the second textual content (step 424), for example as described above in relation to step 404 and the first textual content; using the one or more properties of the second textual content and the properties of the textual contents associated with the plurality of training examples determined by step 406 to attribute the second textual content to a second subgroup of at least one but not all of the plurality of training examples (step 426), wherein the second subgroup may include at least one training example not included in the first subgroup of step 408, for example as described above in relation to step 408, the first textual content and the first subgroup; accessing a data-structure associating training examples with amounts (step 448); using the data-structure to determine that the training examples of the first subgroup are associated with a first total amount (step 450); using the data-structure to determine that the training examples of the second subgroup are associated with a second total amount (step 452); and, based on the first and second total amounts, avoiding usage of the second textual content and initiating usage of the first textual content (step 454), for example as described above in relation to step 430 and/or step 432. In other examples, process 440 may include additional steps or fewer steps. In other examples, one or more steps of process 440 may be executed in a different order and/or one or more groups of steps may be executed simultaneously. In some examples, a system for attributing generated textual contents to training examples and selecting textual content for specific usage based on the attribution may include at least one processing unit configured to perform process 440. In some examples, a method for attributing generated textual contents to training examples and selecting textual content for specific usage based on the attribution may include performing process 440. In some examples, a non-transitory computer readable medium may store computer implementable instructions that when executed by at least one processor cause the at least one processor to perform operations for attributing generated textual contents to training examples and selecting textual content for specific usage based on the attribution, and the operations may include the steps of process 440.

In some examples, step 448 may comprise accessing a data-structure associating training examples with amounts. For example, the data-structure may be stored in a digital memory, and step 448 may access the data-structure by accessing the digital memory. In another example, the data-structure may be maintained by an external computing device, and step 448 may access the data-structure by communicating with the external computing device (for example, using a digital communication device).

In some examples, the data-structure accessed by step 448 may be used to determine that the training examples of a selected subgroup are associated with a total amount. For example, step 450 may use the data-structure to determine that the training examples of the first subgroup are associated with a first total amount. In another example, step 452 may use the data-structure to determine that the training examples of the second subgroup are associated with a second total amount. For example, the determining that the training examples of the selected subgroup are associated with the total amount may include summing or calculating a different function of the amounts associated with the training examples of the selected subgroup in the data-structure. Some non-limiting examples of such function may include a linear function, a non-linear function, an exponential function, a polynomial function, a logarithmic function, and so forth.

Figure 5A:
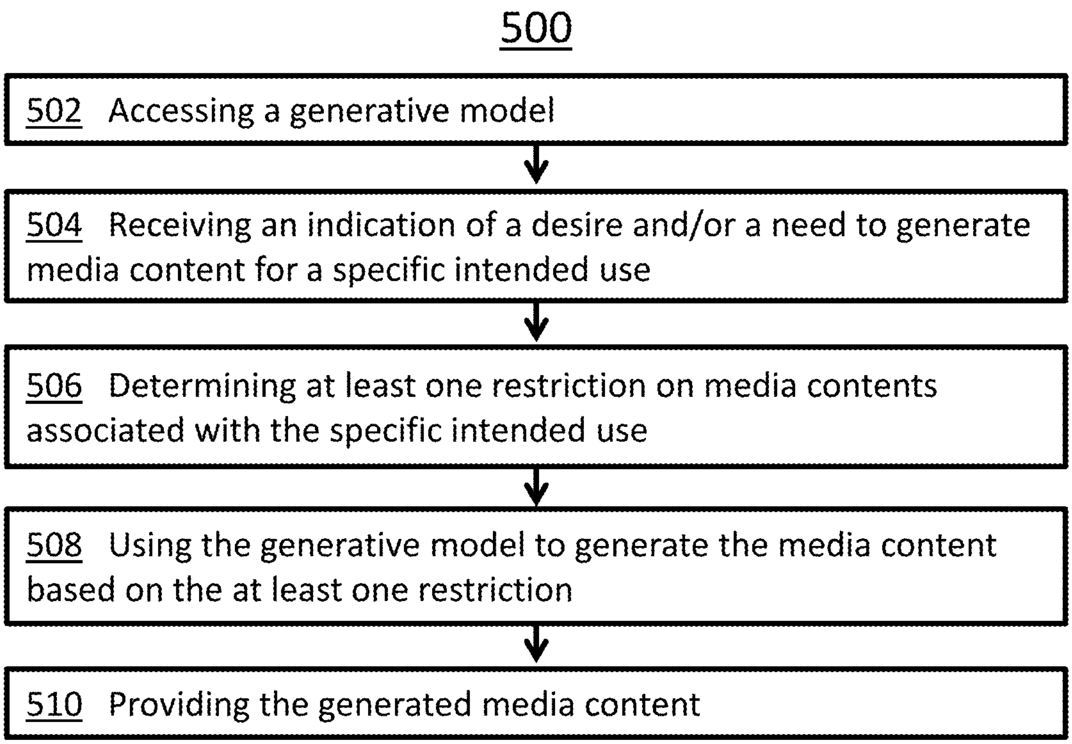
FIG. 5A is a flowchart of an example process for generating media contents based on requirements determined by intended use, consistent with some embodiments of the present disclosure.
Figure 5B:
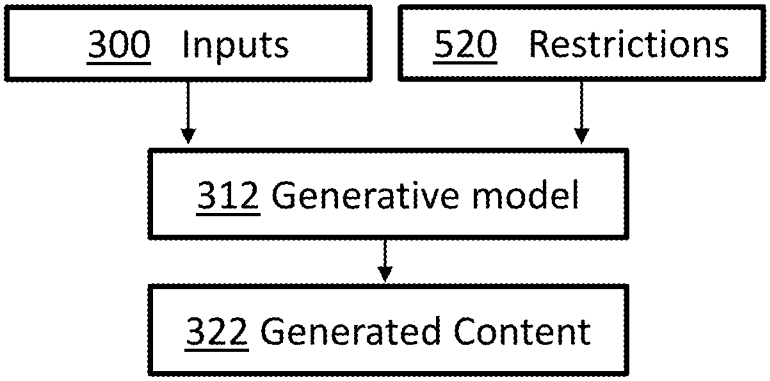
FIG. 5B is a simplified block diagram illustrating a possible flow of information, consistent with some embodiments of the present disclosure.

FIG. 5A is a flowchart of an example process 500 for generating media contents based on requirements determined by intended use, consistent with some embodiments of the present disclosure. In this example, process 500 may comprise accessing a generative model (step 502); receiving an indication of a desire and/or a need to generate media content for a specific intended use (step 504); determining at least one restriction on media contents associated with the specific intended use (step 506); using the generative model to generate the media content based on the at least one restriction (step 508); and providing the generated media content (step 510). In other examples, process 500 may include additional steps or fewer steps. In other examples, one or more steps of process 500 may be executed in a different order and/or one or more groups of steps may be executed simultaneously. In some examples, a system for generating media contents based on requirements determined by intended use may include at least one processing unit configured to perform process 500. In some examples, a method for generating media contents based on requirements determined by intended use may include performing process 500. In some examples, a non-transitory computer readable medium may store computer implementable instructions that when executed by at least one processor cause the at least one processor to perform operations for generating media contents based on requirements determined by intended use, and the operations may include the steps of process 500. FIG. 5B is a simplified block diagram illustrating a possible flow of information, consistent with some embodiments of the present disclosure. In this example, generative model 312 (described above) may receive, additionally or alternatively to inputs 300 (described above). Further, generative model 312 may generate generated content 322 (described above) based on inputs 300 and/or restrictions 520. Some non-limiting examples of such restrictions are described above.

In some examples, step 502 may comprise accessing a generative model. For example, the generative model may be stored in a digital memory, and step 502 may include reading the generative model from the digital memory. In another example, the generative model may be maintained by an external computing device, and step 502 may communicate with the external computing device to access the generative model (for example, using a digital communication device). In yet another example, step 502 may create the generative model, for example by training a machine learning model using a plurality of training examples. Each training example of the plurality of training examples may be associated with a respective input and a respective media content. In one example, the generative model accessed by step 502 may be a result of training a machine learning model using training example. Each training example of the plurality of training examples may be associated with a respective input and a respective media content.

In some examples, step 504 may comprise receiving an indication of a desire and/or a need to generate media content for a specific intended use. For example, receiving the indication by step 504 may comprise reading the indication from a digital memory, may comprise receiving the indication from an external computing device (for example, using a digital communication device), may comprise receiving the indication from an individual (for example, via a user interface, via a keyboard, via a voice command, via a gesture, via a pointing device, via a touch device, etc.), may comprise monitoring data to identify the indication (for example, monitoring data captured using at least one sensor from a physical environment, monitoring data in a digital memory, monitoring data received via a digital communication device, etc.), monitoring data received from an individual (for example, via a user interface, via a keyboard, via a microphone, via an image sensor, via voice commands, via gestures, etc.), and so forth. In one example, the indication of the desire and/or the need may include an input in a natural language indicative of the desire and/or the need. In another example, the indication of the desire and/or the need may include a selection made via a user interface. In an additional example, the indication may be received from an individual, and the desire may be a desire of the individual. In another example, the indication may be received from a different automated process and/or from an external computing device. In one example, the indication may be indicative of the specific intended use. In another example, the indication may not be indicative of the specific intended use. Some non-limiting examples of such specific intended use may be associated with a geographic location, with an age group, with a brand, with a category of devices, with a specific event, with a specific medium, with a specific publication platform, with a specific prospective publication, and so forth. Some other non-limiting examples of such specific intended use may include marketing, social media marketing, educational material, commercial use, entertainment, training, event promotion, personal use, academic use, product design, and so forth.

In some examples, step 506 may comprise determining at least one restriction on media contents associated with a specific intended use (such as the specific intended use of step 504, a different specific intended use, and so forth). For example, step 506 may access a data-structure associating intended uses with restrictions based on the specific intended use to obtain the at least one restriction. In another example, step 506 may use a machine learning model to determine the at least one restriction based on the specific intended use. The machine learning model may be a machine learning model trained using training examples to determine restrictions based on intended uses. An example of such training example may include a sample intended use, together with a label indicative of one or more sample restrictions associated with the sample intended use. In yet another example, step 506 may use an artificial neural network to determine the at least one restriction based on the specific intended use. In an additional example, step 506 may use at least one rule to determine the at least one restriction based on the specific intended use. In one example, the at least one restriction may be associated with a regulatory requirement associated with the specific intended use. In another example, the at least one restriction may be associated with a cultural sensitivity associated with the specific intended use (such as religious sensitivity, cultural sensitivity to sexual content, cultural sensitivity to specific subject matter, cultural sensitivity to criticism of specific subjects, cultural sensitivity to violence, and so forth). In yet another example, the at least one restriction may be based on a geographic location (such as criticism of the monarchy in Thailand, regulatory restriction associated with the geographic location, avoiding nudity in a school zone, and so forth). In an additional example, the at least one restriction may be based on an age group (for example, avoiding nudity in content aimed for children, while including nudity in content aimed for adults). In another example, the at least one restriction may be based on branding guidelines associated with a brand (for example, avoiding images of a competitor's product, avoiding subject unaligned with brand values, and so forth). In yet another example, the at least one restriction may be based on a category of devices (for example, restriction on aspect ratio, restriction on frame rate, restriction on content aimed for inclusion in a toy, and so forth). In another example, the at least one restriction may be based on a publication platform (for example, based on rules and/or guidelines associated with the publication platform). In an additional example, the at least one restriction may be based on a specific event (for example, based on one or more rules associated with the event, based on cultural context associated with the event, and so forth). In another example, the at least one restriction may be a restriction on depictions of objects of a particular category (such as nudity, forbidden objects, forbidden figures, and so forth). In yet another example, the at least one restriction may be a restriction on depictions of events of a particular category (such as sexual acts, rude acts, events including graphical violence, events including graphical injuries, and so forth). In an additional example, the at least one restriction may be a restriction on usage of specific words and/or phrases (such as, sexual phrases, strong language, hate speech, and so forth). In another example, the at least one restriction may include a data format requirements (for example, data format requirements associated with a usage with a specific device or in a specific medium). In yet another example, the at least one restriction may include a content length limit (for example, restricting duration of video or audio contents, limiting the number of words in a verbal content, and so forth). In an additional example, the at least one restriction may include a subject matter constraint (for example, avoiding controversial subjects, avoiding sexual subjects, avoiding violent subjects, and so forth).

In some examples, step 506 may analyze the indication received by step 504 to determine the at least one restriction. For example, the indication may include may include an input in a natural language indicative of the desire and/or the need, the input in the natural language may be further indicative of the at least one restriction, and step 506 may use a NLP algorithm to analyze the input in the natural language to determine the at least one restriction. Some non-limiting examples of such inputs in natural language may include 'Make an image demonstrating the idiom barking up the wrong leg to kids', 'We need a video of this product for sharing in this social media platform', 'Make a short audio of a funny conversation about this event for transmission in this radio station', or 'Make a visual for inclusion in this toy for infants'. In another example, the indication may include may include one or more selections made by an individual via a user interface, the selections may be indicative of the at least one restriction, and step 506 may analyze the selection to determine the at least one restriction. For example, the selections may be indicative of the intended use of step 504, and step 506 may analyze the selections to determine the intended use, and may determine the at least one restriction based on the intended use. In one example, step 506 may use a machine learning model to analyze the indication to determine the at least one restriction. The machine learning model may be a machine learning model trained using training examples to determine restrictions based on indications. An example of such training example may include a sample indication of desire and/or need to generate a media content for a sample intended use, together with a label indicative of restrictions associated with the sample intended use. In one example, step 506 may use an artificial neural network to analyze the indication to determine the at least one restriction.

In some examples, the specific intended use of step 504 may be an intent to use the generated media content at a geographic location, and the determining the at least one restriction by step 506 may be based on the geographic location. In one example, step 506 may determine a category of the geographic location (such as a school zone, a religious neighborhood, a nightclub, a geographic location associated with a specific brand, etc.), for example using a map or a Geographical Information System (GIS), and may determine the at least one restriction based on the category of the geographic location. For example, step 506 may access a data-structure associating categories of the geographic locations with restrictions based on the category of the geographic location to determine the at least one restriction. In one example, the geographic location may be associated with a school, and the at least one restriction may be based on the association with the school. For example, based on the association with the school, the at least one restriction may include avoiding depictions of smoking and/or alcohol and/or gambling and/or nudity. In some examples, the specific intended use of step 504 may be associated with an age group, and the determining the at least one restriction by step 506 may be based on the age group. For example, the specific intended use may include an intent to use the generated media content in a product aimed to the specific age group (for example, in a television program aimed to the specific age group, in a toy aimed to the specific age group, in an educational material aimed to the specific age group, and so forth). In another example, the specific intended use may include an intent to provide the generated media content to one or more specific people, and the specific age group may be the age group of the specific people. In one example, in response to the specific age group including minors, the at least one restriction may include avoiding depictions of smoking and/or alcohol and/or gambling and/or nudity. In some examples, the specific intended use of step 504 may be associated with a brand, and the determining the at least one restriction by step 506 may be based on branding guidelines associated with the brand. For example, the specific intended use may include an intent to use the generated media content in a product associated with the brand, in a location associated with the brand (such as a store, a venue, etc.), in an advertisement or a promotion associated with the brand, and so forth. In some examples, the specific intended use of step 504 may be associated with a category of devices, and the determining the at least one restriction by step 506 may be based on the category of devices. For example, the category of devices may be toys aimed for children, and the at least one restriction may include avoiding depictions of smoking and/or alcohol and/or gambling and/or nudity. In another example, the category of devices may include a specific display device, and the at least one restriction may include restrictions based on limitation of the specific display device. In one example, the specific intended use may include an intent to use the generated media content in a specific product, and step 506 may determine the category of devices based on the specific product. In some examples, the specific intended use of step 504 may be associated with a publication platform, and the determining the at least one restriction by step 506 may be based on the publication platform. For example, when the publication platform is a social media network, the at least one restriction may be based on the community guidelines. In another example, when the publication platform is a traditional media entity, such as a newspaper, a radio station or a television channel, the at least one restriction may be based on rules associated with the traditional media entity. In some examples, the specific intended use of step 504 may be associated with a specific event, and the determining the at least one restriction by step 506 may be based on the specific event. For example, the specific event may be a stage play for children, and the at least one restriction may include avoiding depictions of smoking and/or alcohol and/or gambling and/or nudity. In another example, the specific event may be a promotional event associated with a brand, step 506 may determine the brand from the specific event, and may determine the at least one restriction based on the brand (as described above). In yet another example, step 506 may access a data-structure associating events with restrictions based on the specific event to determine the at least one restriction.

In some examples, step 508 may comprise using a generative model (such as the generative model accessed by step 502, a different generative model, etc.) to generate the media content based on at least one restriction on media contents (such as, the at least one restriction determined by step 506, different at least one restriction, and so forth). In one example, the generated media content may include at least one of a generated visual content, generated audio content, or generated textual content. In one example, step 508 may generate a plurality of media contents, may analyze each media content of the plurality of media contents to determine whether the media content adheres to the at least one restriction, and may select a media content adhering to the at least one restriction. In another example, the generative model may receive the at least one restriction as input, and may be designed to generate media content adhering to the received at least one restriction. For example, such generative model may be a result of training a machine learning model using training example. An example of such training example may include a sample input and a sample restriction, together with a sample media content aligned with the sample input and adhering to the sample restriction.

In some examples, step 508 may comprise identifying a region of a mathematical space based on the at least one restriction determined by step 506, using the indication received by step 504 to select a mathematical object in the region of the mathematical space, and using the mathematical object to generate the media content. For example, each mathematical object in the mathematical space may correspond to a media content, and the region of the mathematical space may include only mathematical objects corresponding to media contents adhering to the at least one restriction. For example, step 508 may use module 282 to identifying one or more particular mathematical objects in the mathematical space based on the indication received by step 504 and/or the at least one restriction determined by step 506, and may identify the region of the mathematical space based on the one or more particular mathematical objects. For example, the region may be a convex region including the one or more particular mathematical objects, may be a region surrounding a center of the one or more particular mathematical objects in the mathematical space with a diameter determined based on the spread of the one or more particular mathematical objects, and so forth.

In some examples, step 510 may comprise providing a generated media content (such as the media content generated by step 508, the media content generated by step 608, a different generated media content, and so forth). For example, the generated media content may be a generated visual content, and step 510 may visually present the generated visual content (for example, using a display device, using an extended reality appliance, in a user interface, and so forth). In another example, the generated media content may be a generated audio content, and step 510 may output the generated audio content using an audio output device (such as an audio speaker, headphones, and so forth). In yet another example, the generated media content may be a generated textual content, and step 510 may present the generated textual content visually, may present the generated textual content audibly (for example, using a text-to-speech algorithm), and so forth. In an additional example, step 510 may post the generated media content in social media, may include the generated media content in a website, may include the generated media content in an app, may store the generated media content in a digital memory, may transmit the generated media content to an external computing device (for example, using a digital communication device), and so forth. In some examples, the indication received by step 504 may be received from an individual, the desire of step 504 may be a desire of the individual, and step 510 may comprise presenting the generated media content to the individual. In some examples, step 510 may further comprise providing an indication that the generated media content comply to the at least one restriction. Some non-limiting examples of such indication that the generated media content comply to the at least one restriction may include a visual indication, a textual indication, a graphical indication, an audible indication, and so forth.

In some examples, the at least one restriction determined by step 506 may be a restriction on depictions of objects of a particular category, and the media content generated by step 508 may not depict any object of the particular category. Some non-limiting examples of such particular category may include nudity, forbidden objects, forbidden figures, and so forth. In some examples, the at least one restriction determined by step 506 may be a restriction on depictions of events of a particular category, and the media content generated by step 508 may not depict any event of the particular category. Some non-limiting examples of such particular category may include sexual acts, rude acts, events including graphical violence, events including graphical injuries, and so forth. In some examples, the at least one restriction determined by step 506 may be a restriction on vocabulary and/or specific type of language, and the media content generated by step 508 may not include restricted words and phrases and/or the specific type of language. Some non-limiting examples of such sexual phrases, strong language, hate speech, and so forth.

Figure 6A:
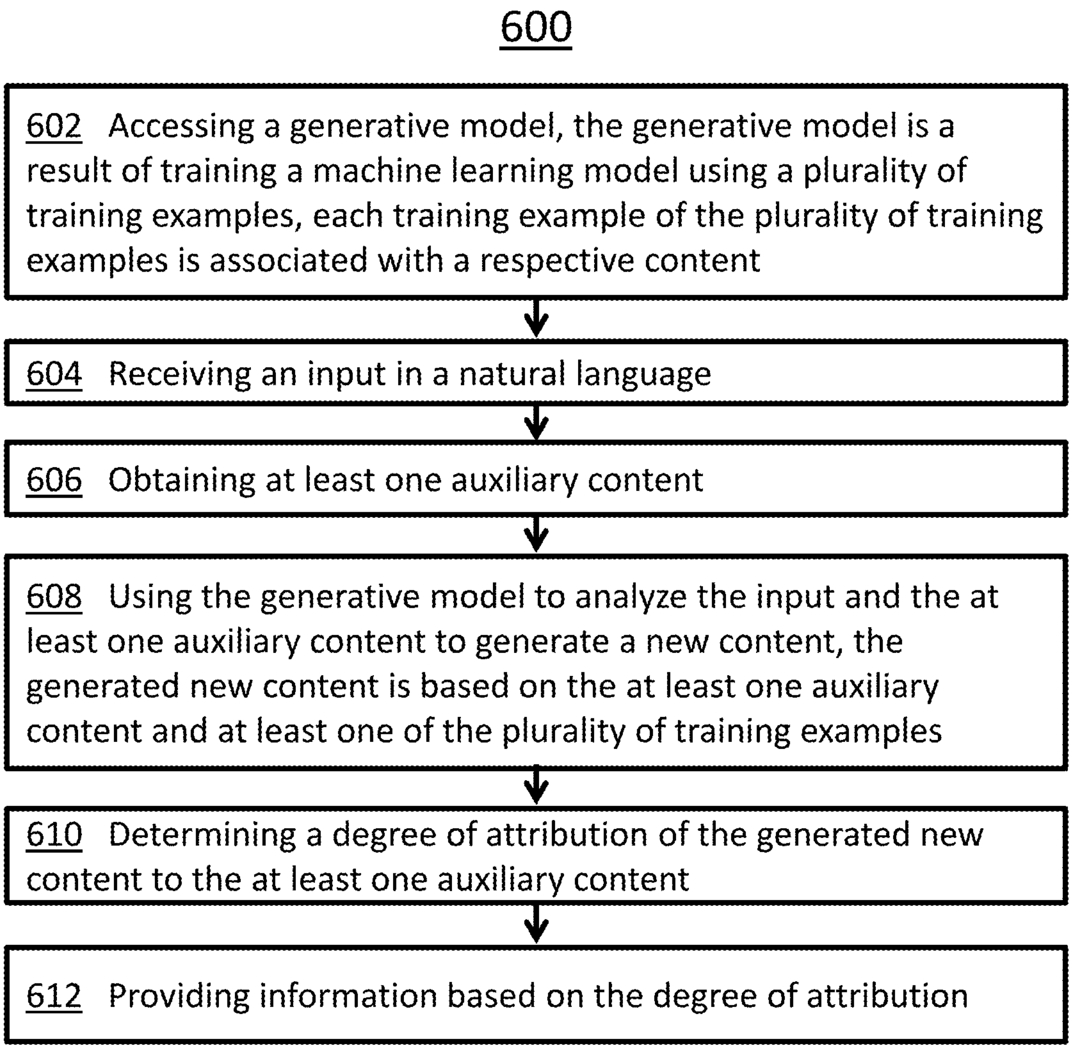
FIGS. 6A, 6B and 6C are flowcharts of example processes for chained attribution of generated content, consistent with some embodiments of the present disclosure.

FIG. 6A is a flowchart of example process 600 for chained attribution of generated content, consistent with some embodiments of the present disclosure. In this example, process 600 may comprise accessing a generative model (step 602), the generative model is a result of training a machine learning model using a plurality of training examples, each training example of the plurality of training examples is associated with a respective content; receiving an input in a natural language (step 604); obtaining at least one auxiliary content (step 606); using the generative model to analyze the input and the at least one auxiliary content to generate a new content, the generated new content is based on the at least one auxiliary content and at least one of the plurality of training examples (step 608); determining a degree of attribution of the generated new content to the at least one auxiliary content (step 610); and providing information based on the degree of attribution (step 612). In other examples, process 600 may include additional steps or fewer steps. In other examples, one or more steps of process 600 may be executed in a different order and/or one or more groups of steps may be executed simultaneously. In some examples, a system for chained attribution of generated content may include at least one processing unit configured to perform process 600. In some examples, a method for chained attribution of generated content may include performing process 600. In some examples, a non-transitory computer readable medium may store computer implementable instructions that when executed by at least one processor cause the at least one processor to perform operations for chained attribution of generated content, and the operations may include the steps of process 600. In some examples, the input received by step 604 may be received from an individual, and the at least one auxiliary content received by step 606 may be received from the individual. Further, step 612 may provide the information to the individual.

In some examples, step 602 may comprise accessing a generative model, for example as described above in relation to step 502. The generative model of step 602 may be a result of training a machine learning model using a plurality of training examples. Each training example of the plurality of training examples may be associated with a respective content. For example, the generative model may be stored in a digital memory, and step 602 may include reading the generative model from the digital memory. In another example, the generative model may be maintained by an external computing device, and step 602 may communicate with the external computing device to access the generative model (for example, using a digital communication device). In yet another example, step 602 may create the generative model, for example by training a machine learning model using the plurality of training examples.

In some examples, step 604 may comprise receiving an input in a natural language. In one example, the input in the natural language may be a textual input in the natural language. In another example, the input in the natural language may be speech in the natural language. In some examples, step 604 may read the input from a digital memory, may receive the input from an external computing device (for example, using a digital communication device), may receive the input from an individual (for example, via a user interface, via a keyboard, via a pointing device, via a touchscreen, via a microphone, and so forth), may capture the input (for example, using a microphone), may generate the input (for example, by analyzing a different input, such as a prompt, using a generative model), and so forth.

In some examples, step 606 may comprise obtaining at least one auxiliary content. Some non-limiting examples of such auxiliary content may include auxiliary visual content, auxiliary audio content, auxiliary multimedia content, auxiliary textual content, auxiliary content in a natural language, and so forth. In some examples, step 606 may read the at least one auxiliary content from a digital memory, may receive the at least one auxiliary content from an external computing device (for example, using a digital communication device), may receive the at least one auxiliary content from an individual (for example, via a user interface, via a keyboard, via a pointing device, via a touchscreen, via a microphone, and so forth), may capture the at least one auxiliary content (for example, using a microphone, using an image sensor, and so forth), may generate the at least one auxiliary content (for example, by analyzing a different input, such as a prompt, using a generative model), and so forth. In one example, step 606 may comprise accessing a second generative model, and using the second generative model to analyze the input to generate the at least one auxiliary content. In another example, the at least one auxiliary content obtained by step 606 may be generated before the input is received by step 604.

In some examples, step 606 may analyze the input received by step 604 to determine at least one query, and may use the at least one query to obtain the at least one auxiliary content. For example, step 606 may use a LLM to analyze the input and determine the at least one query (for example, with a suitable prompt, such as 'write an SQL query for this database to obtain an image and a voice profile of a suitable character for the generation of the media based on this input, {input}', or 'suggest a search term for a search engine to obtain a background image for the generation of the media based on this input, {input}'). In another example, step 606 may use a machine learning model to analyze the input to determine the at least one query. The machine learning model may be a machine learning model trained using training examples to generate queries based on inputs. An example of such training example may include a sample input, together with a label indicative of a sample query corresponding to the sample input. In one example, step 606 may use the at least one query to access a database to obtain the at least one auxiliary content. In another example, step 606 may use the at least one query to search using a search engine to obtain the at least one auxiliary content. In some examples, step 622 (described below) may analyze the at least one query to determine that the at least one auxiliary content obtained by step 606 is associated with at least one source. For example, step 606 may use the at least one query to access a database to obtain the at least one auxiliary content, and step 622 may use the at least one query to access the database to obtain an indication of the at least one source. In another example, step 622 may use the at least one query to search using a search engine to obtain the at least one source, and step 606 may access the at least one source to obtain the at least one auxiliary content.

In some examples, step 608 may comprise using a generative model (such as the generative model accessed by step 602, a different generative model, etc.) to analyze an input (such as the input received by step 604, a different input, etc.) and at least one auxiliary content (such as the at least one auxiliary content received by step 606, different at least one auxiliary content, etc.) to generate a new content. The generated new content may be based on the at least one auxiliary content and/or at least one of the plurality of training examples of step 602 and/or the input. In one example, the input may refer to the at least one auxiliary content (for example, 'create a single image of the two people in the two attached pictures, showing them hugging'). In another example, the input may not refer to the at least one auxiliary content.

In some examples, step 610 may comprise determining a degree of attribution of the new content generated by step 608 to the at least one auxiliary content obtained by step 606. In one example, the degree of attribution may be a number in a range of numbers, may be a discrete value, may be a level (such as 'high', 'medium' and 'low), and so forth. In some examples, step 610 may analyze the generated new content and/or the at least one auxiliary content and/or the input received by step 604 and/or the contents associated with the plurality of training examples of step 602 to determine the degree of attribution of the new content to the at least one auxiliary content. For example, the generated new content may be analyzed to determine one or more properties of the generated new content, for example as described below, the at least one auxiliary content may be analyzed to determine one or more properties of the at least one auxiliary content, for example using step 642, and step 610 may base the determination of the degree of attribution of the generated new content to the at least one auxiliary content on the one or more properties of the generated new content and the one or more properties of the at least one auxiliary content. In another example, the generated new content may be analyzed to determine one or more properties of the generated new content, for example as described below, the input may be analyzed to determine one or more properties of the input, for example using NLP algorithms, and step 610 may base the determination of the degree of attribution of the generated new content to the at least one auxiliary content on the one or more properties of the generated new content and the one or more properties of the input. In yet another example, the generated new content may be analyzed to determine one or more properties of the generated new content, for example as described below; for each training example of the plurality of training examples, the respective content may be analyzed to determine one or more properties of the respective content, for example using step 644; and step 610 may use the one or more properties of the generated new content and the properties of the contents associated with the plurality of training examples to determine the degree of attribution of the generated new content to the at least one auxiliary content. For example, step 610 may use a second machine learning model to analyze the one or more properties of the generated new content and/or the one or more properties of the at least one auxiliary content and/or the one or more properties of the input and/or the properties of the contents associated with the plurality of training examples to determine the degree of attribution of the new content to the at least one auxiliary content. The second machine learning model may be a machine learning model trained using training examples to determine degrees of attributions of generated contents to other contents based on properties. An example of such training example may include sample properties of a sample generated new content and/or sample properties of sample auxiliary contents used to generate the sample new content and/or sample properties of sample input used to generate the sample new content and/or sample properties of the sample contents associated with sample training examples used to create a sample generative model used to generate the sample new content, together with a label indicative of a degree of attribution of the sample new content to the sample auxiliary contents. In one example, step 610 may use an artificial neural network to analyze the one or more properties of the generated new content and/or the one or more properties of the at least one auxiliary content and/or the one or more properties of the input and/or the properties of the contents associated with the plurality of training examples to determine the degree of attribution of the new content to the at least one auxiliary content.

In some examples, step 612 may comprise providing information based on a degree of attribution (such as the degree of attribution determined by step 610, a different degree of attribution, and so forth). For example, step 612 may provide the information to an individual (for example, visually, graphically, textually, audibly, via a user interface, and so forth), may provide the information to a different process, may provide the information to an external computing device (for example, using a digital communication device), may store (i.e., provide) the information in a digital memory, may update a database and/or a data-structure and/or a data-record based on the information, and so forth. In one example, the information may be indicative of the degree of attribution. In another example, the information may not be indicative of the degree of attribution. Additionally or alternatively, step 612 may comprise providing the new content generated by step 608, for example using step 510 and/or step 810.

In some examples, the at least one auxiliary content obtained by step 606 may be at least one auxiliary visual content, the new content generated by step 608 may be a generated new visual content, and the content associated with a particular training example of the plurality of training examples of step 602 may be a visual content. Some non-limiting examples of such visual contents may include images, videos, graphical contents, and so forth. In some examples, the at least one auxiliary content obtained by step 606 may be at least one auxiliary audio content, the new content generated by step 608 may be a generated new audio content, and the content associated with a particular training example of the plurality of training examples of step 602 may be an audio content. Some non-limiting examples of such audio contents may include audio contents including speech in a natural language, music, audio effects, and so forth. In some examples, the at least one auxiliary content obtained by step 606 may be at least one auxiliary multimedia content, the new content generated by step 608 may be a generated new multimedia content, and the content associated with a particular training example of the plurality of training examples of step 602 may be a multimedia content. Some non-limiting examples of such multimedia contents may include videos, contents including both visual and audio elements, content including both textual and visual elements, contents including both textual and audio elements, and so forth. In some examples, the at least one auxiliary content obtained by step 606 may be at least one auxiliary textual content, the new content generated by step 608 may be a generated new textual content, and the content associated with a particular training example of the plurality of training examples of step 602 may be a textual content. Some non-limiting examples of such textual contents may include textual contents in a natural language, textual contents in a formal language, random strings of characters, and so forth. In some examples, the at least one auxiliary content obtained by step 606 may be at least one auxiliary content in a natural language (such as the natural language of step 604, a different natural language, etc.), the new content generated by step 608 may be a generated new content in the natural language, and the content associated with a particular training example of the plurality of training examples of step 602 may be a content in the natural language. Some non-limiting examples of such contents in the natural language may include textual contents in the natural language, audio contents including speech in the natural language, and so forth.

Figure 6B:
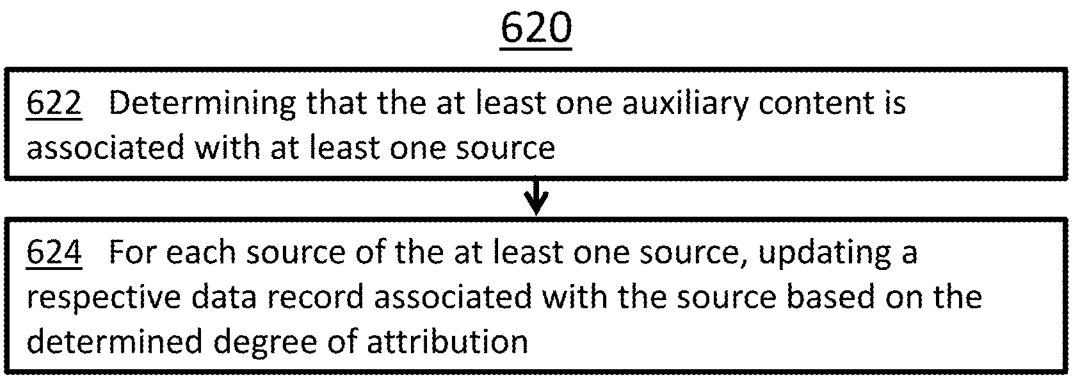

FIG. 6B is a flowchart of example process 620 for chained attribution of generated content, consistent with some embodiments of the present disclosure. In this example, process 620 may comprise determining that the at least one auxiliary content is associated with at least one source (step 622); and, for each source of the at least one source, updating a respective data record associated with the source based on the determined degree of attribution (step 624). In other examples, process 620 may include additional steps or fewer steps. In other examples, one or more steps of process 620 may be executed in a different order and/or one or more groups of steps may be executed simultaneously. In some examples, a system for chained attribution of generated content may include at least one processing unit configured to perform process 620. In some examples, a method for chained attribution of generated content may include performing process 620. In some examples, a non-transitory computer readable medium may store computer implementable instructions that when executed by at least one processor cause the at least one processor to perform operations for chained attribution of generated content, and the operations may include the steps of process 620.

In some examples, step 622 may comprise determining that at least one content (such as the at least one auxiliary content obtained by step 606, a different at least one content, etc.) is associated with at least one source. For example, step 622 may access a data-structure associating contents with sources based on the at least one content to identify sources associated with the at least one content and thereby determine the at least one source. In another example, Step 622 may analyze the at least one content to identify sources associated with the at least one content and thereby determine the at least one source. For example, step 622 may analyze the at least one auxiliary content obtained by step 606 to determine that the at least one auxiliary content is associated with the at least one source. In one example, a content may include a signature of an artist, and the analysis of the textual content may detect the signature to identify the artist and thereby identify a source. In another example, a content may include encoded information identifying a source (for example, as described below in process 900 and/or process 1000), and the analysis of the content may detect and/or decode the encoded information to identify the source. In an additional example, step 622 may use process 640 to determine that the at least one auxiliary content is associated with the at least one source. In some examples, step 622 may analyze the input received by step 604 to determine that the at least one auxiliary content is associated with at least one source. For example, the input may indicate how to obtain the at least one auxiliary content and/or what is the source of the at least one auxiliary content. In another example, the input may include a trademark indicative of the source of the at least one auxiliary content.

In some examples, step 624 may comprise, for each source of a group of at least one source (such as the at least one source of step 622, a different group of at least one source, and so forth), updating a respective data record associated with the source based on a determined degree (such as the degree of attribution determined by step 610, a different degree, and so forth). For example, the data-record may be stored in a memory (such as a digital memory), and step 624 may update data associated with the data-record in the memory. In another example, the data-record may be maintained by an external computing device, and step 624 may transmit information to the external computing device (for example, using a digital communication device) to cause the external computing device to update the data-record. In yet another example, the data-record may include data in a database, and step 624 may update the data in the database. In one example, step 624 may update the data-record to record at least one of the new content generated by step 608, the input received by step 604, or the degree of attribution determined by step 610. In one example, the degree of attribution may be recorded in the data-record. In another example, a value in the data-record may be updated to a new value determined by calculating a function of the value and the degree of attribution. Some non-limiting examples of such function may include a linear function, a non-linear function, an exponential function, a polynomial function, a logarithmic function, and so forth. In some examples, a value in the data-record may represent a credit associated with the source, and step 624 may update the credit associated with the source (and therefore the value in the data-record) based on the degree of attribution.

In some examples, process 620 may further comprise determining a usage policy for the new content generated by step 608 based on the at least one source determined by step 622; and implementing the usage policy. For example, a data-structure associating sources with usage policies may be accessed based on the at least one source determined by step 622 to thereby determine the usage policy for the generated new content. Some non-limiting examples of such usage policy includes avoiding usage of the generated new content, avoiding usage of the generated new content in a specific territory, avoiding usage of the generated new content in a specific medium and/or publication platform, avoiding usage of the generated new content with a specific individual, avoiding usage of the generated new content at specific time intervals, avoiding specific usage of the generated new content, adding a credit to the generated new content, and so forth.

Figure 6C:
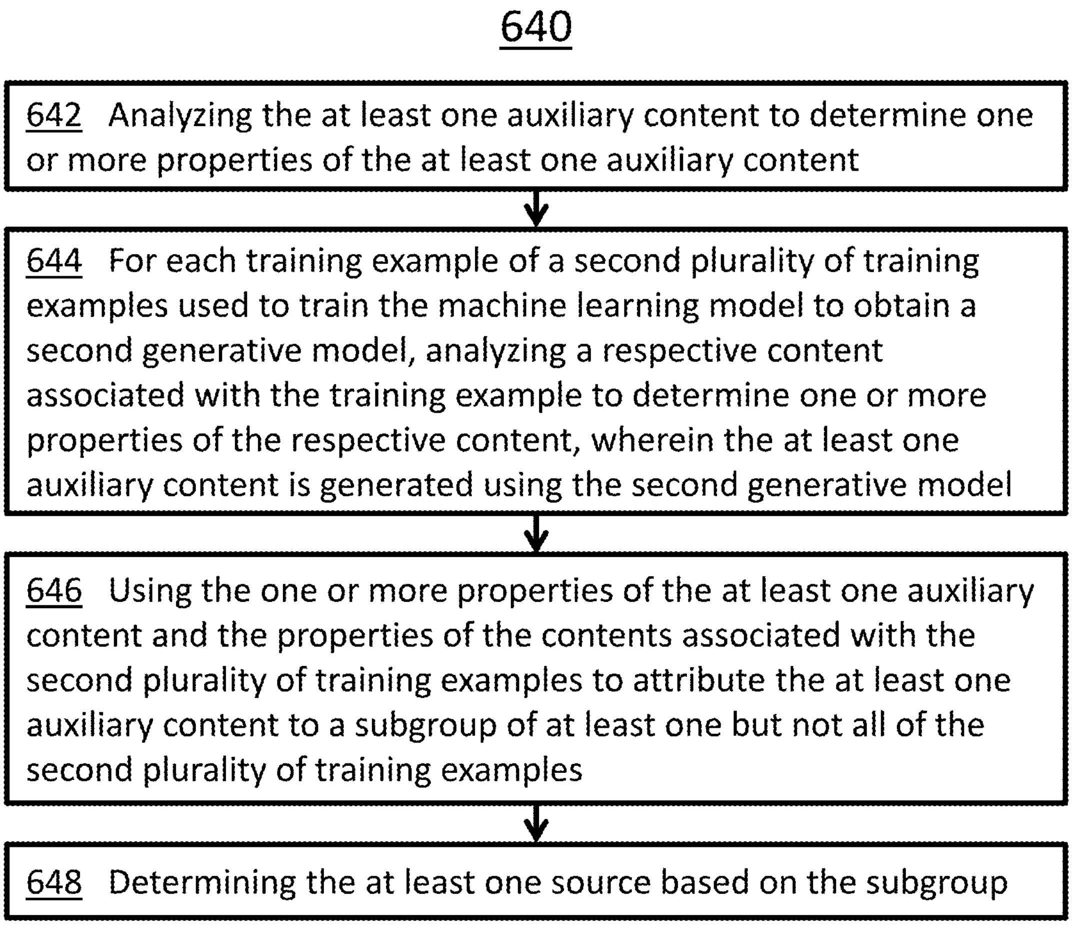

FIG. 6C is a flowchart of example process 640 for chained attribution of generated content, consistent with some embodiments of the present disclosure. In this example, the at least one auxiliary content obtained by step 606 may be generated using a second generative model, the second generative model may be a result of training the machine learning model using a second plurality of training examples, and each training example of the second plurality of training examples may be associated with a respective content. In this example, process 640 may comprise analyzing the at least one auxiliary content to determine one or more properties of the at least one auxiliary content (step 642); for each training example of the second plurality of training examples, analyzing the respective content to determine one or more properties of the respective content (step 644); using the one or more properties of the at least one auxiliary content and the properties of the contents associated with the second plurality of training examples to attribute the at least one auxiliary content to a subgroup of at least one but not all of the second plurality of training examples (step 646); and determining the at least one source based on the subgroup (step 648). In other examples, process 640 may include additional steps or fewer steps. In other examples, one or more steps of process 640 may be executed in a different order and/or one or more groups of steps may be executed simultaneously. In some examples, a system for chained attribution of generated content may include at least one processing unit configured to perform process 640. In some examples, a method for chained attribution of generated content may include performing process 640. In some examples, a non-transitory computer readable medium may store computer implementable instructions that when executed by at least one processor cause the at least one processor to perform operations for chained attribution of generated content, and the operations may include the steps of process 640.

In some examples, step 642 may comprise analyzing the at least one auxiliary content obtained by step 606 to determine one or more properties of the at least one auxiliary content, for example using module 288. In some examples, step 644 may comprise, for each training example of the second plurality of training examples, analyzing the respective content to determine one or more properties of the respective content, for example using module 288.

In some examples, step 646 may comprise using the one or more properties of the at least one auxiliary content (determined by step 642) and the properties of the contents associated with the second plurality of training examples (determined by step 644) to attribute the at least one auxiliary content to a subgroup of at least one but not all of the second plurality of training examples. For example, a second machine learning model may be used to analyze the one or more properties of the at least one auxiliary content (determined by step 642) and the properties of the contents associated with the second plurality of training examples (determined by step 644) to determine whether to attribute the at least one auxiliary content to a particular training example and/or a degree of the attribution. The second machine learning model may be a machine learning model trained using a set of training examples to determine whether to attribute contents to training examples and/or the degree of the attribution based on the different properties. An example of such training example may include properties of one sample auxiliary content and properties of sample training examples, together with a label indicative of whether the sample auxiliary content is attributed to the sample training example and/or a sample degree of the attribution of the sample auxiliary content to the sample training example.

In some examples, step 648 may comprise determining the at least one source of step 622 based on the subgroup of step 646. For example, step 648 may access a data-structure associating training examples with sources based on the subgroup to thereby determine the at least one source. In another example, Step 622 may analyze the contents associated with the training examples of the subgroup to identify sources associated with the subgroup and thereby determine the at least one source, for example as described above.

In some examples, step 646 may, for each training example of the subgroup, using the one or more properties of the at least one auxiliary content and the one or more properties of the respective content to determine a respective secondary degree of attribution of the at least one auxiliary content to the respective training example, for example as described above. Further, step 624 may, for each source of the at least one source, further basing the update to the respective data-record associated with the source on respective at least one of the determined secondary degrees. In one example, at least one of the degree of attribution, a determined secondary degree, or a function of the degree of attribution and the determined secondary degree may be recorded in the data-record. In another example, a value in the data-record may be updated to a new value determined by calculating a function of the value and at least one of the degree of attribution, a determined secondary degree, or a function of the degree of attribution and the determined secondary degree. Some non-limiting examples of such functions may include a linear function, a non-linear function, an exponential function, a polynomial function, a logarithmic function, and so forth.

Figure 7:
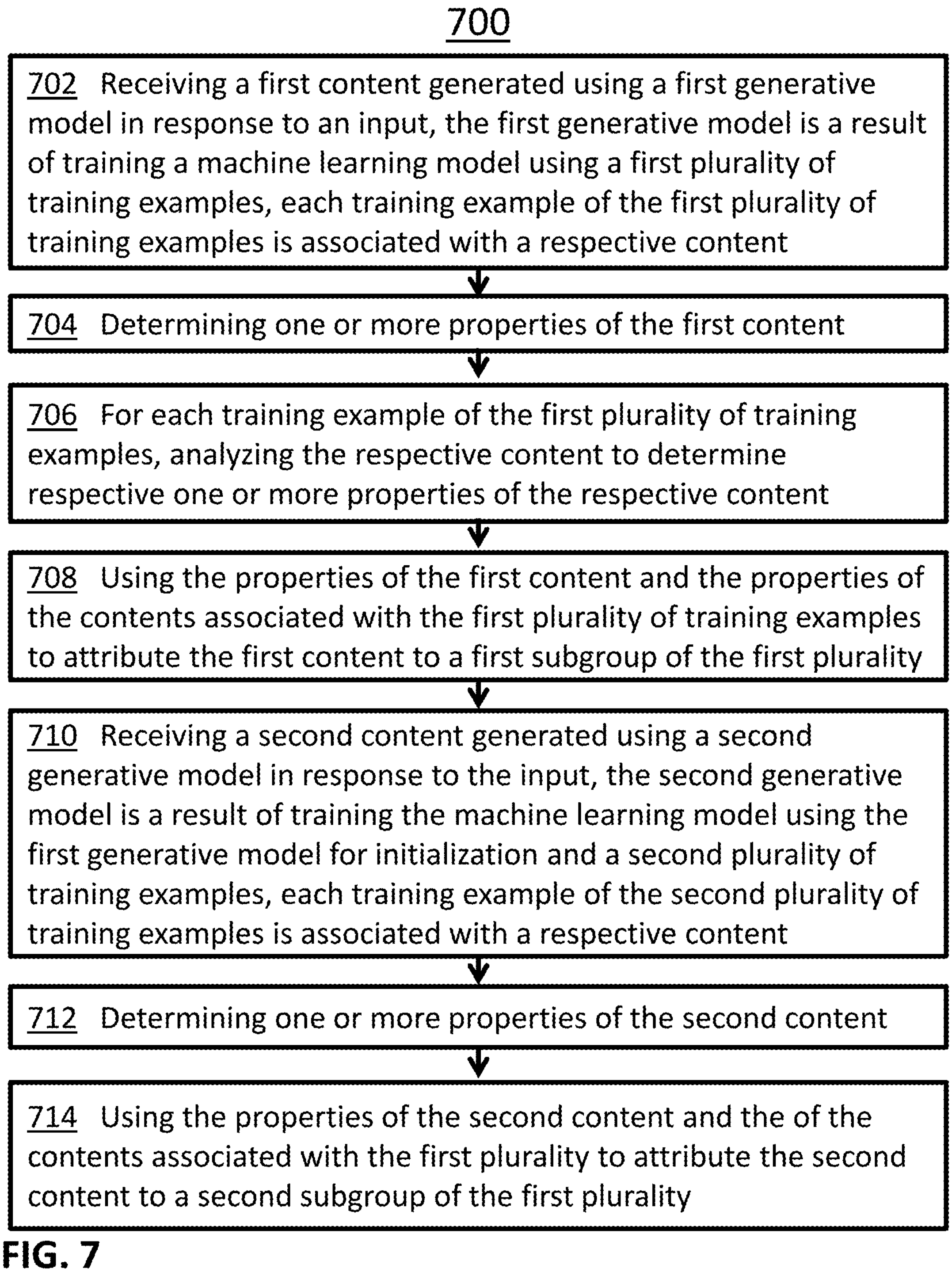
FIG. 7 is a flowchart of an example process for evolving attribution of generated content, consistent with some embodiments of the present disclosure.

FIG. 7 is a flowchart of an example process 700 for evolving attribution of generated content, consistent with some embodiments of the present disclosure. In this example, process 700 may comprise receiving a first content generated using a first generative model in response to an input (step 702), the input is indicative of a desire to generate content with specific characteristics, the first generative model is a result of training a machine learning model using a first plurality of training examples, each training example of the first plurality of training examples is associated with a respective content; determining one or more properties of the first content (step 704); for each training example of the first plurality of training examples, analyzing the respective content to determine respective one or more properties of the respective content (step 706); using the one or more properties of the first content and the properties of the contents associated with the first plurality of training examples to attribute the first content to a first subgroup of at least one but not all of the first plurality of training examples (step 708); receiving a second content generated using a second generative model in response to the input (step 710), the second generative model is a result of training the machine learning model using the first generative model for initialization and a second plurality of training examples, each training example of the second plurality of training examples is associated with a respective content; determining one or more properties of the second content (step 712); and using the one or more properties of the second content and the properties of the contents associated with the first plurality of training examples to attribute the second content to a second subgroup of at least one but not all of the first plurality of training examples, wherein the second subgroup is a proper subset of the first subgroup (step 714). In other examples, process 700 may include additional steps or fewer steps. In other examples, one or more steps of process 700 may be executed in a different order and/or one or more groups of steps may be executed simultaneously. In some examples, a system for evolving attribution of generated content may include at least one processing unit configured to perform process 700. In some examples, a method for evolving attribution of generated content may include performing process 700. In some examples, a non-transitory computer readable medium may store computer implementable instructions that when executed by at least one processor cause the at least one processor to perform operations for evolving attribution of generated content, and the operations may include the steps of process 700.

In some examples, a content generated using a generative model in response to an input may be received. The input may be indicative of a desire to generate content with specific characteristics. For example, step 702 may comprise receiving a first content generated using a first generative model in response to the input. The first generative model may be a result of training a machine learning model using a first plurality of training examples. Each training example of the first plurality of training examples may be associated with a respective content. In another example, step 710 may comprise receiving a second content generated using a second generative model in response to the input. The second generative model may be a result of training the machine learning model using the first generative model for initialization and a second plurality of training examples. Each training example of the second plurality of training examples may be associated with a respective content. In one example, the second generative model may be a fine tuning of the first generative model. In another example, the first generative model may be an intermediate generative model created in the process of creating the second generative model (for example, in an online learning or a reinforcement learning scheme). In one example, the first and second contents may be visual contents (such as images, videos, illustrations, and so forth). In another example, the first and second contents may be audio contents (such as audible speech, audio effects, audio clips, and so forth). In yet another example, the first and second contents may be textual contents (for example, textual contents in a natural language, textual contents in a formal language, random strings of characters, and so forth). In an additional example, the first and second contents may be multimedia contents. In one example, the first content and the second content may be identical, may be substantially identical (for example, with at least 80% identical pixels, with at least 90% identical pixels, with at least 95% identical pixels, with at least 99% identical pixels, with at least 80% of the pixels with less than 10% difference in value, with at least 90% of the pixels with less than 10% difference in value, with at least 95% of the pixels with less than 5% difference in value, with at least 99% of the pixels with less than 5% difference in value, with at least 80% identical samples, with at least 90% identical samples, with at least 95% identical samples, with at least 99% identical samples, with at least 80% of the samples with less than 10% difference in value, with at least 90% of the samples with less than 10% difference in value, with at least 95% of the samples with less than 5% difference in value, with at least 99% of the samples with less than 5% difference in value, and so forth), may be visually identical, may be different from each other, and so forth. Receiving the content (for example, receiving the first content by Step 702, receiving the second content by step 710, etc.) may comprise reading the content from a digital memory, may comprise receiving the content from an external computing device (for example, using a digital communication device), may comprise receiving the content from the generative model, may comprise using the generative model to generate the content, and so forth.

In some examples, step 704 may comprise determining one or more properties of the first content received by step 702, for example using module 288. In some examples, step 712 may comprise determining one or more properties of the second content received by step 710, for example using module 288. In some examples, step 706 may comprise, for each training example of the first plurality of training examples of step 702, analyzing the respective content to determine respective one or more properties of the respective content, for example using module 288. In one example, step 704 may base the determination of the one or more properties of the first content on an intermediate result of the first generative model when generating the first content, and/or step 712 may base the determination of the one or more properties of the second content on an intermediate result of the second generative model when generating the second content, for example as described above in relation to module 288. In some examples, step 704 may calculate a convolution of at least part of the first content to thereby obtain a result value of the calculated convolution of the at least part of the first content, and may base the determination of the one or more properties of the first content on the result value of the calculated convolution of the at least part of the first content, for example as described above in relation to module 288. In some examples, step 712 may calculate a convolution of at least part of the second content to thereby obtain a result value of the calculated convolution of the at least part of the second content, and may base the determination of the one or more properties of the second content on the result value of the calculated convolution of the at least part of the second content, for example as described above in relation to module 288. In some examples, step 704 may base the one or more properties of the first content on a representation of a particular object in the first content, and/or step 712 may base the one or more properties of the second content on a representation of the particular object in the second content, for example as described above in relation to module 288. For example, the representation of the particular object in the first content and the representation of the particular object in the second content may be identical, may be substantially identical (for example, with at least 80% identical samples, with at least 90% identical samples, with at least 95% identical samples, with at least 99% identical samples, with at least 80% of the samples with less than 10% difference in value, with at least 90% of the samples with less than 10% difference in value, with at least 95% of the samples with less than 5% difference in value, with at least 99% of the samples with less than 5% difference in value, and so forth), may be different from one another, may be substantially different from one another, and so forth. In some examples, step 704 may base the one or more properties of the first content on a spatial relation between a representation of a first particular object and a representation of a second particular object in the first content, and/or step 712 may base the one or more properties of the second content on a spatial relation between a representation of the first particular object and the second particular object in the second content, for example as described above in relation to module 288. For example, the representation of the first particular object in the first content and the representation of the first particular object in the second content may be identical, may be substantially identical (for example, with at least 80% identical samples, with at least 90% identical samples, with at least 95% identical samples, with at least 99% identical samples, with at least 80% of the samples with less than 10% difference in value, with at least 90% of the samples with less than 10% difference in value, with at least 95% of the samples with less than 5% difference in value, with at least 99% of the samples with less than 5% difference in value, and so forth), may be different from one another, may be substantially different from one another, and so forth. Additionally or alternatively, the representation of the second particular object in the first content and the representation of the second particular object in the second content may be identical, may be substantially identical (for example, with at least 80% identical samples, with at least 90% identical samples, with at least 95% identical samples, with at least 99% identical samples, with at least 80% of the samples with less than 10% difference in value, with at least 90% of the samples with less than 10% difference in value, with at least 95% of the samples with less than 5% difference in value, with at least 99% of the samples with less than 5% difference in value, and so forth), may be different from one another, may be substantially different from one another, and so forth. In some examples, step 704 may base the one or more properties of the first content on a representation of a particular event in the first content, and/or step 712 may base the one or more properties of the second content on a representation of the particular event in the second content, for example as described above in relation to module 288. For example, the representation of the particular event in the first content and the representation of the particular event in the second content may be identical, may be substantially identical (for example, with at least 80% identical samples, with at least 90% identical samples, with at least 95% identical samples, with at least 99% identical samples, with at least 80% of the samples with less than 10% difference in value, with at least 90% of the samples with less than 10% difference in value, with at least 95% of the samples with less than 5% difference in value, with at least 99% of the samples with less than 5% difference in value, and so forth), may be different from one another, may be substantially different from one another, and so forth. In some examples, step 704 may base the one or more properties of the first content on a temporal relation between a representation of a first particular event and a representation of a second particular event in the first content, and/or step 712 may base the one or more properties of the second content on a temporal relation between a representation of the first particular event and the second particular event in the second content, for example as described above in relation to module 288. For example, the representation of the first particular event in the first content and the representation of the first particular event in the second content may be identical, may be substantially identical (for example, with at least 80% identical samples, with at least 90% identical samples, with at least 95% identical samples, with at least 99% identical samples, with at least 80% of the samples with less than 10% difference in value, with at least 90% of the samples with less than 10% difference in value, with at least 95% of the samples with less than 5% difference in value, with at least 99% of the samples with less than 5% difference in value, and so forth), may be different from one another, may be substantially different from one another, and so forth. Additionally or alternatively, the representation of the second particular event in the first content and the representation of the second particular event in the second content may be identical, may be substantially identical (for example, with at least 80% identical samples, with at least 90% identical samples, with at least 95% identical samples, with at least 99% identical samples, with at least 80% of the samples with less than 10% difference in value, with at least 90% of the samples with less than 10% difference in value, with at least 95% of the samples with less than 5% difference in value, with at least 99% of the samples with less than 5% difference in value, and so forth), may be different from one another, may be substantially different from one another, and so forth.

In some examples, the one or more properties of the first content (determined by step 704) and the one or more properties of the second content (determined by step 712) may be identical, may be substantially identical (for example, with at least 80% identical properties, with at least 90% identical properties, with at least 95% identical properties, with at least 99% identical properties, with at least 80% of the properties with less than 10% difference in value, with at least 90% of the properties with less than 10% difference in value, with at least 95% of the properties with less than 5% difference in value, with at least 99% of the properties with less than 5% difference in value, and so forth), may be different from one another, may be substantially different from one another, and so forth.

In some examples, one or more properties of a specific content generated using a generative model and properties of contents associated with a specific plurality of training examples used to create the generative model may be used to attribute the specific content to a specific subgroup of the specific plurality of training examples (for example, a subgroup of at least one but not all of the specific plurality of training examples, a subgroup including all the training example of the specific plurality of training examples, an empty subgroup, and so forth) and/or to determine, for each training example of the specific subgroup, a respective degree of attribution of the specific content to the training example. For example, step 708 may comprise using the one or more properties of the first content (determined by step 704) and the properties of the contents associated with the first plurality of training examples (determined by step 706) to attribute the first content received by step 702 to a first subgroup of at least one but not all of the first plurality of training examples of step 702, and/or to determine, for each training example of the first subgroup, a respective degree of attribution of the first content to the training example. In another example, step 714 may comprise using the one or more properties of the second content (determined by step 712) and the properties of the contents associated with the first plurality of training examples (determined by step 706) to attribute the second content received by step 710 to a second subgroup of at least one but not all of the first plurality of training examples of step 702 and/or to determine, for each training example of the second subgroup, a respective degree of attribution of the second content to the training example. The second subgroup may be a proper subset of the first subgroup, may be identical to the first subgroup, may include at least one training example in common with the first subgroup, may include a training example not included in the first subgroup, and so forth. In yet another example, step 926 (described below) may comprise using the one or more properties of the new content generated by step 906 (determined by step 922) and the properties of the contents associated with the plurality of training examples (determined by step 924) to attribute the new content to a subgroup of at least one but not all of the plurality of training examples. In one example, for each training example of the second subgroup, the respective degree of attribution of the second content to the training example may be equal to or lower than the respective degree of attribution of the first content to the training example, may be equal to the respective degree of attribution of the first content to the training example, may be lower than the respective degree of attribution of the first content to the training example, may be higher than the respective degree of attribution of the first content to the training example, and so forth. In one example, a machine learning model may be used to analyze the one or more properties of the specific content and the properties of the contents associated with the specific plurality of training examples to attribute the specific content to the specific subgroup of at least one but not all of the specific plurality of training examples. The machine learning model may be a machine learning model trained using training examples to attribute generated contents to subgroups of the training examples used to create the model used to generate the content and/or to determine degrees associated with the attribution based on properties. An example of such training example may include sample properties of a sample generated content and sample properties of sample contents associated with sample training examples, together with a label indicative of an attribution of the sample generated content to a sample subgroup of the sample training examples and/or a label indicative, for each training example of the sample subgroup, a sample degree of the attribution of the sample generated content to the training example. In another example, an artificial neural network may be used to analyze the one or more properties of the specific content and the properties of the contents associated with the specific plurality of training examples to attribute the specific content to the specific subgroup of at least one but not all of the specific plurality of training examples.

In some examples, step 714 may comprise using the one or more properties of a particular content associated with a particular training example of the first plurality of training examples (determined by step 706) to identify a first mathematical object in a mathematical space, for example using module 282; analyzing a specific content associated with a specific training example of the second plurality of training examples to determine respective one or more properties of the specific content, for example using module 288; using the one or more properties of the specific content to identify a second mathematical object in the mathematical space, using module 282; calculating a function of the first mathematical object and the second mathematical object to obtain a third mathematical object, for example using module 284; and determining whether to include the particular training example in the second subgroup based on the third mathematical object. For example, when the third mathematical object is in a selected region of the mathematical space, step 714 may include the particular training example in the second subgroup, and/or when the third mathematical object is outside the selected region, step 714 may not include the particular training example in the second subgroup.

In some examples, step 714 may comprise using the one or more properties of a particular content associated with a particular training example of the first plurality of training examples (determined by step 706) to identify a first mathematical object in a mathematical space, for example using module 282; for each training example of the second plurality of training examples, analyzing the respective content to determine respective one or more properties of the respective content, for example using module 288; for each training example of the second plurality of training examples, using the respective one or more properties of the respective content associated with the training example to identify a respective mathematical object in the mathematical space, for example using module 282; and determining whether to include the particular training example in the second subgroup based on the first mathematical object and the mathematical objects associated with the second plurality of training examples. For example, a region of the mathematical space may be selected based on the mathematical objects associated with the second plurality of training examples, when the first mathematical object is in the selected region, step 714 may include the particular training example in the second subgroup, and/or when the first mathematical object is outside the selected region, step 714 may not include the particular training example in the second subgroup. In another example, when the minimal distance between the first mathematical object and a mathematical object of the mathematical objects associated with the second plurality of training examples is below a selected threshold, step 714 may not include the particular training example in the second subgroup, and/or when the minimal distance is above the selected threshold, step 714 may include the particular training example in the second subgroup.

In some examples, for each training example of the second plurality of training examples of step 710, analyzing the respective content to determine respective one or more properties of the respective content, for example as described above (for example, in relation to step 706 and the first plurality of training examples). Further, step 714 may further comprise using the one or more properties of the second content determined by step 712 and the properties of the contents associated with the second plurality of training examples to further attribute the second content to a third subgroup of at least one but not all of the second plurality of training examples of step 710, for example as described above (for example, in relation to step 714 and the first plurality of training examples).

In some examples, process 700 may further comprise determining that the at least one content associated with the training examples of the first subgroup of step 708 are associated with a first at least one source (for example, as described above in relation to step 410); for each source of the first at least one source, updating a respective data-record associated with the source based on the attribution of the first content (for example, as described above in relation to step 412); determining that the at least one content associated with the training examples of the second subgroup are associated with a second at least one source (for example, as described above in relation to step 410); and, for each source of the second at least one source, updating a respective data-record associated with the source based on the attribution of the second content (for example, as described above in relation to step 412). In one example, the second at least one source may be a proper subset of the first at least one source, may be identical to the first at least one source, may include at least one training example in common with the first at least one source, may include a training example not included in the first at least one source, and so forth.

Figure 8A:
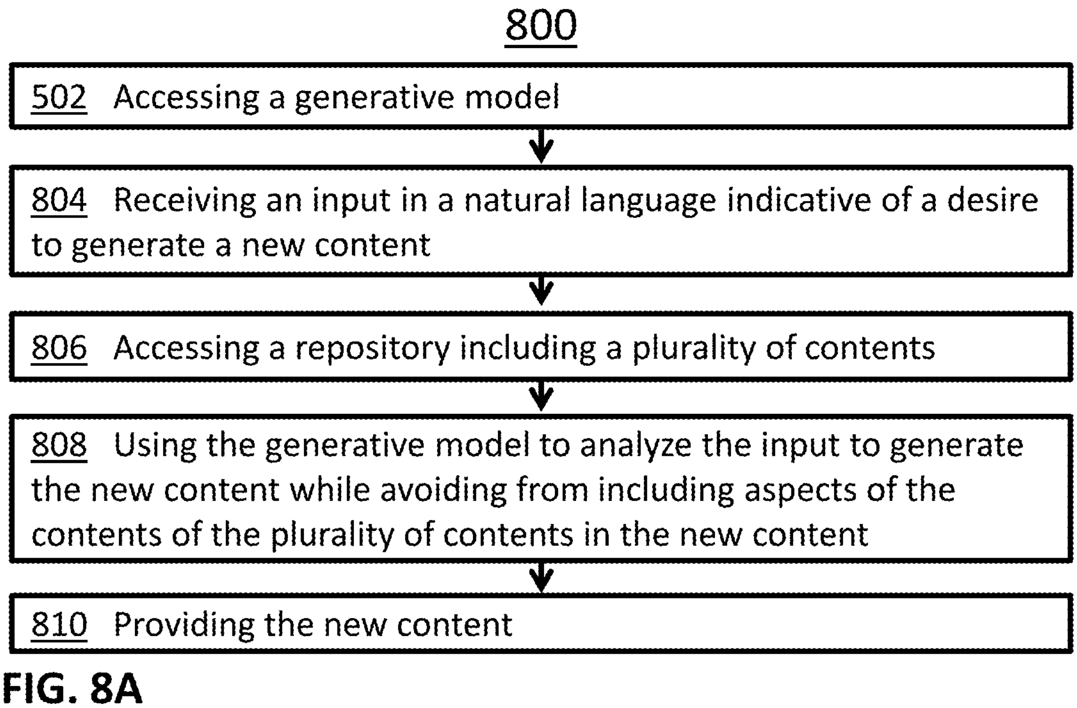
FIGS. 8A and 8B are flowcharts of example processes for excluding selected concepts in content generation, consistent with some embodiments of the present disclosure.

FIG. 8A is a flowchart of example process 800 for excluding selected concepts in content generation, consistent with some embodiments of the present disclosure. In this example, process 800 may comprise accessing a generative model (step 502); receiving an input in a natural language indicative of a desire to generate a new content (step 804); accessing a repository including a plurality of contents (step 806); using the generative model to analyze the input to generate the new content while avoiding from including aspects of the contents of the plurality of contents in the new content (step 808); and providing the new content (step 810). In other examples, process 800 may include additional steps or fewer steps. In other examples, one or more steps of process 800 may be executed in a different order and/or one or more groups of steps may be executed simultaneously. In some examples, a system for excluding selected concepts in content generation may include at least one processing unit configured to perform process 800. In some examples, a method for excluding selected concepts in content generation may include performing process 800. In some examples, a non-transitory computer readable medium may store computer implementable instructions that when executed by at least one processor cause the at least one processor to perform operations for excluding selected concepts in content generation, and the operations may include the steps of process 800.

In some examples, step 804 may comprise receiving an input in a natural language indicative of a desire to generate a new content. In one example, the input in the natural language may be a textual input in the natural language. In another example, the input in the natural language may be speech in the natural language. In some examples, step 804 may read the input from a digital memory, may receive the input from an external computing device (for example, using a digital communication device), may receive the input from an individual (for example, via a user interface, via a keyboard, via a pointing device, via a touchscreen, via a microphone, and so forth), may capture the input (for example, using a microphone), may generate the input (for example, by analyzing a different input, such as a prompt, using a generative model), and so forth.

In some examples, step 806 may comprise accessing a repository including a plurality of contents. For example, the repository may be stored in a digital memory, and step 806 may access the repository by accessing the digital memory. In another example, the repository may be maintained by an external computing device, and step 806 may access the repository by communicating with the external computing device (for example, using a digital communication device). In yet another example, step 806 may assemble the repository, for example by retrieving the plurality of contents, for example using one or more queries, using a search engine, by accessing a database, and so forth. In some examples, the plurality of contents may include at least one (at least two, at least three, all four, etc.) of a copyrighted content, restricted content, confidential content, or private content. For example, the plurality of contents may include at least one (at least two, at least ten, etc.) copyrighted content. In another example, the plurality of contents may include at least one (at least two, at least ten, etc.) restricted content. In some examples, the plurality of contents may include at least one (at least two, at least ten, etc.) confidential content. In some examples, the plurality of contents may include at least one (at least two, at least ten, etc.) private content.

In some examples, step 808 may comprise using a generative model (such as the generative model accessed by step 502, a different generative model, etc.) to analyze an input (such as the input received by step 804, an input received from an individual, an input in a natural language, a different input, etc.) to generate a new content while avoiding from including aspects of specific contents (such as aspects of the contents of the plurality of contents of step 806, aspects of different contents, etc.) in the new content. In one example, step 808 may use process 820 to analyze the input to generate the new content while avoiding from including aspects of specific contents in the new content. In one example, the new content generated by step 808 may include at least one of a generated visual content, generated audio content, or generated textual content. In one example, the new content generated by step 808 may include a generated multimedia content. In some examples, the input received by step 804 may be indicative of the aspects of the contents of the plurality of contents. For example, the input may include 'avoiding characters mentioned in the repository' or 'without any object depicted in the repository'. Further, step 808 may analyze the input to determine the aspects, for example using an NLP algorithm, using a LLM, and so forth. In one example, the input received by step 804 may include a noun, the new content generated by step 808 may include an object of a category of objects selected based on the noun, and the aspects of the contents of the plurality of contents may be associated with the category of objects. For example, the input may include 'a mouse solving a puzzle in a unique way', and the aspects of the contents of the plurality of contents may include mice depicted in the plurality of contents and/or puzzles depicted in the plurality of contents. In another example, the input may include 'a story about a renowned detective', and the aspects of the contents of the plurality of contents may include detectives mentioned in the plurality of contents and/or mysteries described in the plurality of contents. In one example, the input received by step 804 may include a verb, the new content generated by step 808 may include an event of a category of events selected based on the verb, and the aspects of the contents of the plurality of contents may be associated with the category of events. For example, the input may include 'a mouse solving a puzzle in a unique way', and the aspects of the contents of the plurality of contents may include techniques for solving puzzles demonstrated and/or described in the plurality of contents.

In some examples, the generative model accessed by step 502 may include a plurality of artificial neurons, and step 808 may comprise: analyzing the plurality of contents of step 806 to identify a subgroup of at least one but not all of the plurality of artificial neurons (for example, using TransformerLens, GANDissect, NetDissect, Lucid, AutoNeuron, etc.); and avoiding using the artificial neurons of the subgroup when generating the new content using at least one other artificial neuron of the generative model. In one example, avoiding using the artificial neurons of the subgroup may include ignoring the outputs of the artificial neurons of the subgroup. In another example, avoiding using the artificial neurons of the subgroup may include replacing each artificial neuron of the artificial neurons of the subgroup with a specific constant or a specific function of the inputs of the artificial neuron. In yet another example, avoiding using the artificial neurons of the subgroup may include changing a weight associated with the outputs of the artificial neurons of the subgroup to a low value, thereby rendering their effect on further calculations negligible.

In some examples, step 808 may comprise using the generative model accessed by step 502 to analyze the input received by step 804 to generate a preliminary content; analyzing the preliminary content and the plurality of contents to determine at least one aspect of the preliminary content associated with at least one content of the plurality of contents (for example, using a visual search algorithm); and modifying the at least one aspect of the preliminary content to generate the new content. For example, the at least one aspect of the preliminary content associated with the at least one content of the plurality of contents may be a depiction of an object or an event depicted or described in the at least one content of the plurality of contents, and step 808 may remove or replace the depiction from/in the preliminary content to thereby generate the new content. In another example, the at least one aspect of the preliminary content associated with the at least one content of the plurality of contents may be a color scheme, and step 808 may modify colors in the preliminary content to thereby generate the new content. In yet another example, the at least one aspect of the preliminary content associated with the at least one content of the plurality of contents may be a phrase or a name included in the at least one content of the plurality of contents, and step 808 may remove or replace the phrase or the name from/in the preliminary content to thereby generate the new content. In an additional example, the at least one aspect of the preliminary content associated with the at least one content of the plurality of contents may be a sound effect or a voice included in the at least one content of the plurality of contents, and step 808 may remove or replace the sound effect or the voice from/in the preliminary content to thereby generate the new content.

In some examples, step 808 may comprise using the generative model accessed by step 502 to analyze the input to generate a plurality of preliminary contents (for example, by using the generative model to analyze the input received by step 804 with different seeds, by using the generative model to analyze different variations of the input received by step 804, etc.); and analyzing the plurality of preliminary contents and the plurality of contents to select the new content of the plurality of preliminary contents. For example, step 808 may analyze each preliminary content of the plurality of preliminary contents to determine whether the preliminary content includes the aspects of contents of the plurality of contents, and may select a preliminary content of the plurality of preliminary contents that do not includes such aspects as the new content. In one example, step 808 may generate the plurality of preliminary contents iteratively until a preliminary content that do not includes such aspects is generated.

In some examples, process 800 may further comprise, for each content of the plurality of contents of step 806, analyzing the content to identify a respective at least on property of the content, for example using module 288. Further, step 808 may analyze the input received by step 804 and the properties associated with the plurality of contents to generate the new content. For example, the properties may include at least one color scheme used in the plurality of contents, and step 808 may generate the new content based on the input while avoiding the at least one color scheme. In another example, the properties may include at least one category of objects depicted in the plurality of contents, and step 808 may generate the new content based on the input while avoiding the at least one category of objects. In yet another example, the properties may include at least one specific phrase included in the plurality of contents, and step 808 may generate the new content based on the input while avoiding the at least one specific phrase.

In some examples, step 810 may comprise providing a content (such as the new content generated by step 808, a different content, and so forth). For example, step 810 may use step 510 to provide the content. For example, the generated new content may be a generated visual content, and step 810 may visually present the generated visual content (for example, using a display device, using an extended reality appliance, in a user interface, and so forth). In another example, the generated new content may be a generated audio content, and step 810 may output the generated audio content using an audio output device (such as an audio speaker, headphones, and so forth). In yet another example, the generated new content may be a generated textual content, and step 810 may present the generated textual content visually, may present the generated textual content audibly (for example, using a text-to-speech algorithm), and so forth. In an additional example, step 810 may post the content in social media, may include the content in a website, may include the content in an app, may store the content in a digital memory, may transmit the content to an external computing device (for example, using a digital communication device), and so forth.

In some examples, the new content generated by step 808 may be a textual content, and/or each content of the plurality of contents of step 806 may be a respective textual content. For examples, step 808 may avoid including in the generated new content selected portions (for example, all portions longer than a selected threshold, all portions that include a specific name or specific phrase, all portions that can't be found in selected textual contents not related to the plurality of contents, etc.) of the textual contents of the plurality of contents. In another example, step 808 may avoid including in the generated new content concepts (such as ideas, constructs, characters, etc.) described in the textual contents of the plurality of contents.

In some examples, the new content generated by step 808 may be an audio content, and/or each content of the plurality of contents of step 806 may be a respective textual content. For examples, step 808 may avoid including in the generated new content speech reciting selected portions (for example, all portions longer than a selected threshold, all portions that include a specific name or specific phrase, all portions that can't be found in selected textual contents not related to the plurality of contents, etc.) of the textual contents of the plurality of contents. In another example, step 808 may avoid including in the generated new content sound effects described in the textual contents of the plurality of contents.

In some examples, the new content generated by step 808 may be a visual content, and/or each content of the plurality of contents step 806 may be a respective textual content. For examples, step 808 may avoid including in the generated new content a visualization of text including selected portions (for example, all portions longer than a selected threshold, all portions that include a specific name or specific phrase, all portions that can't be found in selected textual contents not related to the plurality of contents, etc.) of the textual contents of the plurality of contents. In another example, step 808 may avoid including in the generated new content visual concepts (such as objects, events, characters, situations, etc.) described in the textual contents of the plurality of contents.

In some examples, the new content generated by step 808 may be an audio content, and/or each content of the plurality of contents step 806 may be a respective audio content. For examples, step 808 may avoid including in the generated new content selected portions (for example, all portions longer than a selected threshold, all portions that include a specific sound, name or phrase, all portions that can't be found in selected audio contents not related to the plurality of contents, etc.) of the audio contents of the plurality of contents. In another example, step 808 may avoid including in the generated new content concepts (such as ideas, constructs, characters, sound effects, voices, etc.) described in the audio contents of the plurality of contents. In some examples, the new content generated by step 808 may be a visual content, and/or each content of the plurality of contents step 806 may be a respective audio content. For examples, step 808 may avoid including in the generated new content visual concepts (such as objects, events, characters, situations, etc.) described in the audio contents of the plurality of contents.

In some examples, the new content generated by step 808 may be a visual content, and/or each content of the plurality of contents step 806 may be a respective visual content. For examples, step 808 may avoid including in the generated new content selected portions (for example, all portions with an area larger than a selected threshold, all portions longer than a selected threshold, all portions that include a specific visualization, a visualization of a specific object or a visualization of a specific event, all portions that can't be found in selected visual contents not related to the plurality of contents, etc.) of the visual contents of the plurality of contents. In another example, step 808 may avoid including in the generated new content concepts (such as objects, events, characters, situations, etc.) depicted in the visual contents of the plurality of contents.

Figure 8B:
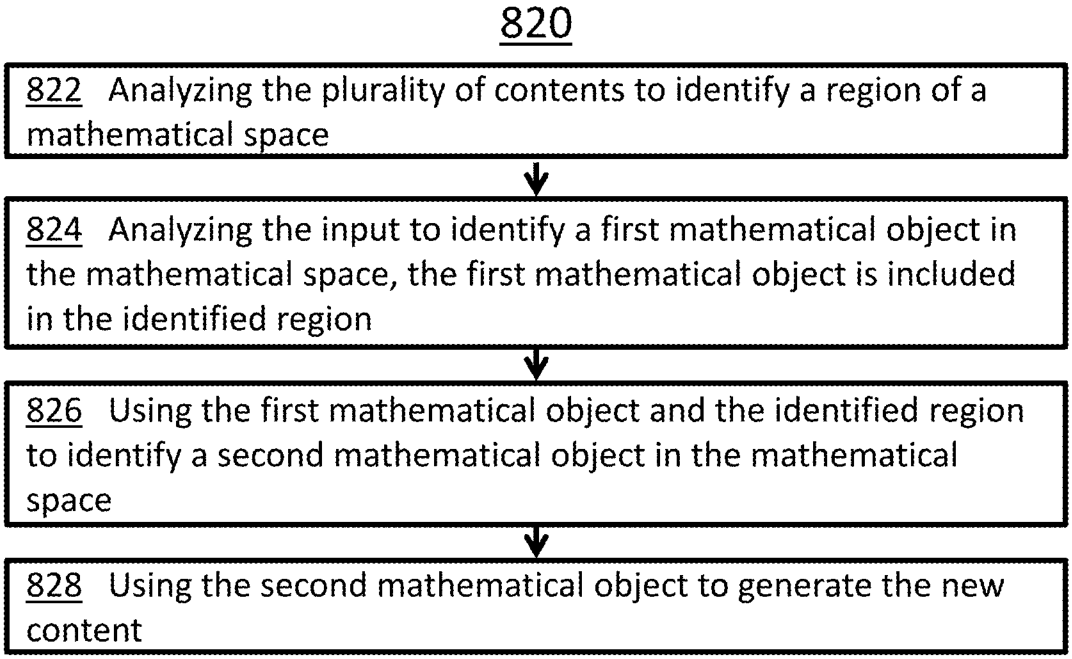

FIG. 8B is a flowchart of example process 820 for excluding selected concepts in content generation, consistent with some embodiments of the present disclosure. In this example, process 820 may comprise analyzing the plurality of contents to identify a region of a mathematical space (step 822); analyzing the input to identify a first mathematical object in the mathematical space, the first mathematical object is included in the identified region (step 824); using the first mathematical object and the identified region to identify a second mathematical object in the mathematical space, the second mathematical object is not included in the identified region (step 826); and using the second mathematical object to generate the new content (step 828). In other examples, process 820 may include additional steps or fewer steps. In other examples, one or more steps of process 820 may be executed in a different order and/or one or more groups of steps may be executed simultaneously. In some examples, a system for excluding selected concepts in content generation may include at least one processing unit configured to perform process 820. In some examples, a method for excluding selected concepts in content generation may include performing process 820. In some examples, a non-transitory computer readable medium may store computer implementable instructions that when executed by at least one processor cause the at least one processor to perform operations for excluding selected concepts in content generation, and the operations may include the steps of process 820.

In some examples, step 822 may comprise analyzing a plurality of contents (such as the plurality of contents of step 806, a different plurality of contents, etc.) to identify a region of a mathematical space. For example, step 822 may use module 282 to analyze the plurality of contents to identify the region of the mathematical space. In some examples, step 822 may, for each content of the plurality of contents, analyze the content to identify a respective mathematical object in the mathematical space, for example using module 282, and may use the mathematical objects associated with the plurality of contents to identify the region of the mathematical space. In one example, the identified region may include all the mathematical objects associated with the plurality of contents. In another example, the identified region may not include at least one mathematical object of the mathematical objects associated with the plurality of contents. In one example, the identified region may be a convex hull of the mathematical objects associated with the plurality of contents. In some examples, step 822 may use one-class Support Vector Machine (SVM), or another one class classification algorithm) to analyze the mathematical objects associated with the plurality of contents to identify the region of the mathematical space. In some examples, step 822 may determine at least one parameter of the region of the mathematical space by calculating a mathematical function of the mathematical objects associated with the plurality of contents. Some non-limiting examples of such function may include a linear function, a non-linear function, an exponential function, a polynomial function, a logarithmic function, and so forth.

In some examples, step 824 may comprise analyzing an input (such as the input received by step 804, a different input, etc.) to identify a first mathematical object in a mathematical space (such as the mathematical space of step 822, a different mathematical space, etc.), for example using module 282. In one example, the first mathematical object may be included in the region identified by step 822. In another example, the first mathematical object may not be included in the region identified by step 822.

In some examples, step 826 may comprise using the first mathematical object identified by step 824 and the region identified by step 828 to identify a second mathematical object in the mathematical space. In one example, the second mathematical object may not be included in the identified region. In another example, the second mathematical object may be included in the identified region. In one example, the first mathematical object may be included in the identified region, and step 826 may mathematically project the first mathematical object outside the identified region. In such case, the second mathematical object may be a mathematical projection of the first mathematical object outside the identified region. In one example, the first mathematical object may be included in the identified region, and the second mathematical object may be the closest mathematical object of a selected group of mathematical objects (for example, all mathematical objects of a specific type, etc.) to the first mathematical object outside the identified region. In some examples, step 828 may comprise using the second mathematical object identified by step 826 to generate the new content. For example, a function or an injective function mapping mathematical objects in the mathematical space to contents may be used based on the second mathematical object to obtain the new content.

Figure 9A:
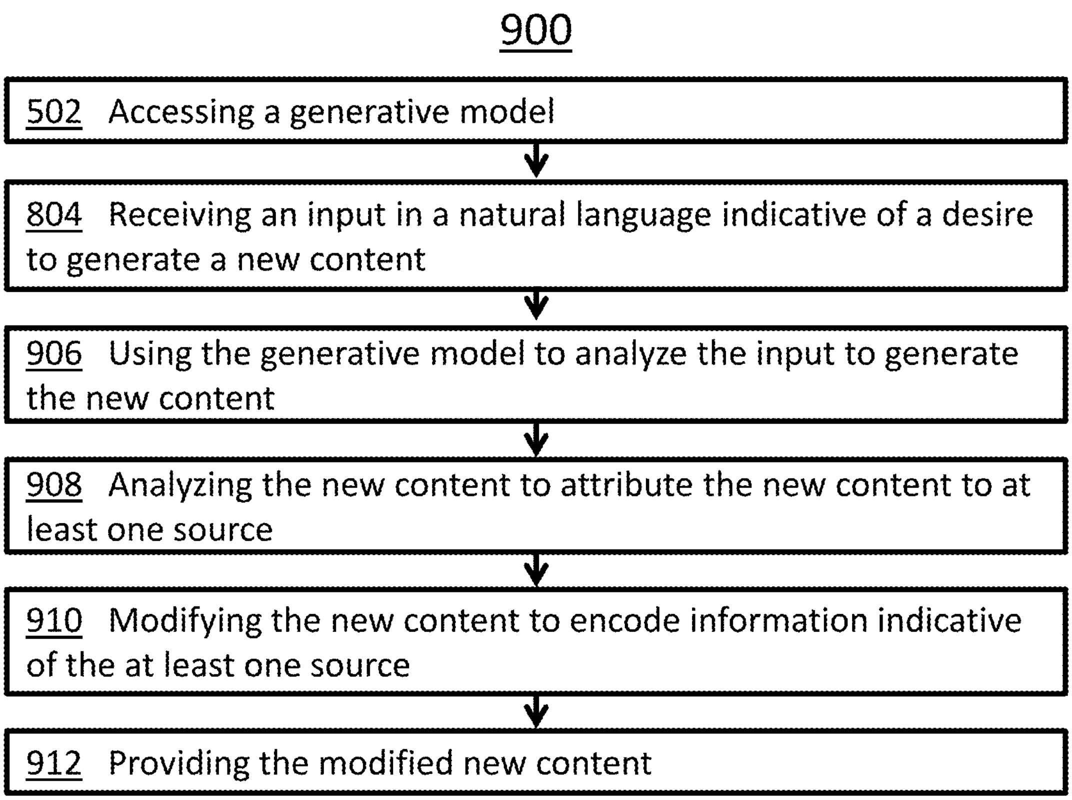
FIGS. 9A and 9B are flowcharts of example processes for marking attribution data in generated content, consistent with some embodiments of the present disclosure.

FIG. 9A is a flowchart of an example process 900 for marking attribution data in generated content, consistent with some embodiments of the present disclosure. In this example, process 900 may comprise accessing a generative model (step 502); receiving an input in a natural language indicative of a desire to generate a new content (step 804); using the generative model to analyze the input to generate the new content (step 906); analyzing the new content to attribute the new content to at least one source (step 908); modifying the new content to encode information indicative of the at least one source (step 910); and providing the modified new content (step 912). In other examples, process 900 may include additional steps or fewer steps. In other examples, one or more steps of process 900 may be executed in a different order and/or one or more groups of steps may be executed simultaneously. In some examples, a system for marking attribution data in generated content may include at least one processing unit configured to perform process 900. In some examples, a method for marking attribution data in generated content may include performing process 900. In some examples, a non-transitory computer readable medium may store computer implementable instructions that when executed by at least one processor cause the at least one processor to perform operations for marking attribution data in generated content, and the operations may include the steps of process 900.

In some examples, step 906 may comprise using a generative model (such as the generative model accessed by step 502, a different generative model, etc.) to analyze an input (such as the input received by step 804, an input received from an individual, an input in a natural language, a different input, etc.) to generate a new content. In one example, the new content generated by step 906 may include at least one of a generated visual content, generated audio content, or generated textual content. In one example, the new content generated by step 906 may include a generated multimedia content.

In some examples, step 908 may comprise analyzing a content (such as the new content generated by step 906, a different content, etc.) to attribute the content to at least one source. Additionally or alternatively, step 908 may comprise analyzing the content to determine, for each source of the at least one source, a respective degree of attribution of the content to the respective source. In one example, the content may include a trademarked object, and the analysis of the content by step 908 may detect the trademarked object to identify the owner of the trademarked object and thereby identify a source of the at least one source. In an additional example, step 908 may use process 920 to determine that the content is associated with the at least one source. In one example, step 908 may use a machine learning model to analyze the content to attribute the content to the at least one source and/or to determine the degrees of attribution of the content to each of the at least one source. The machine learning model may be a machine learning model trained using training examples to attribute contents to sources and/or to determine degrees of attribution of contents to sources. An example of such training example may include a sample content, together with a label indicative of at least one sample source associated with the sample content, and/or together with a label indicative of sample degrees of attribution of the content to each of the at least one sample source. In one example, step 908 may use an artificial neural network to analyze the content to attribute the content to the at least one source and/or to determine degrees of attribution of contents to sources. In some examples, step 908 may analyze the input received by step 804 to determine that the content is associated with at least one source. For example, the input may indicate a desired to use a specific style or specific object, the specific style and/or the specific object may be associated with a source (such as a creator, an owner, etc.) and step 908 may analyze the input to determine the specific style or specific object and thereby identify a source of the at least one source.

In some examples, the generative model accessed by step 502 may be a result of training a machine learning model using a plurality of training examples, and each training example of the plurality of training examples may be associated with a respective content. In one example, the at least one source of step 908 may include a content associated with a training example of the plurality of training examples. In another example, the at least one source of step 908 may include a source associated with a content associated with a training example of the plurality of training examples (for example, based on a data-structure associating contents with sources, as described in relation to FIG. 3C).

In some examples, step 910 may comprise modifying a content (such as the new content generated by step 906, a different content, and so forth) to encode information indicative of at least one source (such as the at least one source of step 908, different at least one source, at least two sources, at least three sources, at least ten sources, and so forth). For example, the information indicative of the at least one source may be digital information indicative of the at least one source, may include unique identifiers of the at least one source, and so forth. In one example, step 910 may modify the content using a steganographic algorithm to encode the information indicative of the at least one source in the content. In another example, the content may include sample values, and step 910 may replace in the new content all sample values of samples that match two selected close values to represent a binary encoding of the information indicative of the at least one source, for example by representing binary 0 with one of the two selected values, and representing binary 1 value with another one of the two selected values. In yet another example, the content may include digital sample values, and step 910 may replace in the new content one or more least significant bits of the digital sample values with a binary encoding of the information indicative of the at least one source. In an additional example, step 910 may replace a portion of the content and/or add a new portion to the content to present to an individual (for example, visually, audibly, textually, graphically, etc.) the information indicative of the at least one source. In some examples, the new content generated by step 906 may include pixels, and the modifying the new content by step 910 may include modifying at least some of the pixels of the new content to encode the information indicative of the at least one source. For example, step 910 may replace in the new content all pixels values of pixels that match two selected close values (for example, visually similar values) to represent a binary encoding of the information, for example by representing binary 0 with one of the two selected values, and representing binary 1 value with another one of the two selected values. In another example, step 910 may modify the new content to visually present the information, for example with a watermark, with a textual credit, with a graphical credit (such as a logo), and so forth. In some examples, the new content generated by step 906 may include audio data samples, and the modifying the new content by step 910 may include modifying at least some of the audio data samples of the new content to encode the information indicative of the at least one source. For example, step 910 may replace in the new content all audio data sample values of audio data samples that match two selected close values (for example, audibly similar values) to represent a binary encoding of the information, for example by representing binary 0 with one of the two selected values, and representing binary 1 value with another one of the two selected values. In another example, step 910 may modify the new content to audibly present the information, for example by adding audible speech presenting the information. In some examples, the new content generated by step 906 may include depth data, and the modifying the new content by step 910 may include modifying the depth data of the new content to encode the information. For example, step 910 may replace in the new content all depth data sample values of depth data samples that match two selected close values (for example, values of similar depths) to represent a binary encoding of the information, for example by representing binary 0 with one of the two selected values, and representing binary 1 value with another one of the two selected values. In some examples, the modifying the new content by step 910 may include encoding the information indicative of the at least one source in a metadata associated with the new content. For example, the new content may be associated with a digital metadata, and step 910 may digitally encode the information and insert it to the digital metadata (for example, at a specific location within the metadata, at a specific field of the metadata, in a specific digital format, and so forth). In some examples, a presence of the encoded information indicative of the at least one source in the modified new content may not be evident to an unsuspecting person human person's examination. In some examples, a presence of the encoded information in the modified new content may be evident to an unsuspecting person human person's examination.

In some examples, step 908 may analyze the new content to determine, for each source of the at least one source, a respective degree of attribution of the new content to the respective source, for example as described above. Further, the information encoded by step 910 may be indicative of the determined degrees. For example, the encoded information may include a digital encoding of the degrees, digital indications of associations of different degrees with different sources, and so forth. In some examples, the information encoded by step 910 may be indicative of the generative model accessed by step 502. For example, the encoded information may include a digital encoding of a unique identifier of the generative model (for example, in a specific repository of generative models), of a property of the generative model, of a timestamp associated with the generative model, and so forth. In some examples, the information encoded by step 910 may be indicative of the input in the natural language received by step 804. For example, the encoded information may include a digital encoding of the input, a transcription of the input, a recording of the input, a unique identifier of the input, a property of the input, and so forth. In some examples, the information encoded by step 910 may be indicative of a generation timestamp associated with the new content. For example, the encoded information may include a digital encoding of the timestamp.

In some examples, step 912 may comprise providing the modified new content of step 910. For example, step 912 may use step 510 and/or step 810 to provide the modified new content. For example, the modified new content may be a modified visual content, and step 912 may visually present the modified visual content (for example, using a display device, using an extended reality appliance, in a user interface, and so forth). In another example, the modified new content may be a modified audio content, and step 912 may output the modified audio content using an audio output device (such as an audio speaker, headphones, and so forth). In yet another example, the modified new content may be a modified textual content, and step 912 may present the modified textual content visually, may present the modified textual content audibly (for example, using a text-to-speech algorithm), and so forth. In an additional example, step 912 may post the modified new content in social media, may include the modified new content in a website, may include the modified new content in an app, may store the modified new content in a digital memory, may transmit the modified new content to an external computing device (for example, using a digital communication device), and so forth.

Figure 9B:
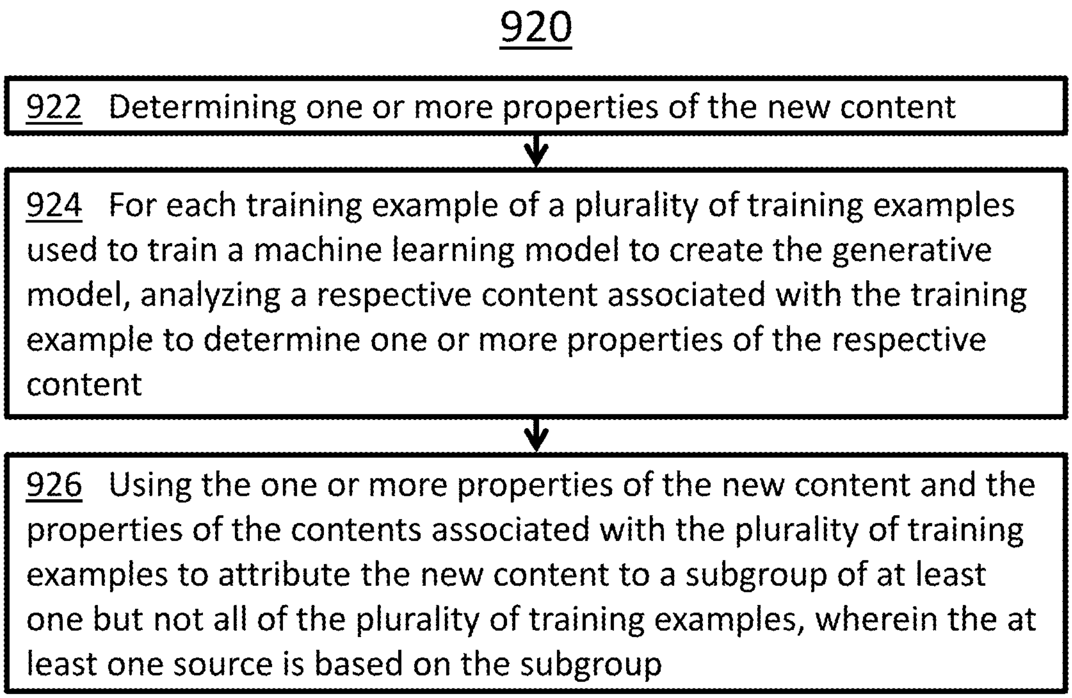

FIG. 9B is a flowchart of an example process 920 for marking attribution data in generated content, consistent with some embodiments of the present disclosure. In one example, the generative model accessed by step 502 may be a result of training a machine learning model using a plurality of training examples, each training example of the plurality of training examples may be associated with a respective content, and process 920 may comprise: determining one or more properties of the new content (step 922); for each training example of the plurality of training examples, analyzing the respective content to determine one or more properties of the respective content (step 924); and using the one or more properties of the new content and the properties of the contents associated with the plurality of training examples to attribute the new content to a subgroup of at least one but not all of the plurality of training examples (step 926). In this example, the at least one source may be based on the subgroup. In other examples, process 920 may include additional steps or fewer steps. In other examples, one or more steps of process 920 may be executed in a different order and/or one or more groups of steps may be executed simultaneously. In some examples, a system for marking attribution data in generated content may include at least one processing unit configured to perform process 920. In some examples, a method for marking attribution data in generated content may include performing process 920. In some examples, a non-transitory computer readable medium may store computer implementable instructions that when executed by at least one processor cause the at least one processor to perform operations for marking attribution data in generated content, and the operations may include the steps of process 920.

In some examples, step 922 may comprise determining one or more properties of the new content generated by step 906, for example using module 288. In some examples, the generative model accessed by step 502 may be a result of training a machine learning model using a plurality of training examples, each training example of the plurality of training examples may be associated with a respective content, and step 924 may comprise for each training example of the plurality of training examples, analyzing the respective content to determine one or more properties of the respective content, for example using module 288.

In some examples, the generative model accessed by step 502 may be a result of training a machine learning model using a plurality of training examples, each training example of the plurality of training examples may be associated with a respective content, and step 926 may comprise using the one or more properties of the new content generated by step 906 (for example, the one or more properties determined by step 922) and the properties of the contents associated with the plurality of training examples (for example, the properties determined by step 924) to attribute the new content to a subgroup of at least one but not all of the plurality of training examples, for example as described above. Further, the at least one source of step 908 may be based on the subgroup. For example, the at least one source may be or include the training examples of the subgroup, may be or include sources associated with the training examples of the subgroup (for example, associated in a data-structure associating contents with sources, as described in relation to FIG. 3C), and so forth. In some examples, step 926 may use the one or more properties of the new content to embed the new content in a mathematical space, for example using module 282. Further, step 926 may, for each training example of the plurality of training examples, use the one or more properties of the respective content to embed the respective content associated with the training example in the mathematical space, for example using module 282. Further, step 926 may use the mathematical space to select the subgroup of at least one but not all of the plurality of training examples. For example, a region of the mathematical space may be selected based on the embedding of the new content, and step 926 may include a training example in the subgroup training examples if and only if the respective embedding of the respective content associated the training example is in the selected region. In another example, when the minimal distance in the mathematical space between embedding of the new content and an embedding of a particular training example is below a selected threshold, step 926 may include the particular training example in the subgroup, and/or when the minimal distance is above the selected threshold, step 926 may not include the particular training example in the subgroup.

In some examples, process 920 may further comprise accessing a data-structure associating training examples with amounts, using the data-structure to determine that the training examples of the subgroup of step 926 are associated with a total amount (for example, by calculating a function, such as a sum, a linear function, a non-linear function, and so forth, of the amounts associated with the training examples of the subgroup in the data-structure), and encoding the total amount in the information encoded by step 910. For example, the encoded information may include a digital encoding of the total amount. In some examples, the determination of the one or more properties of the new content by step 922 may be based on an intermediate result of the generative model when generating the new content, for example as described above in relation to step 704 and/or step 712.

In some examples, the training of the machine learning model (of process 920 and/or step 502) to obtain the generative model may include an iterative process. Further, in each iteration of the iterative process, a respective training example of the plurality of training examples may be analyzed and a loss function may be updated. Further, the one or more properties of the content associated with a particular training example determined by step 924 may be based on the update to the loss function in a particular iteration of the iterative process that includes the analysis of the particular training example, for example as described above in relation to step 704 and/or step 712.

In some examples, the training of the machine learning model (of process 920 and/or step 502) to obtain the generative model may include a first training step and a second training step. The first training step may use a second subgroup of the plurality of training examples to obtain an intermediate model. Further, the second training step may use a third subgroup of the plurality of training examples to obtain the generative model and/or may use the intermediate model for initialization. The second subgroup may differ from the third subgroup. Further, step 908 and/or step 926 may compare a result associated with the input and the intermediate model (such as a content generated by the intermediate model in response to the input, an auxiliary output produced by the intermediate model in response to the input, etc.) with a result associated with the input and the generative model (such as the new content generated by step 906, an auxiliary output produced by the generative model in response to the input, etc.), and may, for each training example of the third subgroup, determine whether to attribute the new content generated by step 906 to the respective training example based on a result of the comparison.

In some examples, the attribution of the new content generated by step 906 to the at least one source determined by step 908 may include an attribution of a first aspect of the new content to a first source and an attribution of a second aspect of the new content to a second source. Further the information encoded by step 910 may be indicative of the attribution of the first aspect of the new content to the first source, and of the attribution of the second aspect of the new content to the second source. For example, the encoded information may include a digital indication of the first aspect associated with a digital indication of the first source, and a digital indication of the second aspect associated with a digital indication of the second source. In another example, the encoded information may include a digital indication of the first source associating the first aspect with the first source (for example, where digital indication of the first source is in a location associated with the first aspect), and a digital indication of the second source associating the second aspect with the second source (for example, where digital indication of the second source is in a location associated with the second aspect). Some non-limiting examples of such aspects of the new content may include a background of the new content, a scenery of the new content, a layer of a plurality of layers included in the new content, a style of at least a portion of the new content, a color scheme of the new content, a texture in the new content, a person associated with the new content, an animal associated with the new content, an inanimate object associated with the new content, an event associated with the new content, an action associated with the new content, a phrase used in the new content, a language register associated with the new content, and so forth.

Figure 10:
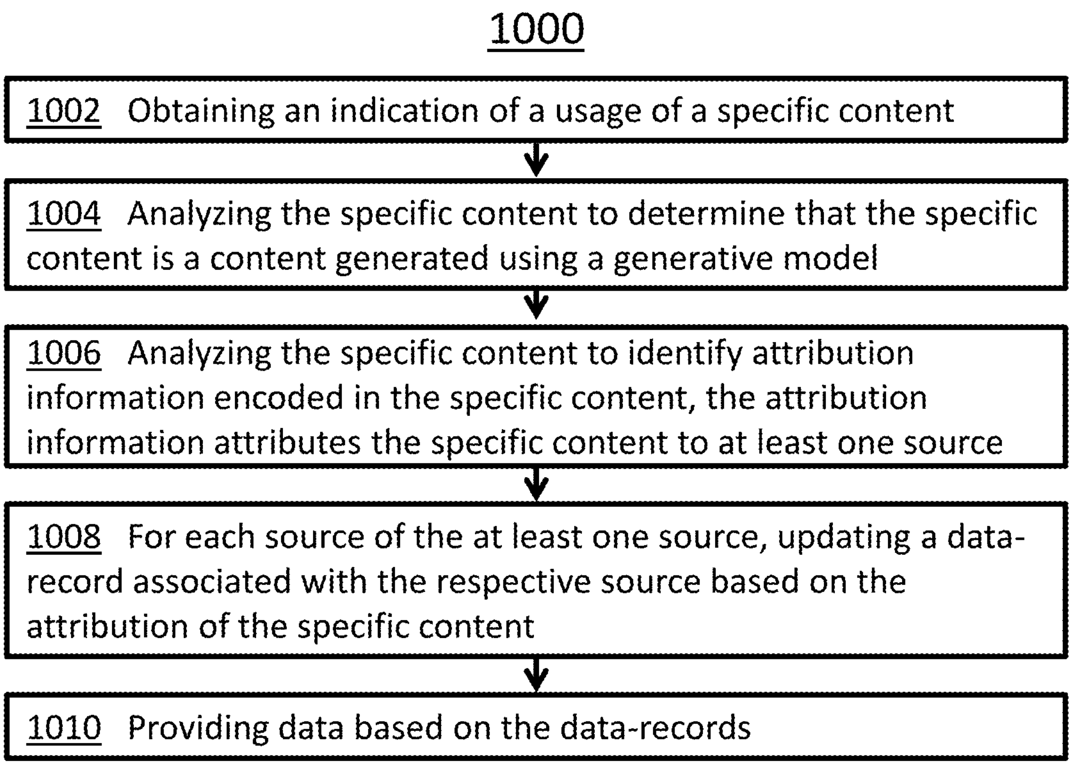
FIG. 10 is a flowchart of an example process for recording usage of generated content, consistent with some embodiments of the present disclosure.

FIG. 10 is a flowchart of an example process 1000 for recording usage of generated content, consistent with some embodiments of the present disclosure. In this example, process 1000 may comprise obtaining an indication of a usage of a specific content (step 1002); analyzing the specific content to determine that the specific content is a content generated using a generative model (step 1004); analyzing the specific content to identify attribution information encoded in the specific content, the attribution information attributes the specific content to at least one source (step 1006); for each source of the at least one source, updating a data-record associated with the respective source based on the attribution of the specific content (step 1008); and providing data based on the data-records (step 1010). In other examples, process 1000 may include additional steps or fewer steps. In other examples, one or more steps of process 1000 may be executed in a different order and/or one or more groups of steps may be executed simultaneously. In some examples, a system for recording usage of generated content may include at least one processing unit configured to perform process 1000. In some examples, a method for recording usage of generated content may include performing process 1000. In some examples, a non-transitory computer readable medium may store computer implementable instructions that when executed by at least one processor cause the at least one processor to perform operations for recording usage of generated content, and the operations may include the steps of process 1000.

In some examples, step 1002 may comprise obtaining an indication of a usage of a specific content. For example, step 1002 may read the indication from a digital memory, may receive the indication from an external computing device (for example, using a digital communication device), may read the indication from a database, may receive the indication from an individual (for example, via a user interface, via a keyboard, via a voice command, via a gesture, via a pointing device, via a touch device, via a microphone, via an image sensor, etc.), may monitor data to identify the indication (for example, data captured using at least one sensor from a physical environment, data in a digital memory, data received via a digital communication device, etc.), and so forth. In one example, step 1002 may analyze digital communication data to identify transmission of the specific content, thereby obtaining the indication. In another example, step 1002 may analyze digital display data to identify display of the specific content, thereby obtaining the indication. In yet another example, step 1002 may analyze digital audio data to identify audible presentation of the specific content, thereby obtaining the indication. In an additional example, step 1002 may analyze image data captured from an environment (for example, captured from a physical environment using an image sensor, captured from a virtual environment, etc.) to identify visual presentation of the specific content, thereby obtaining the indication. In another example, step 1002 may analyze digital printing data to identify printing of the specific content (for example, the specific content may include a 3D structure and the printing may be 3D printing, the specific content may include a visual and the printing may be printing on a surface, etc.), thereby obtaining the indication. In yet another example, step 1002 may analyze a social media feed to identify the usage of the specific content in the social media, thereby obtaining the indication. In an additional example, step 1002 may analyze a broadcast to identify the usage of the specific content in the broadcast, thereby obtaining the indication. In another example, step 1002 may analyze a website to identify the usage of the specific content in the website, thereby obtaining the indication. In yet another example, step 1002 may analyze an app and/or an app usage data to identify the usage of the specific content in and/or via the app, thereby obtaining the indication. In an additional example, step 1002 may analyze purchases and/or sales data to identify purchase and/or sale of the specific content and/or of a product including a usage of the specific content, thereby obtaining the indication. In an additional example, step 1002 may analyze development data (such as data associated with model training activities, data associated with design of a new content, etc.) to identify the usage of the specific content in the development process (for example, for training a new model, for designing the new content, etc.), thereby obtaining the indication. Some non-limiting examples of such usage of the specific content may comprise at least one of a visual presentation (for example, outputted by a computing device performing step 1002, outputted by another computing device, on a non-computing device, a digital visual presentation, a printed visual presentation, a digital visual presentation, an analog visual presentation, etc.), audible presentation (for example, outputted by a computing device performing step 1002, outputted by another computing device, outputted by a non-computing device, a digital audible presentation, an analog audible presentation, etc.), usage in a social media, usage in a broadcasted, usage in a website, usage in an app, usage in a product, usage of the specific content for printing, usage of the specific content to produce one or more other contents, and so forth.

In some examples, step 1004 may comprise determining that the specific content is a content generated using a generative model. In one example, step 1004 may access a repository of contents generated using one or more generative models to determine whether the specific content is included in the repository and thereby produced by a generative model. In another example, step 1004 may access a data-structure associating contents with labels, each label indicates whether a respective content was generated using a generative mode. In some examples, step 1004 may comprise analyzing the specific content to determine that the specific content is a content generated using a generative model. For example, step 1004 may use a classification machine learning model to determine whether the specific content is a content generated using a generative model. The classification machine learning model may be a classification machine learning model trained using training examples to analyze contents and determine whether the contents were generated using a generative model. An example of such training example may be a sample content, together with a label indicative of whether the sample content was generated using a generative model. In another example, step 1004 may use an artificial neural network to determine whether the specific content is a content generated using a generative model. In yet another example, step 1004 may calculate a convolution of at least part of the specific content to thereby obtain a result value of the calculated convolution of the at least part of the specific content, and may base the determination that the specific content is a content generated using a generative model on the result value. For example, when the result value is or includes a first numerical value, step 1004 may determine that the specific content is a content generated using a generative model, and/or when the result value is or includes a second numerical value, step 1004 may determine that the specific content is not a content generated using a generative model. In an additional example, step 1004 may analyze the specific content to determine whether the specific content includes encoded information of a specific type (for example, information encoded by step 910, encoded information indicative of the specific content being a content generated by a generative model, encoded attribution information, encoded information in a specific format, encoded information encoded in a specific location, encoded information encoded in a specific digital code, etc.), and may determine that the specific content is a content generated using a generative model when the specific content includes encoded information of the specific type.

In some examples, step 1006 may comprise analyzing a specific content (such as the specific content of step 1002 and/or step 1004, a different content, etc.) to identify attribution information encoded in the specific content. The attribution information may attribute the specific content to at least one source. In one example, the encoded attribution information may be or include information encoded by step 910. In another example, the encoded attribution information may be or include manually encoded attribution information. In one example, the encoded attribution information may be encoded digitally. In another example, the encoded attribution information may be encoded analogy. In one example, the encoded attribution information may be encoded using a steganographic algorithm, and step 1006 may use the steganographic algorithm to identify and/or decode the encoded attribution information. In one example, the encoded attribution information may include unique identifiers of the at least one source, and step 1006 may analyze the specific content to identify the unique identifiers of the at least one source. In one example, the specific content may include sample values, and step 1006 may analyze the sample values to identify and/or decode the encoded attribution information. In another example, the specific content may include pixels, the attribution information may be encoded in the pixels of the specific content, and step 1006 may analyze the pixel values to identify and/or decode the encoded attribution information. In yet another example, the specific content may include audio data samples, the attribution information may be encoded in the audio data samples of the specific content, and step 1006 may analyze the audio data samples to identify and/or decode the encoded attribution information. In an additional example, the specific content may include depth data, the attribution information may be encoded in depth data of the specific content, and step 1006 may analyze the depth data to identify and/or decode the encoded attribution information. In another example, the attribution information may be encoded in the metadata associated with the specific content, and step 1006 may analyze the metadata to identify and/or decode the encoded attribution information. In some examples, a presence of the encoding of the attribution information in the specific content may not be evident to an unsuspecting person human person's examination. In some examples, a presence of the encoding of the attribution information in the specific content may be evident to an unsuspecting person human person's examination.

In some examples, step 1008 may comprise, for each source of the at least one source of step 1006, updating a data-record associated with the respective source based on the attribution of the specific content (based on the encoded attribution information of step 1006). For example, such data-record may be stored in a memory (such as a digital memory), and step 1008 may update data associated with the data-record in the memory. In another example, such data-record may be maintained by an external computing device, and step 1008 may transmit information to the external computing device (for example, using a digital communication device) to cause the external computing device to update the data-record. In yet another example, such data-record may include data in a database, and step 1008 may update the data in the database. In one example, step 1008 may update the data-record to record the attribution. In one example, step 1008 may update the data-record to include an encoding (such as a digital encoding) of information associated with at least one of the attribution, the specific content, or the usage of the specific content (of step 1002).

In some examples, for each source of the at least one source of step 1006 and/or step 1008, the attribution information of step 1006 may be indicative of a respective degree of attribution associated with the respective source, for example as described above. Further, for each source of the at least one source of step 1006 and/or step 1008, the update to the data-record associated with the respective source by step 1008 is based on the respective degree. For example, step 1008 may update the data-record to record the respective degree of attribution. In another example, a value in such data-record may be updated to a new value determined by calculating a function of the value and the respective degree of attribution. Some non-limiting examples of such function may include a linear function, a non-linear function, an exponential function, a polynomial function, a logarithmic function, and so forth. In some examples, a value in such data-record may represent a credit associated with the source, and step 1008 may update the credit associated with the source (and therefore the value in the data-record) based on the respective degree of attribution.

In some examples, the attribution information may be indicative of an attribution of a first aspect of the specific content to a first source and an attribution of a second aspect of the specific content to a second source, for example as described above. Further, the update to the data-record associated with the first source by step 1008 may be based on the first aspect, and the update to the data-record associated with the second source by step 1008 may be based on the second aspect. For example, a data-record may include different values and/or different fields for different aspects, and step 1008 may update the value and/or field associated with the respective aspect. Some non-limiting examples of such aspects of the specific content may include a background of the specific content, a scenery of the specific content, a layer of a plurality of layers included in the specific content, a style of at least a portion of the specific content, a color scheme of the specific content, a texture in the specific content, a person associated with the specific content, an animal associated with the specific content, an inanimate object associated with the specific content, an event associated with the specific content, an action associated with the specific content, a phrase used in the specific content, a language register associated with the specific content, and so forth.

In some examples, the update by step 1008 to the data-record associated with a particular source of the at least one source of step 1006 and/or step 1008 may be further based on a characteristic of the usage of the specific content of step 1002. For example, the update may record and/or update data in the particular data-record based on a category associated with the usage. Some non-limiting examples of such category may include usage of the specific content in a specific context, usage of the specific content in a specific environment, usage of the specific content in a physical environment, usage of the specific content in a virtual environment, broadcasting the specific content, transmission of the specific content, transmission of the specific content to a specific destination, transmission of the specific content from a specific source, electronic display of the specific content, electronic display of the specific content using a specific device and/or a specific type of device, electronic display of the specific content at a specific location and/or in a specific environment, audible presentation of the specific content, audible presentation of the specific content using a specific device and/or a specific type of device, audible presentation of the specific content at a specific location and/or in a specific environment, printing of the specific content, usage of the specific content in social media, posting the specific content in social media, reposting a post including the specific content in social media, usage of the specific content in a website, usage of the specific content in an app, usage of the specific content in a product, usage of the specific content in a development (for example, of a product, of a technology, etc., for example, for training a new model, for designing the new content, etc.), and so forth. In one example, the characteristic of the usage of the specific content may be a medium associated with the usage of the specific content. Some non-limiting examples of such medium may include social media, printed media, website, app, physical product, broadcast, audible medium, visual medium, and so forth. In one example, the characteristic of the usage of the specific content may be a type of the usage of the specific content. Some non-limiting examples of such type may include post, repost, embedding, training, share, view, public usage, private usage, usage in a physical item, digital usage, and so forth. In one example, the characteristic of the usage of the specific content may be a quantity associated with the usage of the specific content. Some non-limiting examples of such quantity may include number of views, number of shares, time-length associated with the usage, geographical span associated with the usage, size of display, number of instances of a product, and so forth.

In some examples, the update by step 1008 to the data-record associated with a particular source of the at least one source of step 1006 and/or step 1008 may be further based on an entity associated with the usage of the specific content of step 1002. For example, the update may record and/or update data in the particular data-record based on the entity. Some non-limiting examples of such entity associated with the usage of the specific content may include a viewer of the specific content, a consumer of the specific content, an entity providing the specific content, an entity posting the specific content, an entity reporting the specific content, an entity sharing the specific content, an entity presenting the specific content, and so forth. In some examples, the update by step 1008 to the data-record associated with a particular source of the at least one source of step 1006 and/or step 1008 may be further based on a time associated with the usage of the specific content of step 1002. For example, the update may record and/or update data in the particular data-record based on the time. Some non-limiting examples of such time associated with the usage of the specific content may include time duration associated with the usage, timestamp associated with the usage, time-in-day associated with the usage, and so forth.

In some examples, step 1010 may comprise providing data based on data-records (for example, based on the data-records of step 1008, based on other data-records, and so forth). For example, step 1010 may provide the data to an individual (for example, visually, graphically, textually, audibly, via a user interface, and so forth), may provide the data to a different process, may provide the data to an external computing device (for example, transmitting the provided data using a digital communication device), may store (i.e., provide) the provided data in a digital memory, and so forth. In one example, the provided data may be based on and/or indicative of the degree of attribution. In one example, the data provided by step 1010 may include at least part of the data included in the data-records. In another example, the data provided by step 1010 may not include any data included in the data-records. In yet another example, the data provided by step 1010 may include statistical data based on data included in the data-records. In an additional example, the data provided by step 1010 may include a result of a mathematical function of data included in the data-records.

In some examples, the generative model used to generate the specific content of step 1002 may be a result of training a machine learning model using a plurality of training examples. Each training example of the plurality of training examples may be associated with a respective content. In one example, the at least one source of step 1006 and/or step 1008 may include a content associated with a training example of the plurality of training examples. In another example, the at least one source of step 1006 and/or step 1008 may be associated with a content associated with a training example of the plurality of training examples. For example, the at least one source may be or include at least one of an owner of the content, a creator of the content, a contributor of the content, an owner of a concept included (for example, depicted, recorded, mentioned, etc.) in the content, and so forth. In some examples, the at least one source of step 1006 and/or step 1008 may be associated with an owner of the generative model. In other examples, the at least one source of step 1006 and/or step 1008 may be associated with at least one of a creator of the generative model, or a contributor of the generative model.

Figure 11:
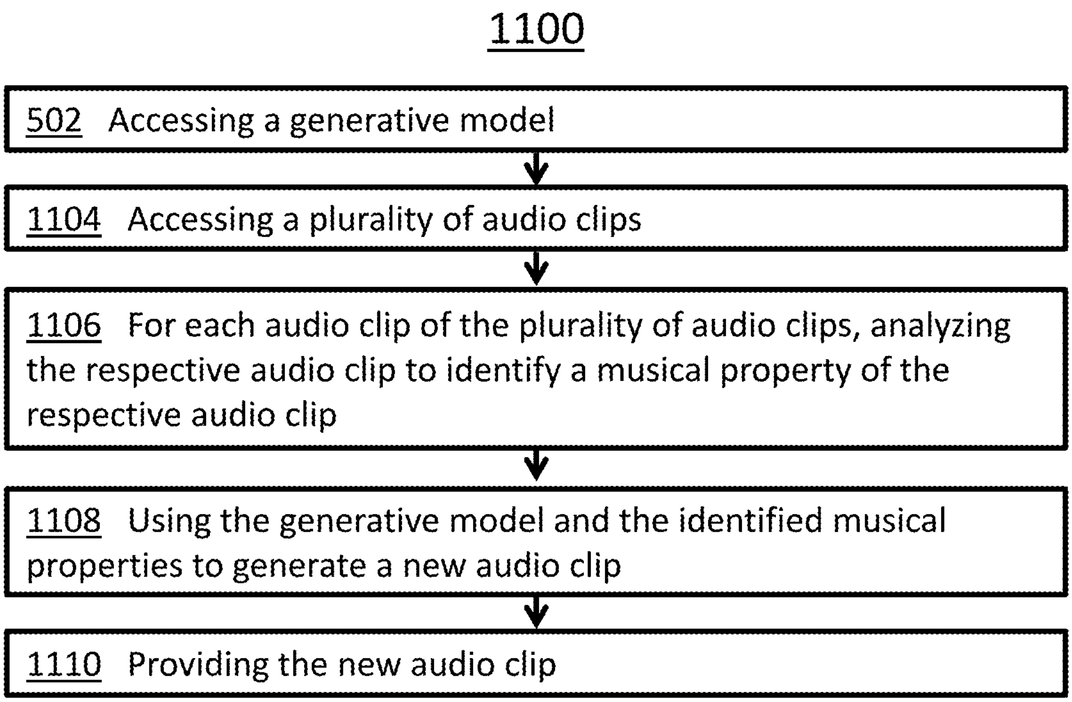
FIG. 11 is a flowchart of an example process for generating audio clips from listening habits, consistent with some embodiments of the present disclosure.

FIG. 11 is a flowchart of an example process 1100 for generating audio clips from listening habits, consistent with some embodiments of the present disclosure. In this example, process 1100 may comprise accessing a generative model (step 502); accessing a plurality of audio clips (step 1104); for each audio clip of the plurality of audio clips, analyzing the respective audio clip to identify a musical property of the respective audio clip (step 1106); using the generative model and the identified musical properties to generate a new audio clip (step 1108); and providing the new audio clip (step 1110). In other examples, process 1100 may include additional steps or fewer steps. In other examples, one or more steps of process 1100 may be executed in a different order and/or one or more groups of steps may be executed simultaneously. In some examples, a system for generating audio clips from listening habits may include at least one processing unit configured to perform process 1100. In some examples, a method for generating audio clips from listening habits may include performing process 1100. In some examples, a non-transitory computer readable medium may store computer implementable instructions that when executed by at least one processor cause the at least one processor to perform operations for generating audio clips from listening habits, and the operations may include the steps of process 1100.

In some examples, step 1104 may comprise accessing a plurality of audio clips. For example, step 1104 may read at least one of the plurality of audio clips from a digital memory, may receive at least one of the plurality of audio clips from an external computing device (for example, using a digital communication device), may receive at least one of the plurality of audio clips from an individual (for example, via a user interface, via a microphone, and so forth), may capture at least one of the plurality of audio clips (for example, using a microphone), may generate at least one of the plurality of audio clips (for example, by analyzing an input, such as a prompt, using a generative model, etc.), and so forth. In some examples, the plurality of audio clips accessed by step 1104 may be part of a playlist. For example, step 1104 may access the playlist to identify at least one of the plurality of audio clips, and may access the identified at least one of the plurality of audio clips. In one example, step 1104 may read the playlist from a digital memory, may access the playlist via an external computing device (for example, using a digital communication device), may receive the playlist from an individual (for example, via a user interface, via a keyboard, via a voice command, via a gesture, via a pointing device, via a touch device, etc.), may generate the playlist (for example, by analyzing an input, such as a prompt, using a generative model, etc.), and so forth. In some examples, the plurality of audio clips may be selected based on listening habits of an individual. For example, step 1104 may include in the plurality of audio clips that were listened to by the individual, for example in a selected time-frame, in a frequency above a select-threshold, for more than a selected number of times, and so forth. In another example, the listening habits may indicate a tendency of the individual towards a specific type of audio clips (for example, towards a specific genre, toward a specific artist, etc.), and step 1104 may include in the plurality of audio clips that match the specific type of audio clips.

In some examples, step 1106 may comprise, for each audio clip of a plurality of audio clips (such as the plurality of audio clips accessed by step 1104, a different plurality of audio clips, etc.), analyzing the respective audio clip to identify a musical property of the respective audio clip. Some non-limiting examples of such musical property may include at least one of tempo, key, chord progression, time signature, timbre, melody, harmony, dynamics, instrumentation, pitch, rhythm, spectral content, repetition pattern, articulation, and so forth. In one example, step 1106 may use Music Information Retrieval (MIR) algorithms to analyze an audio clip of the plurality of audio clips to identify a musical property of the audio clip. In another example, step 1106 may use an artificial neural network to analyze an audio clip of the plurality of audio clips to identify a musical property of the audio clip. In yet another example, step 1106 may use the generative model accessed by step 502 to analyze an audio clip of the plurality of audio clips to identify a musical property of the audio clip, for example when implementing step 1106 as part of step 1108. In an additional example, step 1106 may use a machine learning model to analyze an audio clip of the plurality of audio clips to identify a musical property of the audio clip. The machine learning model may be a machine learning model trained using training examples to determine musical properties of audio clips. An example of such training example may include a sample audio clip, together with a label indicative of one or more sample musical properties of the sample audio clip.

In some examples, step 1108 may comprise using a generative model (such as the generative model accessed by step 502, a different generative model, etc.) and/or musical properties (such as the musical properties identified by step 1106, different musical properties, etc.) to generate a new audio clip. In some examples, step 1108 may, for each audio clip of the plurality of audio clips accessed by step 1104, calculate a convolution of at least part of the respective audio clip to obtain a respective numerical result value. Further, step 1108 may calculate a function of the obtained numerical result values to obtain a mathematical object. Some non-limiting examples of such function may include a linear function, a non-linear function, an exponential function, a polynomial function, a logarithmic function, and so forth. Further, step 1108 may base the generation of the new audio clip on the mathematical object. For example, step 1108 may set an audio sample value in the new audio clip to a function of the mathematical object. In another example, when the mathematical object is in a selected region of a mathematical space, step 1108 may include a specific audio snippet in the new audio clip, and/or when the mathematical object is not in the selected region of the mathematical space, step 1108 may avoid including a specific audio snippet in the new audio clip. In some examples, the generative model may be a machine learning model trained using training examples to generate audio clips based on musical properties and/or additional information. An example of such training example may include an indication of sample musical properties and/or sample additional information, together with a sample audio clip matching the sample musical properties and/or the sample additional information.

In some examples, the generative model may be a multimodal foundation model, and step 1108 may use the generative model with a suitable prompt to generate a new audio clip based on the musical properties (such as, 'generate an audio clip with {textual description of the musical properties}'). In some examples, process 1100 may further comprise receiving an input in a natural language, for example using step 604. Further, step 1108 may base the generation of the new audio clip on an analysis of the input. For example, the generative model may be a multimodal foundation model, and step 1108 may use the generative model with a suitable prompt to generate a new audio clip based on the musical properties and the input (such as, 'generate an audio clip in response to this input {the input in the natural language'} with {textual description of the musical properties}'). In another example, step 1108 may use the input in the natural language as the additional information in the usage of the machine learning model described above. In one example, a first characteristic of the generated new audio clip may be based on a word included in the input, and a second characteristic of the generated new audio clip may be based on the musical properties identified by step 1106. For example, the input may include 'a happy song to my birthday', based on the word 'happy' step 1108 may generate the new audio clip in major keys, and may select a time signature for the new audio clip based on time signatures identified in the plurality of audio clips by step 1106. In another example, a particular characteristic of the generated new audio clip may be based on a word included in the input and the musical properties identified by step 1106.

In some examples, each audio clip of the plurality of audio clips accessed by step 1104 may be associated with a respective timestamp. Further, the generation of the new audio clip by step 1108 may be further based on the timestamps. Some non-limiting examples of such timestamps may include last usage time, creation time, time of an addition to a playlist, and so forth. For example, step 1108 may give higher weight (and therefore higher influence) to musical properties associated with audio clips with more current timestamps. In another example, when the musical properties identified by step 1106 includes two conflicting musical properties associated with two different audio clips, step 1108 may prefer the musical property associated with the more current audio clip. In some examples, each audio clip of the plurality of audio clips accessed by step 1104 may be associated with a respective quantity. Further, the generation of the new audio clip by step 1108 may be further based on the quantities. Some non-limiting examples of such quantities may include lengths, number of usages, ratings, and so forth. For example, step 1108 may give higher weight (and therefore higher influence) to musical properties associated with audio clips associated with higher quantity. In another example, when the musical properties identified by step 1106 includes two conflicting musical properties associated with two different audio clips, step 1108 may prefer the musical property associated with the audio clip associated with the higher quantity. In some examples, each audio clip of the plurality of audio clips accessed by step 1104 may be associated with a respective geographical location, and the generation of the new audio clip step 1108 may be further based on the geographical locations. Some non-limiting examples of such geographical locations may include a location of last usage of the audio clip, a location of creation of the audio clip, and of forth. For example, step 1108 may give higher weight (and therefore higher influence) to musical properties associated with audio clips associated with geographical locations closer to a current location of an individual. In another example, step 1108 may give higher weight (and therefore higher influence) to musical properties associated with audio clips associated with geographical locations of a same or similar category to a category associated with a current location of an individual. Some non-limiting examples of such category may include gym, restaurant, school, office, home, and so forth. In some examples, the generation of the new audio clip by step 1108 may be further based on an order associated with the plurality of audio clips accessed by step 1104. In one example, the order may be based on timestamps associated with the audio clips, and step 1108 may base the generation on the order as described above. In another example, the order may be based on a frequency of usage. In yet another example, the order may be based on ranks or grades assigned to the audio clips by an individual. In an additional example, the order may be based on quantities associated with the audio clips, and step 1108 may base the generation on the order as described above. In another example, the order may be based on geographical locations associated with the audio clips (for example, based on distance to a selected geographical position), and step 1108 may base the generation on the order as described above. In one example, step 1108 may give higher weight (and therefore higher influence) to musical properties associated with audio clips ranked higher based on the order. In another example, when the musical properties identified by step 1106 includes two conflicting musical properties associated with two different audio clips, step 1108 may prefer the musical property ranked higher based on the order.

In some examples, each audio clip of the plurality of audio clips accessed by step 1104 may be associated with a respective title. Further, the generation of the new audio clip by step 1108 may be based on the titles. For example, the titles may be indicative of an emotional state, step 1108 may analyze the titles (for example, using an NLP algorithm, using the generative model, etc.) to determine the emotional state, and may generate the new audio clip to match the emotional state. In another example, the titles may be indicative of a topic, step 1108 may analyze the titles (for example, using an NLP algorithm, using the generative model, etc.) to determine the topic, and may generate the new audio clip to include lyrics matching the topic. In some examples, step 1108 may generate a title to the new audio clip, for example using the generative model. For example, step 1108 may generate the title based on the new audio clip, based on lyrics associated with the new audio clip (for example as described below), based on the titles associated with the plurality of audio clips, and so forth.

In some examples, step 1110 may comprise providing an audio clip (such as the new audio clip generated by step 1108, a different audio clip, and so forth). For example, step 1110 may output the audio clip using an audio output device (such as an audio speaker, headphones, and so forth). In another example, step 1110 may add the audio clip to a playlist. In yet another example, step 1110 may publish the audio clip (for example, step 1110 may post the audio clip in social media, may publish the audio clip in a website, may make the audio clip available online, may include the audio clip in an app, may broadcast the audio clip, and so forth). In an additional example, step 1110 may store the audio clip in a digital format in a digital memory, may transmit the audio clip in a digital format to an external computing device (for example, using a digital communication device), may provide the audio clip to an individual (for example, via a user interface), and so forth.

In some examples, each audio clip of the plurality of audio clips accessed by step 1104 may be associated with respective lyrics. In one example, step 1106 may, for each audio clip of the plurality of audio clips, obtain the respective lyrics. For example, step 1106 may, for each audio clip of the plurality of audio clips, analyzing the respective audio clip to determine the respective lyrics (for example, with a voice recognition algorithm). In another example, step 1106 may, for each audio clip of the plurality of audio clips, access a data-structure associating audio clips with lyrics based on respective information associated with the audio clip to obtain the respective lyrics. Further, step 1108 may use the lyrics associated with the plurality of audio clips to generate new lyrics. For example, step 1108 may use a generative model (such as the generative model accessed by step 502, a LLM, etc.) to analyze the lyrics associated with the plurality of audio clips to generate the new lyrics (together with or apart of the new audio clip). In another example, step 1108 may use a machine learning model to analyze the lyrics associated with the plurality of audio clips to generate the new lyrics. The machine learning model may be a machine learning model trained using training examples to generate lyrics from other lyrics. An example of such training example may include sample source lyrics, together with a sample new lyrics corresponding to the sample source lyrics. Further, step 1108 may base the generation of the new audio clip on the generated new lyrics. For example, the new audio clip may include articulation of the generated new lyrics (for example, articulation created by a Text To Speech algorithm) with musical properties matching the musical properties identified by step 1106. In another example, step 1108 may use the generated new lyrics as the additional information in the usage of the machine learning model described above.

In some examples, each audio clip of the plurality of audio clips accessed by step 1104 may be associated with respective voice characteristics. For example, each audio clip may include a respective articulations (talking, singing, etc.) in a respective voice, and the respective voice characteristics may be voice characteristics of the respective voice. Some non-limiting examples of such voice characteristics may include prosodic voice characteristics, voice pitch, voice loudness, voice intonation, voice stress, voice timbre, voice flatness, accent, and so forth. In one example, step 1106 may, for each audio clip of the plurality of audio clips, analyze the respective audio clip to identify the respective voice characteristics. For example, step 1106 may analyze an audio clip with a classification algorithm to determine the voice characteristics associated with the audio clip. In another example, step 1106 may analyze an audio clip with an artificial neural network to determine the voice characteristics associated with the audio clip. Further, step 1108 may base the generation of the new audio clip on the identified voice characteristics. For example, the new audio clip generated by step 1108 may include articulations (talking, singing, etc.) with voice characteristics selected based on the identified voice characteristics.

In some examples, each audio clip of the plurality of audio clips accessed by step 1104 may be associated with respective visual content. For example, each audio clip may be associated with a cover image. In another example, each audio clip may be associated with a respective video clip (that may be synchronized with the audio clip). Further, step 1108 may further comprise generating new visual content associated with the generated new audio clip, for example based on the visual contents associated with the plurality of audio clips. In other examples, step 1108 may generate the new visual content based on the new audio clip, based on lyrics associated with the new audio clip, based on a title associated with the new audio clip, and so forth. In one example, step 1108 may use a generative model (such as the generative model accessed by step 502, a different generative model, etc.) to generate the new visual content, for example based on the information described above.

In some examples, the musical property of a particular audio clip of the plurality of audio clips identified by step 1106 may include a genre associated with the particular audio clip. Some non-limiting examples of a genre may include pop, rock, alternative rock, indie, punk, hip-hop, rap, R&B, house, techno, electronic-dance-music, classical, jazz, blues, reggae, k-pop, folk, country, bluegrass, and so forth. In one example, the genre associated with the particular audio clip may be a mix of a plurality of genres. In one example, step 1108 may select a genre for the new audio clip based on the genre associated with the particular audio clip. In one example, step 1106 may use a classification model to classify the particular audio clip to one of a plurality of alternative genres. In another example, step 1106 may use a decomposition model to determine a mix of genres associated with the particular audio clip.

In some examples, the musical property of a particular audio clip of the plurality of audio clips identified by step 1106 may include a musical instrument associated with the particular audio clip. Some non-limiting examples of a musical instrument may include guitar, drums, synthesizer, violin, viola, cello, harp, banjo, sitar, trumpet, trombone, French horn, tuba, flute, clarinet, oboe, saxophone, djembe, piano, organ, and so forth. In one example, the musical instrument associated with the particular audio clip may be a group of a plurality of different musical instrument. In one example, step 1108 may select one or more musical instruments for the new audio clip based on the musical instrument associated with the particular audio clip. In one example, step 1106 may use a classification model to determine whether the particular audio clip includes sounds produced by a specific musical instrument. In another example, step 1106 may use a decomposition model to determine a mix of musical instruments associated with the particular audio clip.

In some examples, the musical property of a particular audio clip of the plurality of audio clips identified by step 1106 may include a tempo associated with the particular audio clip. Some non-limiting examples of a tempo may include largo, lento, grave, adagio, andante, andantino, moderato, allegretto, allegro, vivace, presto, prestissimo, and so forth. In one example, the tempo associated with the particular audio clip may include a plurality of different tempos associated with different portions of the particular audio clip. In one example, step 1108 may select a tempo for at least a portion of the new audio clip based on the tempo associated with the particular audio clip. In one example, step 1106 may use a classification model to determine the tempo associated with at least a portion of the particular audio clip. In another example, step 1106 may use an artificial neural network to determine the tempo associated with at least a portion of the particular audio clip.

In some examples, the musical property of a particular audio clip of the plurality of audio clips identified by step 1106 may include a key associated with the particular audio clip. Some non-limiting examples of a key may include C Major, G Major, D Major, A Major, E Major, F Major, B-flat Major, A Minor, E Minor, D Minor, B Minor, B Minor, F #Minor, C Minor, G Minor, harmonic minor, melodic minor, modal keys, and so forth. In one example, the key associated with the particular audio clip may include a plurality of different keys associated with different portions of the particular audio clip and/or a mix of a plurality of different keys associated with the particular audio clip. In one example, step 1108 may select a key for at least a portion of the new audio clip based on the key associated with the particular audio clip. In one example, step 1106 may use a classification model to determine the key associated with at least a portion of the particular audio clip. In another example, step 1106 may use a decomposition model to determine a mix of different keys associated with at least a portion of the particular audio clip.

In some examples, the musical property of a particular audio clip of the plurality of audio clips identified by step 1106 may include a rhythm associated with the particular audio clip. Some non-limiting examples of a rhythm may include quarter notes, eighth notes, sixteenth notes, half notes, whole notes, backbeat, straight 8ths, swing, four on the flour, clave, bossa nova, tango, waltz, samba, rumba, bhangra, 5/4, 7/8, 6/8, 9/8, and so forth. In one example, the rhythm associated with the particular audio clip may include a plurality of different rhythms associated with different portions of the particular audio clip and/or a mix of a plurality of different rhythms associated with the particular audio clip. In one example, step 1108 may select a rhythm for at least a portion of the new audio clip based on the rhythm associated with the particular audio clip. In one example, step 1106 may use a classification model to determine the rhythm associated with at least a portion of the particular audio clip. In another example, step 1106 may use a decomposition model to determine a mix of different rhythms associated with at least a portion of the particular audio clip.

In some examples, the musical property of a particular audio clip of the plurality of audio clips identified by step 1106 may include a melody associated with the particular audio clip. In one example, the melody associated with the particular audio clip may include a plurality of different melodies associated with different portions of the particular audio clip and/or a mix of a plurality of different melodies associated with the particular audio clip. In one example, step 1108 may select a melody for at least a portion of the new audio clip based on the melody associated with the particular audio clip. In one example, step 1106 may use a pattern recognition algorithm to determine the melody associated with at least a portion of the particular audio clip. In another example, step 1106 may use a source separation algorithm to separate different melodies included in the particular audio clip.

In some examples, the musical property of a particular audio clip of the plurality of audio clips identified by step 1106 may include a chord progression associated with the particular audio clip. Some non-limiting examples of a chord progression may include I-V-vi-IV, I-vi-IV-V, I-IV-V, ii-V-I, I-vi-ii-V, 12-bar blues, vi-IV-I-V, I-V-vi-iii-IV-I-IV-V, i-VII-VI, Circle of Fifths, and so forth. In one example, the chord progression associated with the particular audio clip may include a plurality of different chord progressions associated with different portions of the particular audio clip and/or a mix of a plurality of different chord progressions associated with the particular audio clip. In one example, step 1108 may select a chord progression for at least a portion of the new audio clip based on the chord progression associated with the particular audio clip. In one example, step 1106 may use a pattern recognition algorithm to determine the chord progression associated with at least a portion of the particular audio clip.

In some examples, step 1108 may select at least one (at least two, at least three, at least four, at least five, etc.) of a genre, musical instrument, tempo, key, rhythm, melody, or chord progression for at least a portion of the new audio clip based on at least one (at least two, at least three, at least four, at least five, etc.) of a genre, musical instrument, tempo, key, rhythm, melody, or chord progression associated with at least a portion of a particular audio clip of the plurality of audio clips. For example, step 1108 may select any one of a genre, musical instrument, tempo, key, rhythm, melody, or chord progression for at least a portion of the new audio clip based on any one of a genre, musical instrument, tempo, key, rhythm, melody, or chord progression associated with at least a portion of a particular audio clip of the plurality of audio clips. For example, step 1108 may use a rule for selecting one based on the other.

What is claimed is:

1. A non-transitory computer readable medium storing computer implementable instructions that when executed by at least one processor cause the at least one processor to perform operations for recording usage of generated content, the operations comprising:

analyzing information from social media to obtain an indication of a usage of a specific content in the social media;

analyzing the specific content to determine that the specific content is a content generated using a generative model;

analyzing the specific content to identify attribution information digitally encoded in the specific content, wherein a presence of the digitally encoded attribution information in the specific content is undetectable by a human observer;

decoding the attribution information to identify at least two sources that contributed to the generation of the specific content by the generative model;

for each source of the at least two sources, updating a data-record associated with the respective source based on their attribution of the specific content; and providing data based on the updated data-records.

2. The non-transitory computer readable medium of claim 1, wherein the attribution information is encoded in a metadata associated with the specific content.

3. The non-transitory computer readable medium of claim 1, wherein the attribution information is encoded in pixels of the specific content.

4. The non-transitory computer readable medium of claim 1, wherein the attribution information is encoded in audio data samples of the specific content.

5. The non-transitory computer readable medium of claim 1, wherein the attribution information is encoded in depth data of the specific content.

6. The non-transitory computer readable medium of claim 1, wherein the generative model is a result of training a machine learning model using a plurality of training examples, each training example of the plurality of training examples is associated with a respective content, and one of the at least two sources includes a content associated with a training example of the plurality of training examples.

7. The non-transitory computer readable medium of claim 1, wherein the generative model is a result of training a machine learning model using a plurality of training examples, each training example of the plurality of training examples is associated with a respective content, and one of the at least two sources is associated with a content associated with a training example of the plurality of training examples.

8. The non-transitory computer readable medium of claim 1, wherein one of the at least two sources is associated with an owner of the generative model.

9. The non-transitory computer readable medium of claim 1, wherein, for each source of the at least two sources, the attribution information is indicative of a respective degree of attribution associated with the respective source, and the update to the data-record associated with the respective source is based on the respective degree.

10. The non-transitory computer readable medium of claim 1, wherein the attribution information is indicative of an attribution of a first aspect of the specific content to a first source and an attribution of a second aspect of the specific content to a second source, the update to the data-record associated with the first source is based on the first aspect, and the update to the data-record associated with the second source is based on the second aspect.

11. The non-transitory computer readable medium of claim 1, wherein the update to the data-record associated with a particular source is further based on a characteristic of the usage of the specific content.

12. The non-transitory computer readable medium of claim 11, wherein the characteristic of the usage of the specific content in the social media is a medium associated with the usage of the specific content.

13. The non-transitory computer readable medium of claim 11, wherein the characteristic of the usage of the specific content in the social media is a type of the usage of the specific content.

14. The non-transitory computer readable medium of claim 11, wherein the characteristic of the usage of the specific content in the social media is a quantity associated with the usage of the specific content.

15. The non-transitory computer readable medium of claim 1, wherein the update to the data-record associated with a particular source is further based on an entity associated with the usage of the specific content in the social media.

16. The non-transitory computer readable medium of claim 1, wherein the update to the data-record associated with a particular source is further based on a time associated with the usage of the specific content in the social media.

17. The non-transitory computer readable medium of claim 1, wherein decoding the attribution information includes using a steganographic algorithm.

18. The non-transitory computer readable medium of claim 1, wherein decoding the attribution information includes determining that the specific content was modified to include the attribution information.

19. A system for recording usage of generated content, the system comprising:

at least one processor configured to perform operations, the operations comprising:

analyzing information from social media to obtain an indication of a usage of a specific content in the social media;

analyzing the specific content to determine that the specific content is a content generated using a generative model;

analyzing the specific content to identify attribution information digitally encoded in the specific content, wherein a presence of the digitally encoded attribution information in the specific content is undetectable by a human observer;

decoding the attribution information to identify at least two sources that contributed to the generation of the specific content by the generative model;

for each source of the at least two sources, updating a data-record associated with the respective source based on their attribution of the specific content; and providing data based on the updated data-records.

20. A method for recording usage of generated content, the method comprising:

analyzing information from social media to obtain an indication of a usage of a specific content in the social media;

analyzing the specific content to determine that the specific content is a content generated using a generative model;

analyzing the specific content to identify attribution information digitally encoded in the specific content, wherein a presence of the digitally encoded attribution information in the specific content is undetectable by a human observer;

decoding the attribution information to identify at least two sources that contributed to the generation of the specific content by the generative model;

for each source of the at least two sources, updating a data-record associated with the respective source based on their attribution of the specific content; and providing data based on the updated data-records.

* * * * *